(12) United States Patent
Nagai et al.

(10) Patent No.: US 6,784,876 B1
(45) Date of Patent: Aug. 31, 2004

(54) COORDINATE READING DEVICE

(75) Inventors: Takuya Nagai, Nagoya (JP); Tsuyoshi Ohashi, Hashima (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 288 days.

(21) Appl. No.: 09/628,724

(22) Filed: Jul. 28, 2000

(30) Foreign Application Priority Data

Jul. 29, 1999 (JP) .......................................... P11-215390
Jul. 29, 1999 (JP) .......................................... P11-215392
Nov. 15, 1999 (JP) .......................................... P11-323482

(51) Int. Cl.[7] .............................................. G09G 5/00
(52) U.S. Cl. .................... 345/178; 345/173; 178/18.02; 178/18.01; 178/18.07
(58) Field of Search .............................. 345/178, 173, 345/179; 178/18.01, 18.02, 18.03, 18.07, 18.08, 19.03

(56) References Cited

U.S. PATENT DOCUMENTS

| | | | |
|---|---|---|---|
| 4,752,655 A | | 6/1988 | Tajiri et al. |
| 5,420,379 A | * | 5/1995 | Zank et al. ............... 178/19.03 |
| 5,644,108 A | * | 7/1997 | Katsurahira et al. ...... 178/18.07 |
| 5,831,599 A | | 11/1998 | Inoue |
| 6,414,673 B1 | | 7/2002 | Wood et al. |

FOREIGN PATENT DOCUMENTS

| | | |
|---|---|---|
| JP | 56145474 | 11/1981 |
| JP | 2190919 | 7/1990 |
| JP | 5-143224 | 6/1993 |
| JP | 5165560 | 7/1993 |
| JP | 7-56677 | 3/1995 |
| JP | 8202491 | 8/1996 |

\* cited by examiner

*Primary Examiner*—Jimmy H. Nguyen
(74) *Attorney, Agent, or Firm*—Oliff & Berridge, PLC

(57) ABSTRACT

Y coil Y1 is mounted on the attachment panel 24 so that its long sides Y1f and Y1g follow the front surface 24n, and is bent at a first edge 24a1 onto an edge surface 24a, and is further bent at a second edge 24a onto a rear surface 24b. Even if the pen moves to near an edge portion of the writing surface, the signal generated by long sides Y1f, Y1g will have a little influence from a signal generated from the short side Y1d. When the X coordinate calculated in S1306 is judged to be a coordinate in the X axis edge (S1308:YES), then an X axis edge flag is set in S1310 and a correction coefficient K that corresponds to the distance of the pen from the edge of the Y coil is extracted in S1312 by referring to a correction table. When the Y coils are scanned in S1314, if the X axis edge flag is judged to be set (S1316:YES), then in S1318, all of the values detected for the Y coils in S1314 are multiplied by the correction coefficient K. In S1320, the Y coordinate is calculated based on the corrected detected values. With this configuration, the error caused by influence from the short sides of the Y coils can be corrected so that the Y coordinate can be accurately obtained.

29 Claims, 58 Drawing Sheets

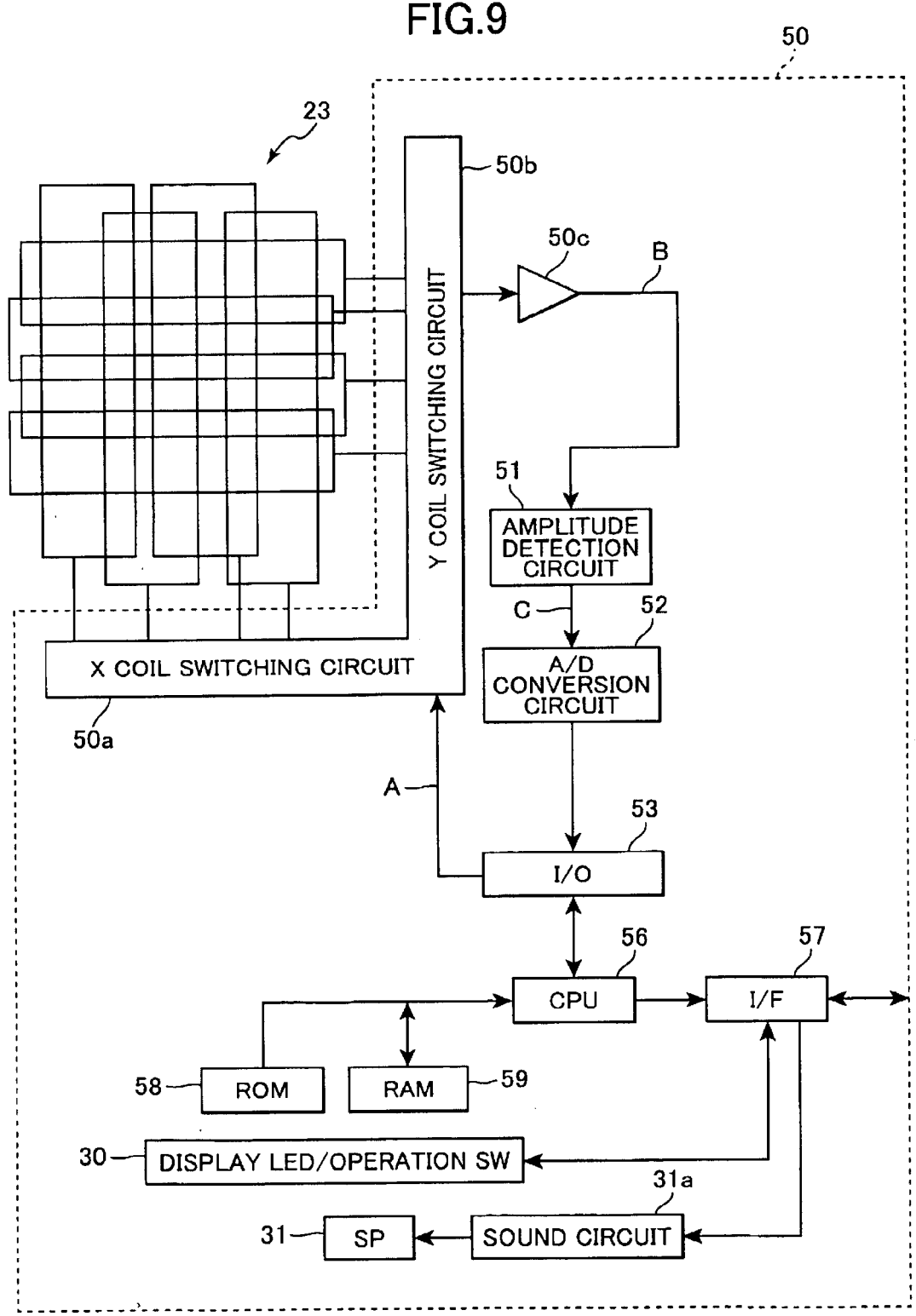

POSITION COORDINATE
TABLE 58a

| ΔX, ΔY | DIFF |
|---|---|
| 0 | 163 |
| ⋮ | ⋮ |
| P1/20 | 127 |
| ⋮ | ⋮ |
| P1/10 | 91 |
| ⋮ | ⋮ |
| 3P1/20 | 58 |
| ⋮ | ⋮ |
| P1/5 | 26 |
| ⋮ | ⋮ |
| P1/4 | 0 |

VOLTAGE VALUE
STORAGE AREA 58b

| COIL NUMBER | VOLTAGE |
|---|---|
| X1 | e1 |
| X2 | e2 |
| X3 | e3 |
| X4 | e4 |
| X5 | e5 |
| X6 | e6 |
| X7 | e7 |
| X8 | e8 |
| X9 | e9 |
| ⋮ | ⋮ |
| Xm | em |

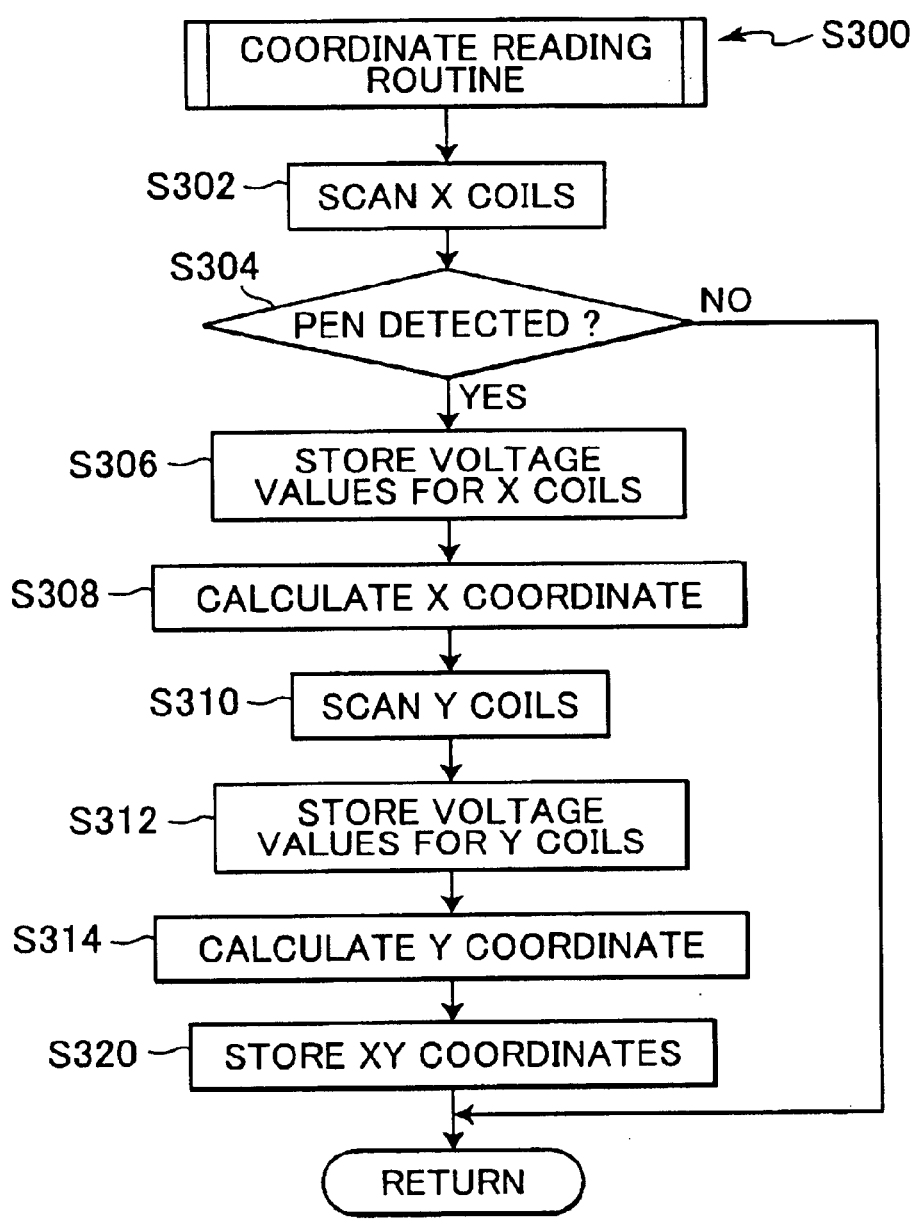

FIG.16

POSITION COODINATE TABLE 58a

| POSITION COORDINATE [mm] | DIFF |
|---|---|
| 0 | 167 |
| 1 | 157 |
| 2 | 147 |
| 3 | 137 |
| 4 | 127 |
| 5 | 118 |
| 6 | 109 |
| 7 | 100 |
| 8 | 91 |
| 9 | 82 |
| 10 | 74 |
| 11 | 66 |
| 12 | 58 |
| 13 | 50 |
| 14 | 42 |
| 15 | 34 |
| 16 | 26 |
| 17 | 19 |
| 18 | 12 |
| 19 | 6 |
| 20 | 0 |

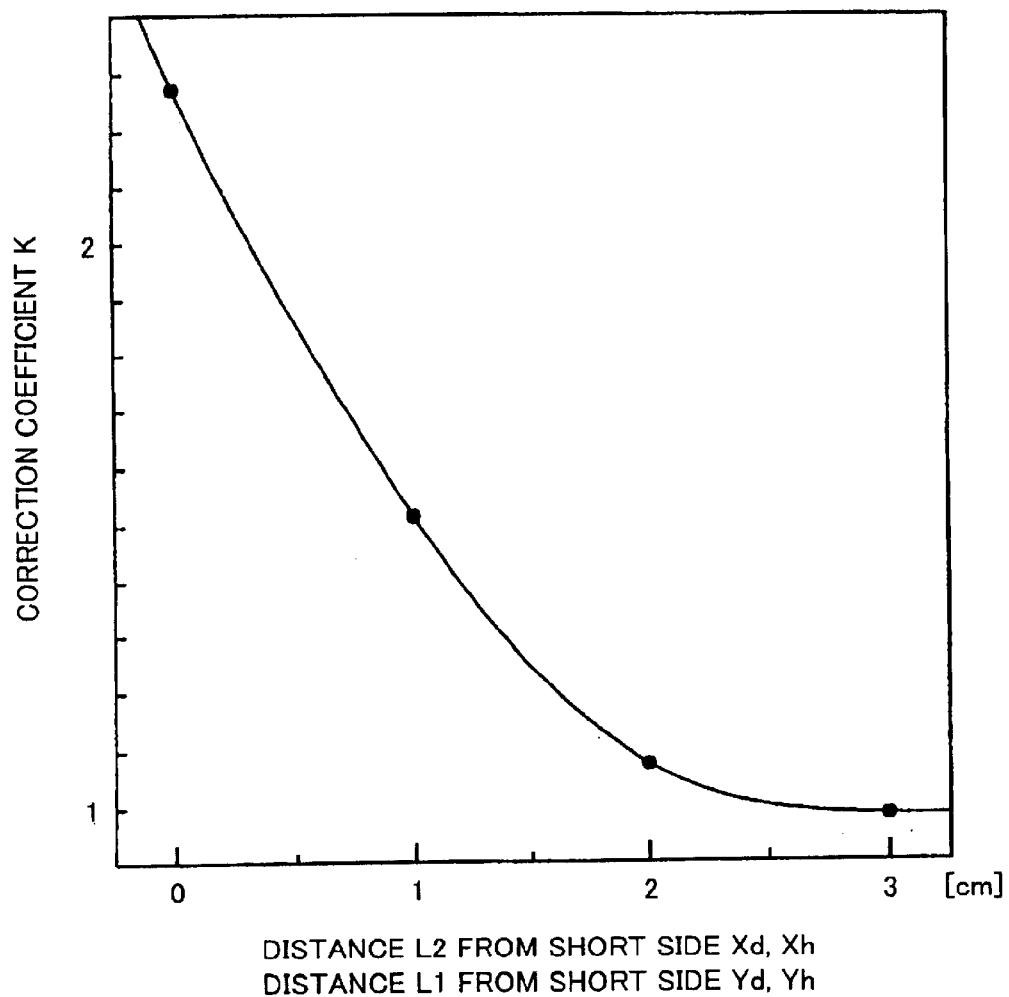

POSITION COORDINATE TABLE 58a

| ΔX [mm] ΔY | DIFF |
|---|---|
| 0 | 220 |
| ⋮ | ⋮ |
| 4 | 176 |
| ⋮ | ⋮ |
| 8 | 132 |
| ⋮ | ⋮ |
| 12 | 88 |
| ⋮ | ⋮ |
| 16 | 44 |
| ⋮ | ⋮ |
| 20 | 0 |

FIG.38

RELATIONSHIP BETWEEN PEN ATTRIBUTES AND MODULATION FREQUENCIES fm

| fm (KHz) | 10 | 8.7 | 7.7 | 6.9 | 6.3 | 5.6 | 5.0 | 4.5 | 4.1 |
|---|---|---|---|---|---|---|---|---|---|
| PEN ATTRIBUTE | ERASER | RED FINE | RED THICK | GREEN FINE | GREEN THICK | BLUE FINE | BLUE THICK | BLACK FINE | BLACK THICK |
| DEMODULATION COUNT NUMBER | 100 | 115 | 130 | 145 | 160 | 180 | 200 | 220 | 245 |

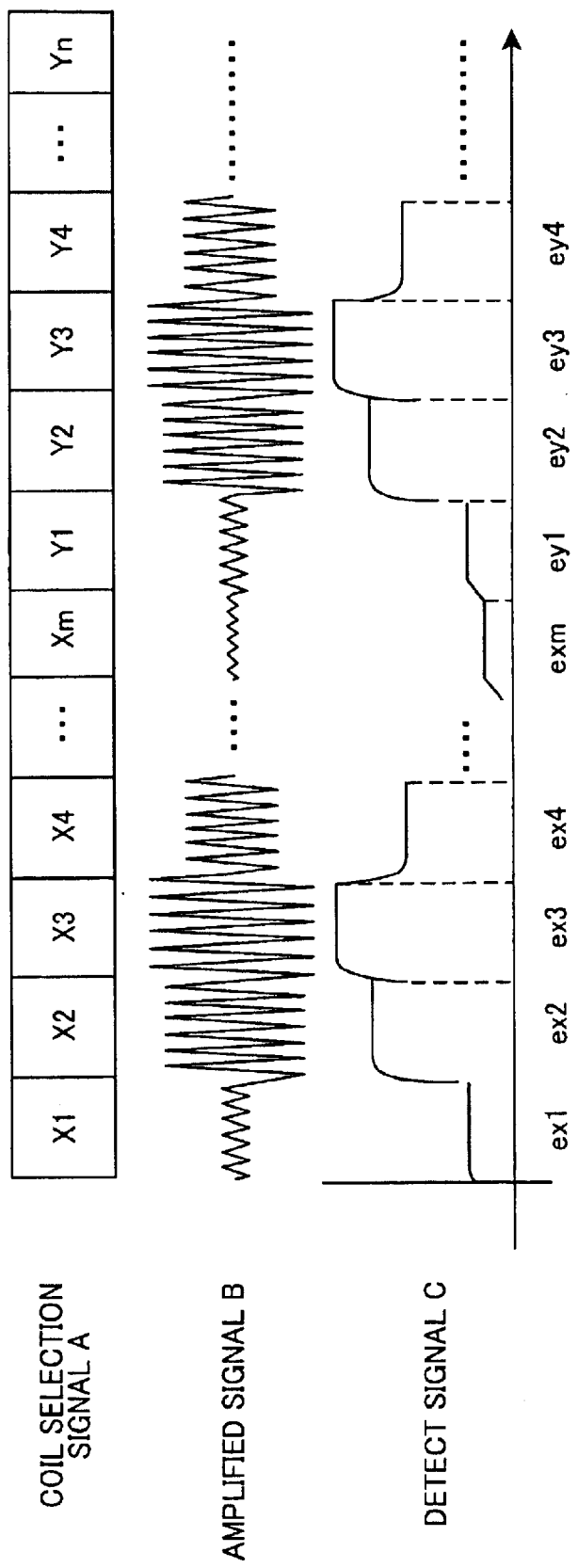

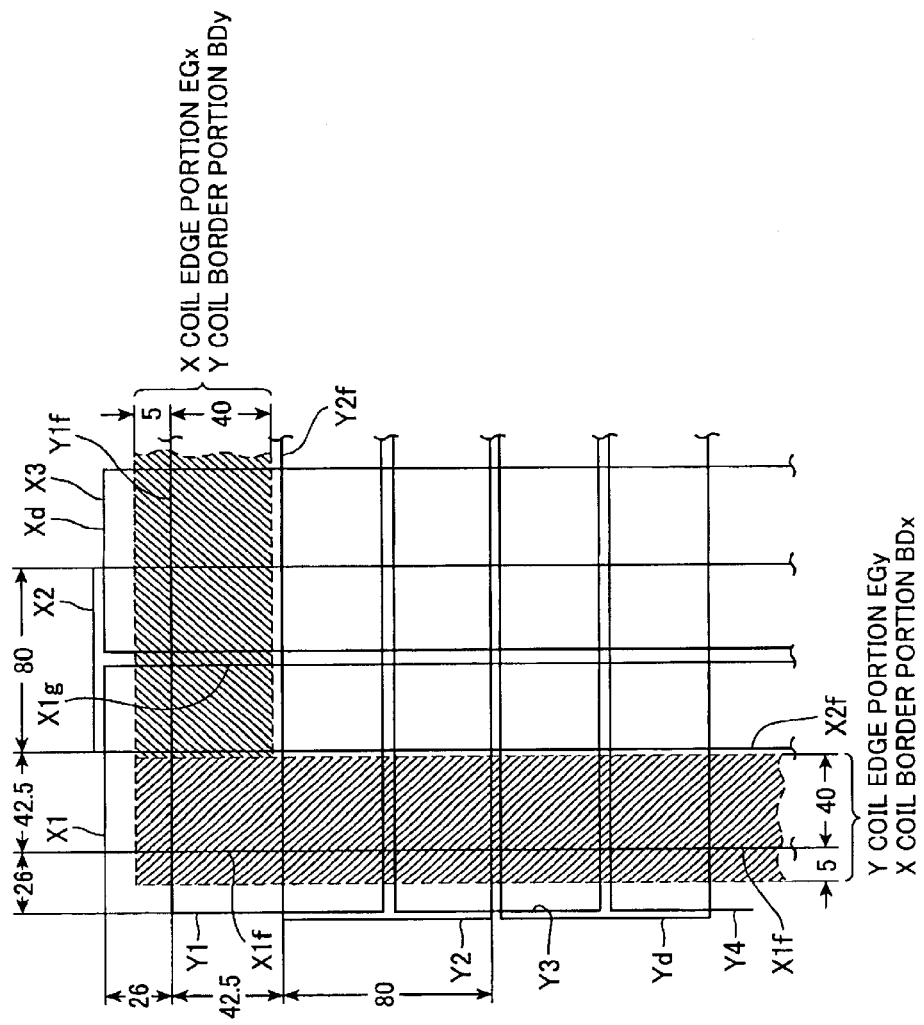

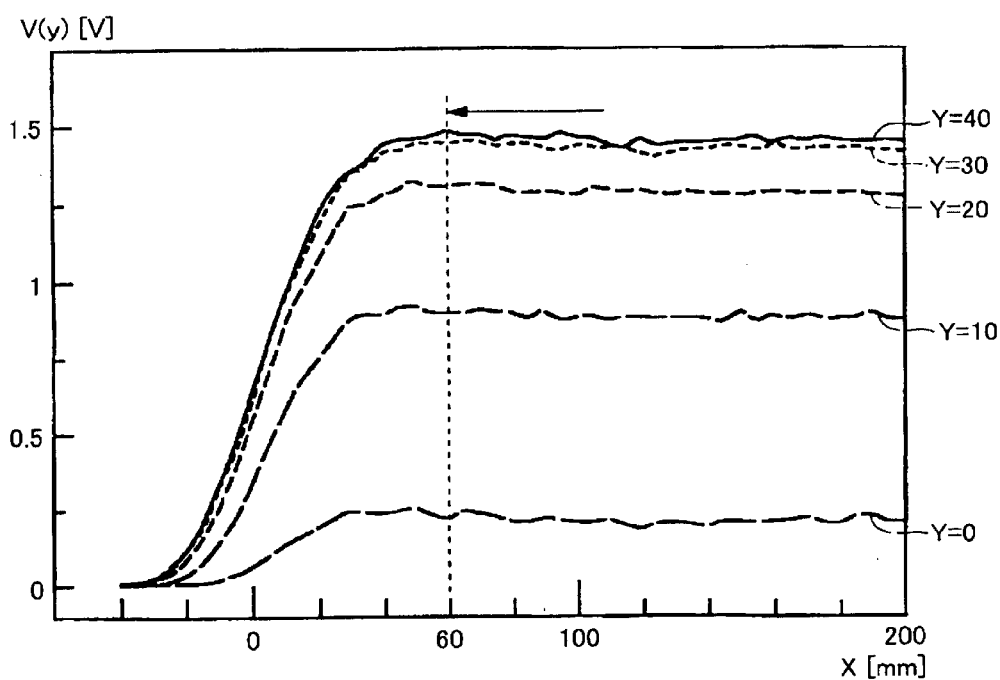

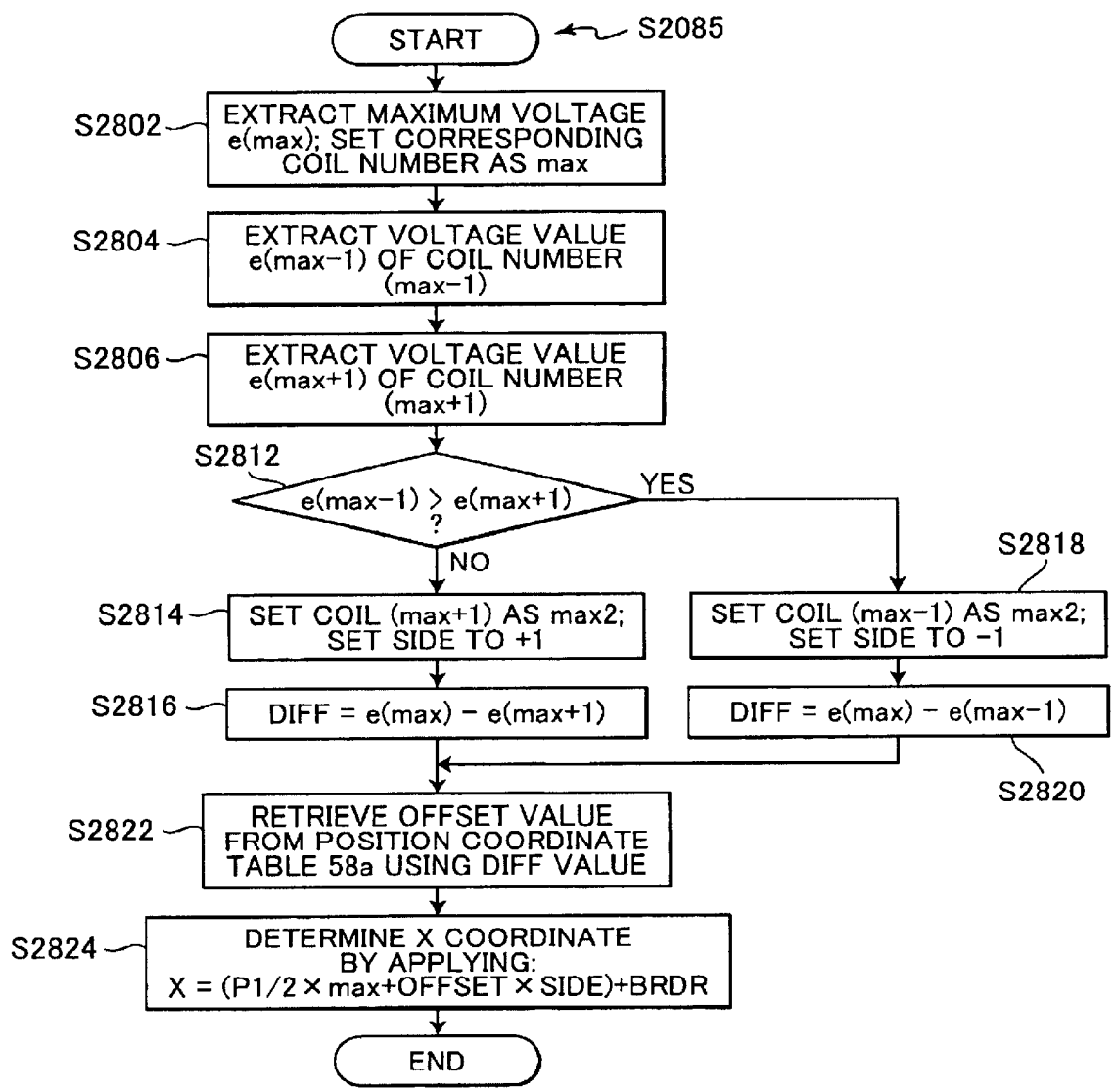

PEN ATTRIBUTE DETECTION ROUTINE 2

COORDINATE READING DEVICE

BACKGROUND OF THE INVENTION

1. Field of the Invention

The present invention relates to a coordinate reading device.

2. Description of Related Art

Various types of coordinate reading device have been proposed. Representative examples of the conventional coordinate reading device are disclosed in Japanese Patent Application Publication (Kokai) Nos. HEI-5-165560, HEI-2-190199, HEI-8-202491, and HEI-5-143224 and in Japanese Patent Application Publication (Kokoku) No. SHO-58-16507.

Japanese Patent Application Publication (Kokoku) No. SHO-58-16507 describes one type of the coordinate reading device. As shown in FIG. 1, the coordinate reading device of this type has a tablet provided with a sense loop (conductive wire) 391. The sense loop 391 is mounted on the tablet so as to extend following a rectangular-wave shape. The coordinate reading device detects the position of a pen or position indication unit that is mounted with a magnetic coil 390. A correction sense loop 392 is additionally provided around the sense loop 391. The sense loop 391 generates an induction signal due to magnetic coupling with a magnetic field generated at the magnetic coil 390. The induction signal, however, may receive influence from the peripheral portion of the sense loop 391. According to this coordinate reading device, such a portion of the induction signal that receives the influence is canceled out by the induction signal generated by the correction loop 392 so that an error in the positional coordinates of the pen at the periphery portion can be corrected.

Japanese Patent Application Publication (Kokai) No. HEI-2-190199 discloses a coordinate detecting device that calculates positional coordinates of a pen or position indication unit by obtaining the number of pulses obtained from the outputs of a conductive wire. When the indication device is positioned at an edge portion of the coordinate detecting device, the positional coordinates are corrected by adding or subtracting a predetermined pulse number from the obtained pulse numbers.

However, the coordinate reading device disclosed in Japanese Patent Application Publication (Kokai) No. SHO-58-16507 has a problem in that efficiency of manufacturing the tablet is low because extra operations are required to mount the correction loop 392 around the sense loop 391. Also, because the correction loop 392 has to be provided around the sense loop 391, the surface area of the coordinate input sheet where the correction loop 392 is provided cannot be used for detection, but is wasted in vain.

The coordinate retrieval device described in Japanese Patent Application Publication (Kokai) No. HEI-2-190919 has a problem in that circuitry for counting the number of pulses and for adding or subtracting pulse number has to be provided.

SUMMARY OF THE INVENTION

FIG. 2(a) is a configuration of a conceivable coordinate reading device. The conceivable coordinate reading device includes: a tablet 91, a scanning circuit 92, and a detection circuit 90. The tablet 91 is provided with a plurality of X sense coils (conductive wires) X1 to Xm and Y sense coils (conductive wires) Y1 to Yn. The X sense coils X1 to Xm are for detecting X coordinates of a pen 400, the Y sense coils Y1 to Yn are for detecting Y coordinates of the pen 400. The scan circuit 92 is for serially scanning the sense coils X1–Xm and Y1–Yn on the tablet 91. The detection circuit 90 is for calculating the x and y coordinates of the pen by detecting induction signals generated at the sense coils X1–Xm and Y1–Yn.

The pen or position indication unit 400 includes a coil 401 that generates an alternating magnetic field. When the pen 400 contacts the tablet 91, some sense coils that are located near to the pen 400 generate induction signals 97 due to magnetic coupling with the alternating magnetic field from the coil 401. The induction signals 97 are inputted into the detection circuit 90. The induction signals 97 are amplified at an amplifier 93 and then its amplitude is detected at an amplitude detection circuit 94. Next, an A/D conversion circuit 95 converts the measured amplitude into digital values, and outputs the digital values to a CPU 96. The CPU 96 calculates the positional coordinate of the pen 400 based on the inputted digital values from the A/D conversion circuit 95. For example, the CPU 96 may refer to a table that stores a relationship between a plurality of digital values and coordinate positions. The CPU 96 selects a positional coordinate that corresponds to the digital values presently inputted from the A/D conversion circuit 95.

FIG. 2(b) is a graph showing the relationship how the voltage generated at the sense coil Y1 changes when the position of the electric pen 400, defined as the distance D from the edge Y1d of the sense coil Y1, changes. As shown in FIG. 2(b), when the pen 400 is located at a position P1 in the sense coil Y1, the sense coil Y1 generates voltage value V1. However, the closer the pen 100 is to the lengthwise end (short side Y1d) of the sense coil Y1, the generated voltage value V is effected by the induction signal from the short side Y1d. The voltage V rises, and the voltage value increases from V1 to V2 when the pen 400 is at position P2. The closer the pen 400 is to the short side Y1d from the position P2, however, the voltage value V drops.

As can be seen, in this conceivable technology, the voltage detected by the detection circuit 90 changes as the pen goes near to the edges of the tablet 91. It is impossible to accurately detect the position of the pen when the pen is located near to the edges of the tablet 91. The range of the tablet that can be used for accurate detection is narrower than it is desired.

Japanese Patent-Application Publication No. HEI-8-202491 discloses decreasing the width of the sense coils at their edge portions. Japanese Patent-Application Publication No. HEI-5-143224 discloses using a sub loop. However, with both of these methods, the configuration at the edge portions becomes quite complicated, or the number of coils need to be increased, which also complicates the configuration.

Additionally, in the conceivable technology of FIG. 2(a), the voltage detected by the detection circuit 90 increases as the pen goes near to the edges of the tablet 91. When the pen 400 is located near to some edge of the tablet 91, therefore, the digital amplitude value outputted from the A/D conversion circuit 95 will increase. Therefore, the burden on the CPU 96 increases. Also, the dynamic range of the amplifier 93 has to be broadened to match the voltage values at the edge portions of the tablet 91.

In view of the above-described drawbacks, it is an objective of the present invention to provide an improved coordinate reading device that has a simple configuration but that is capable of accurately reading coordinates of a target (alternating magnetic field generating unit), even when the target is located at some edge portion of the coordinate reading device.

In order to attain the above and other objects, the present invention provides a coordinate reading device reading a coordinate of a position of a target which generates an alternating magnetic field, the coordinate reading device comprising: a base member; a plurality of loop wires provided on the base member, each loop wire being capable of producing an electric signal in response to an alternating magnetic field generated from a target, each loop wire having at least one edge portion; a detection unit that detects levels of the signals generated from the plurality of loop wires, thereby determining a coordinate of the position of the target; and a correction unit correcting the coordinate of the position of the target when the target is located in each of the at least one edge portion of some loop wire.

The correction unit may correct each loop wire to produce a corrected signal when the target is located in each of the at least one edge portion of some loop wire. The base member may have a front surface, a rear surface, a pair of opposite side surfaces, each of which connects the front surface and the rear surface, a pair of opposite edges being defined between the front surface and the pair of side surfaces, the target being located on the side of the front surface. Each loop wire may be provided on the front surface, and has a pair of first sides that extend on the front surface and a pair of second sides connecting the pair of first sides therebetween, a pair of edge portions corresponding to the pair of second sides. In this case, the correction unit may provide each of the pair of second sides on either one of the corresponding side surface and the rear surface by bending the first side at the corresponding edge of the base member in a direction toward the rear surface.

The correction unit may correct the detection unit to determine a corrected coordinate of the target. The plurality of loop wires may include a plurality of first loop wires and a plurality of second loop wires, the plurality of first loop wires being arranged in a predetermined first direction with a predetermined pitch, the plurality of second loop wires being arranged in a predetermined second direction with the predetermined pitch, the plurality of first loop wires having a pair of edge portions along the second direction, the plurality of second loop wires having a pair of edge portions along the first direction. The detection unit may include: a signal level detection unit that detects the levels of the signals produced by the first and second loop wires; and a coordinate determination unit that is capable of determining the coordinates, along the first and second directions, of the position of the target based on the detected signal levels. In this case, the correction unit may include: judging means that judges, based on the determined coordinate along either one of the first and second directions, whether the target is within one of the pair of edge portions in the other one of the first and second loop wires; and coordinate correction unit that corrects, when the target member is judged to be located in one edge portion of the other one of the first and second loop wires, the coordinate of the target along the other one of the first and second directions using a correction value whose value corresponds to the coordinate of the target along the either one of the first and second directions.

BRIEF DESCRIPTION OF THE DRAWINGS

The above and other objects, features and advantages of the invention will become more apparent from reading the following description of the preferred embodiments taken in connection with the accompanying drawings in which:

FIG. 9 is a block diagram showing an electrical configuration of the electronic white board;

FIG. 11(a) is a graph representing a position coordinate table 58a;

FIG. 11(b) is a structure of the position coordinate table 58a;

FIG. 11(c) illustrates how the detected voltage values from the coils are stored in a voltage value storage area 58b;

FIG. 14 is a flowchart of a coordinate reading process of S300 in FIG. 13;

FIG. 16 shows an example of the position coordinate table;

FIG. 30 illustrates a correction table 58b;

FIG. 38 shows the relationship between the pen attributes and modulation frequencies fm;

FIG. 39(b) illustrates signals A, B, and C in the block diagram of FIG. 39(a);

FIG. 41(a) illustrates the relationship between the output signal from the CR oscillation circuit 69e, the output signal from the LC oscillation circuit 69c, the output signal from the limitter circuit 54, and the counter value K by the counter circuit 55a;

FIG. 44 is an enlarged view of a portion of the sense coils;

FIG. 47 illustrates a border table 58c;

FIG. 48 shows how the voltage V(y) volts induced by the Y coil Y1 changes when the pen 60 moves along several different imaginary lines that extend along the X axis;

FIG. 55 is a flowchart of the X coordinate calculating process of S2085 in FIG. 54;

DETAILED DESCRIPTION OF THE PREFERRED EMBODIMENTS

Figure 1:
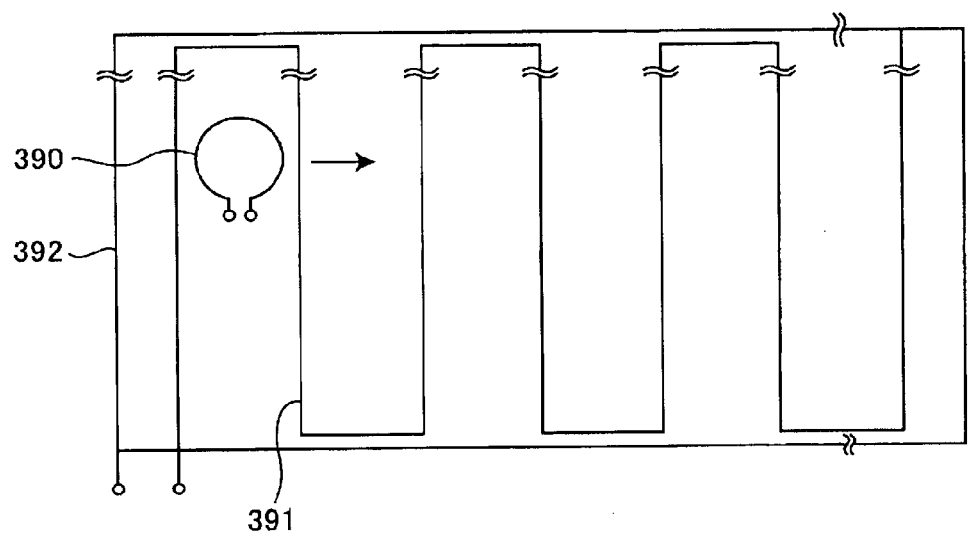
FIG. 1 illustrates a conventional coordinate reading device, which has a tablet provided with a sense loop, and an excitation coil provided in a pen.
Figure 2A:
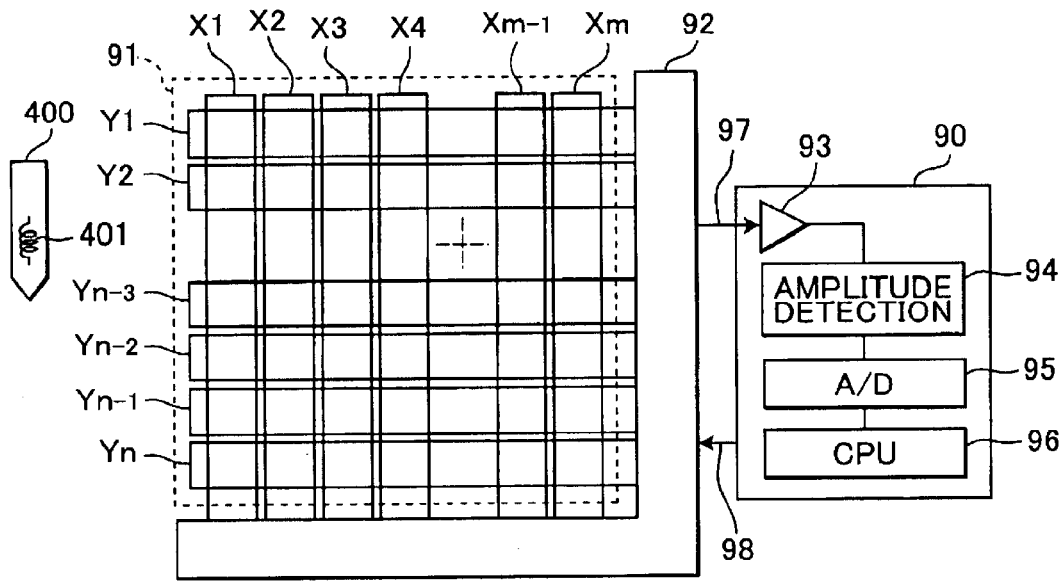
FIG. 2(a) is a configuration of a conceivable coordinate reading device.
Figure 2B:
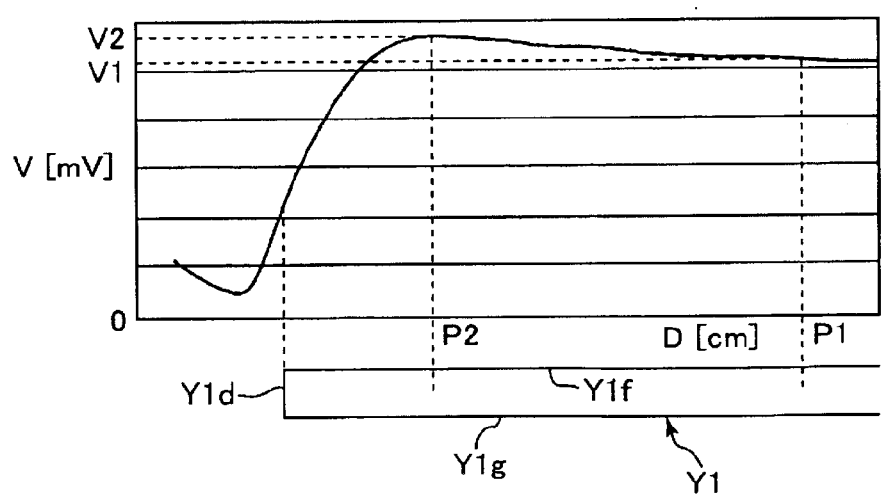
FIG. 2(b) is a graph showing the relationship between the voltage, generated at a sense coil, and the distance of the electric pen from an edge of the sense coil.

A coordinate reading device according to preferred embodiments of the present invention will be described while referring to the accompanying drawings wherein like parts and components are designated by the same reference numerals to avoid duplicating description.

<First Embodiment>

A coordinate reading device according to a first embodiment will be described below with reference to FIGS. 3 to 26.

The coordinate reading device of the present embodiment is an electronic white board. A pen is used to draw images such as characters and/or figures on the electronic white board, whereupon the electronic white board electrically reads the drawn images and stores data of the read images therein.

Next, the configuration of the electronic white board 1 will be described while referring to FIGS. 3 and 4.

Figure 3:
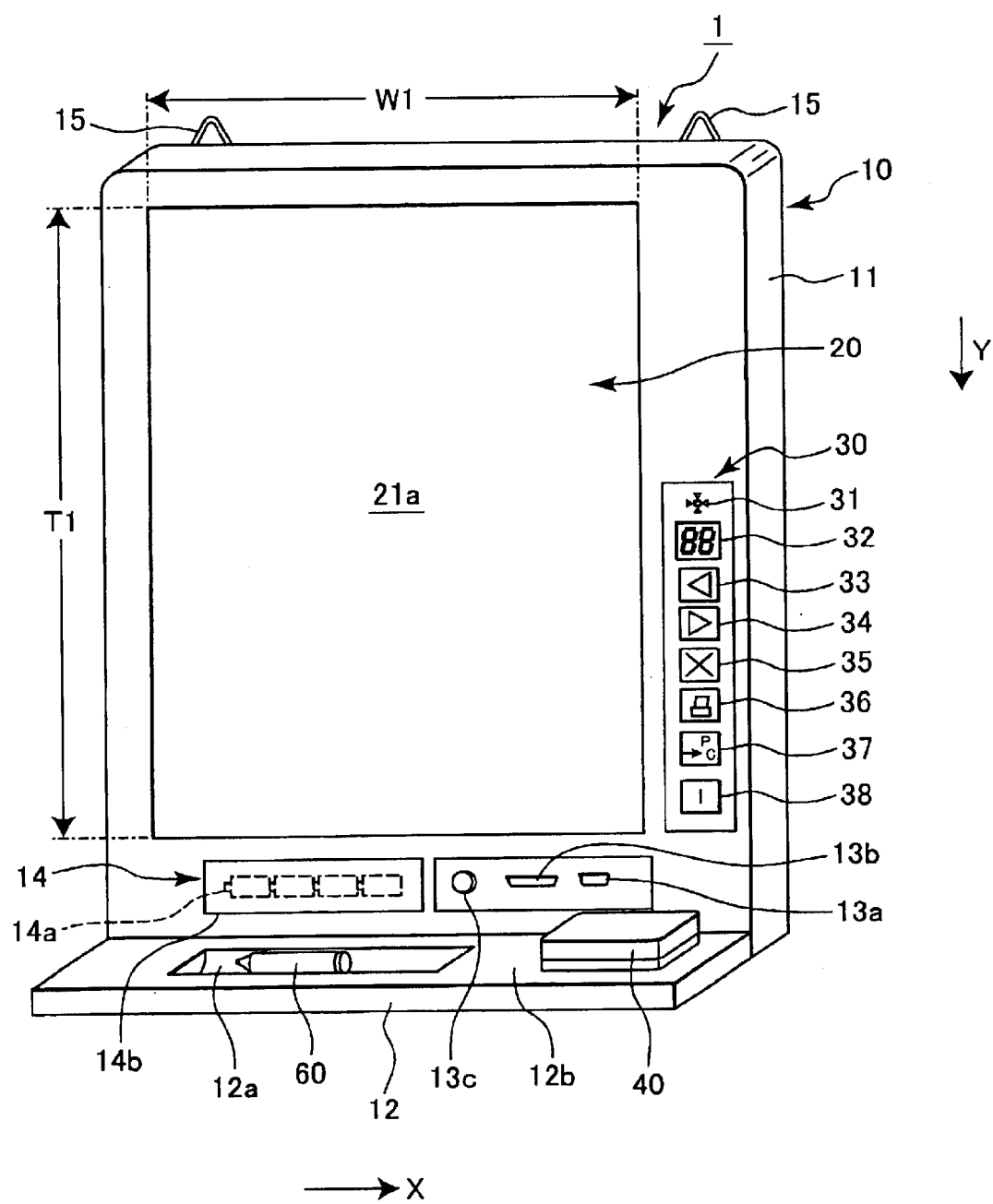
FIG. 3 is an external perspective view illustrating an essential configuration of an electronic white board according to a first embodiment of the present invention.
Figure 4:
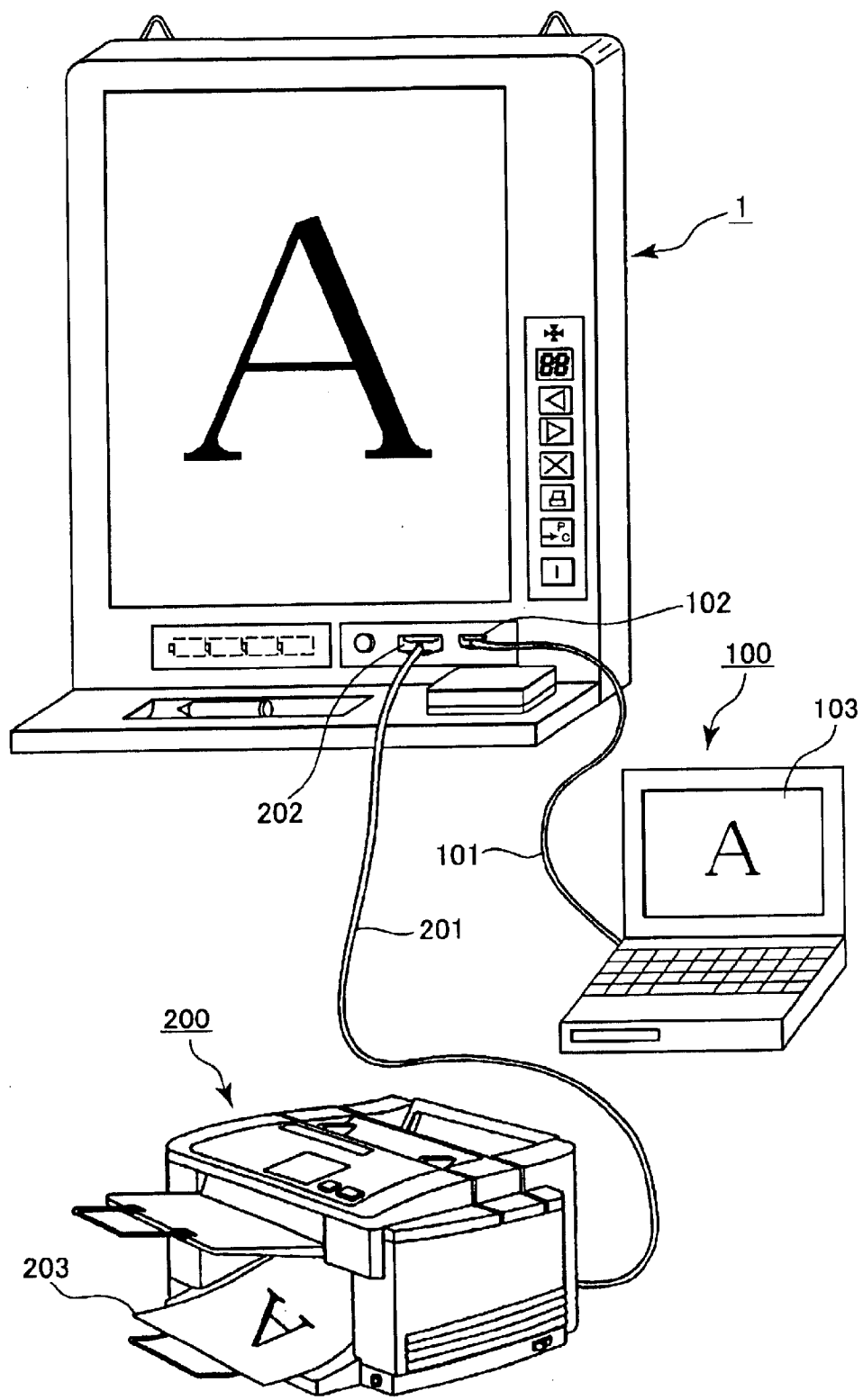
FIG. 4 is an illustration showing the electronic white board of FIG. 3 being electrically connected to a personal computer (PC) and a printer.

As shown in FIG. 3, the electronic white board 1 has a writing panel 10. A pen 60 and an eraser 40 are provided to the electronic white board 1. The pen 60 is for writing images, such as characters and/or figures, on the writing panel 10 and for allowing the electronic white board 1 to store data indicative of the written images. The eraser 40 is for erasing the written images from the writing panel 10 and also for erasing the data indicative of the written images. The electronic white board 1 can be electrically connected to a personal computer (PC) 100 and a printer 200 as shown in FIG. 4.

Next, the configuration of the writing panel 10 will be described in greater detail below.

As shown in FIG. 3, the writing panel 10 includes a frame 11. A panel main body 20 is assembled within the frame 11. The panel main body 20 has a writing surface 21a, on which images, such as characters and/or figures, can be written by the pen 60. A plate-shaped stand 12 is attached to a lower and surface of the frame 11 and extends frontwardly from the frame 11. A concave 12a having a semicircular cross-section is formed in the upper surface of the stand 12 for supporting the pen 60. A flat portion 12b is formed to the right of the concave 12a. The eraser 40 is placed on the flat portion 12b.

An operation portion 30 to provided at the right side of the front surface of the frame 11. The operation portion 30 includes: a speaker 31, a page number display LED 32, a page reverse button 33, a page forward button 34, an erase button 35, a print output button 36, a PC output button 37, and a power button 38.

The speaker 31 is for reproducing sounds such as operation, sounds and warning sounds. The page number display LED 32 is constructed from a seven-segmented LED to display the number of pages of images, which are written on the writing surface 21a and whose data (which will be referred to as "written data" hereinafter) is stored in the electronic white board 1. The page reverse button 33 is used by a user to return one page at a time each time it is pressed. The page forward button 34 is used also by the user to feed one page at a time each time it is pressed. The erase button 35 is used to erase one page's worth of written data at a time each time it is pressed. The printer output button 36 is pressed to output the written data to the printer 200. The PC output button 37 is pressed to output the written data to the PC 100. The power button 38 is pressed by the user to start and stop operation of the electronic white board 1.

A battery case 14 is provided at the lower portion on the front surface of the frame 11. The battery case 14 is for storing four C batteries 14a, for example, which serve as a power source of the electronic white board 1. A lid 14b is openably and closably attached to the front surface of the battery case 14. A volume adjustment knob 13c is provided to the right of the battery case 14. The volume adjustment knob 13c is for adjusting volume of the sounds outputted from the speaker 31. A pair of connectors 13a and 13b are provided to the right of the volume adjustment knob 13c. As shown in FIG. 4, a plug 202 of a connection cable 201 from the printer 200 is connected to the connector 13b. A plug 102 of another connection cable 101 from the PC 100 is connected to the connector 13a. Thus, the written data indicative of the content written on the writing surface 21a can be outputted to the PC 100. Accordingly, the user can view the content written on the electronic white board 1 using a monitor 103 provided on the PC 100. The written data can also be outputted to the printer 200 so that the content written on the electronic white board 1 can be printed on a print sheet 203.

Next, the configuration of the panel main body 20, which is housed within the frame 11, will be described in greater detail. The panel main body 20 is housed within the frame 11. The panel main body 20 may be produced into any flexible or non-flexible sheet or plate shape.

Figure 5:
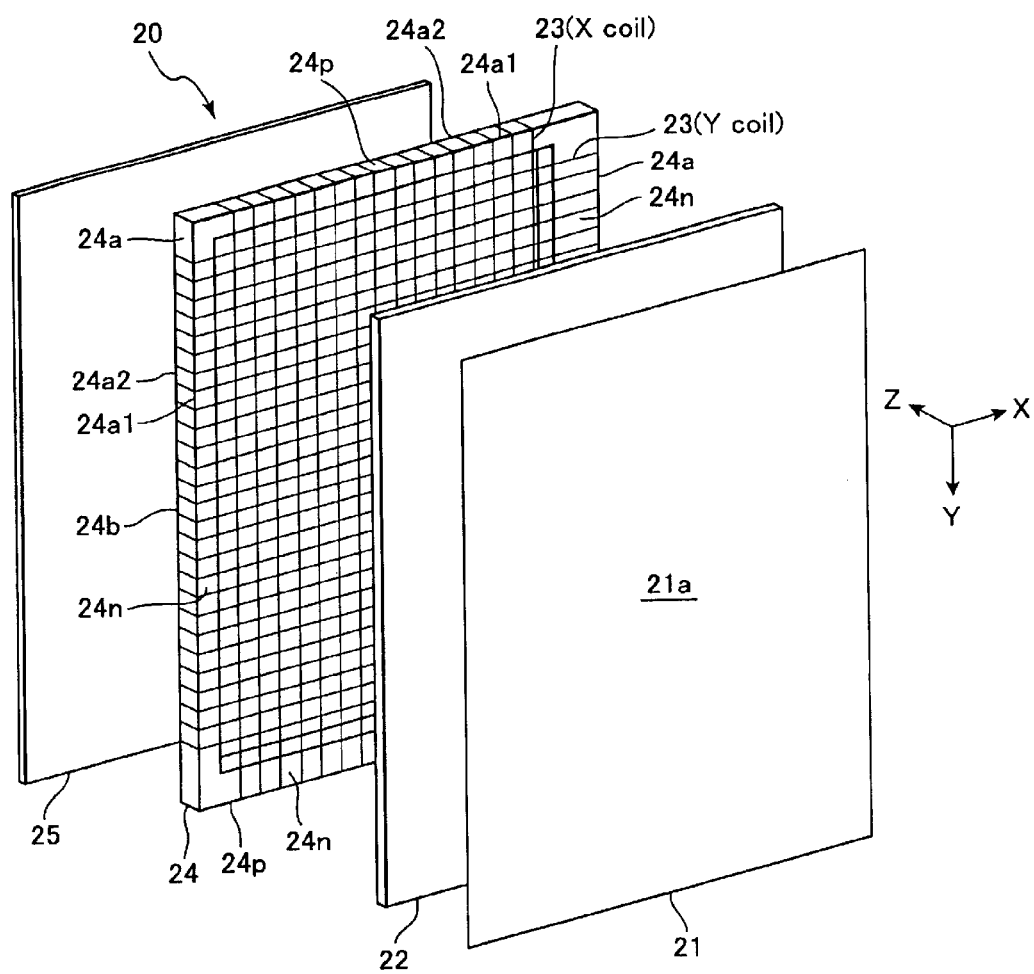
FIG. 5 is an exploded perspective view showing the components of panel main body provided within the electronic white board.

FIG. 5 is an exploded perspective view showing the components of the panel main body 20. The panel main body 20 includes: a writing sheet 21, a plate-shaped panel 22, a frame-shaped attachment panel 24, and a plate-shaped back panel 25, all of which are mounted one on another in this order. The writing sheet 21 has the writing surface 21a on its one surface. The frame-shaped attachment panel 24 is provided with a plurality of sense coils (loop wires) 23 as will be described later. The plate-shaped back panel 25 is for blocking noises.

According to the present embodiment, the writing sheet 21 is made from several sheets of polyethylene terephthalate (PET) film which are attached together into a thickness of 0.1 mm. The panel 22 is formed to a thickness of 3.0 mm from acryl resin, acrylonitrile-butadiene-styrene copolymer (ABS), or polycarbonate (PC). The attachment panel 24 is formed to a thickness of 40 mm, for example, from a foam resin material such as cellular styrene. The back panel 25 is formed to a thickness of about 1 mm from electrically-conductive material such as aluminum. The overall thickness of the frame 11 that sandwiches all the components of the panel main body 20 is formed to a thickness of 50 mm.

As shown in FIG. 3, hooks 15, 15 are attached, at both sides, to the upper end of the back surface of the frame 11. Those hooks 15, 15 are used to hang the electronic white board 1 on the wall. According to the present embodiment, the writing surface 21a has a height T1 of 900 mm and a width W1 of 600 mm, for example. The frame 11 and the stand 12 are formed to light weight by synthetic resin such as polypropylene (PP). The total weight of the electronic white board 1 is less than 10 kg.

The electronic white board 1 can transmit the written data. Indicative of the images written on the writing surface 21a, to other electronic white boards 1 and other personal computers.

Figure 6:
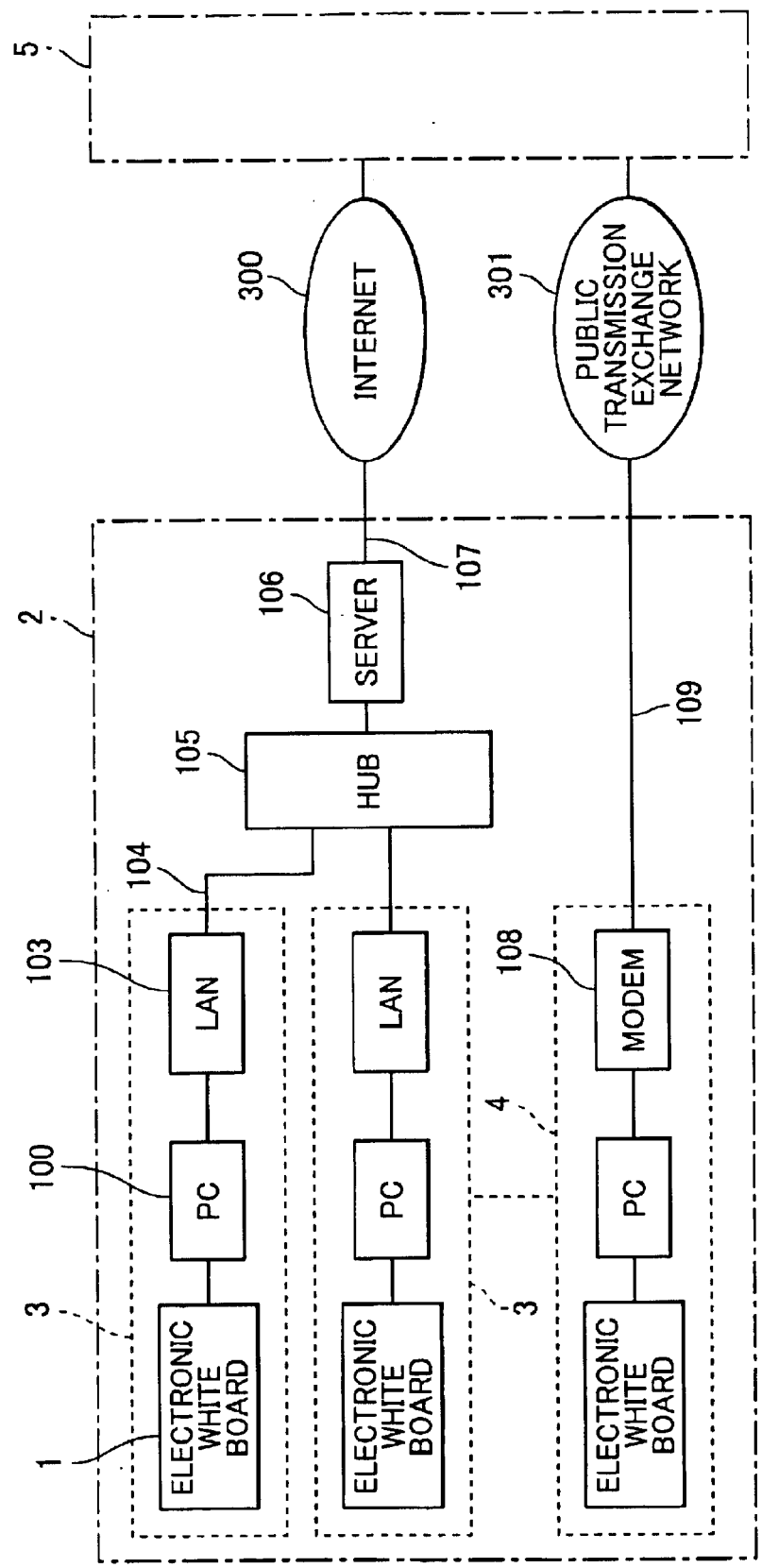
FIG. 6 is a block diagram showing configuration of a network for communicating written data between the electronic white board and other electronic white boards.

FIG. 6 is a black diagram showing configuration of a network for communicating written data between one electronic white board 1 and other electronic white boards and/or personal computers. In this example, it is assumed that a plurality of electronic white boards 1 are provided in a plurality of different rooms within the same company 2 and are provided also in other companies 5 and that written data is communicated between the plurality of rooms and also between different companies.

The company 2 includes several rooms 3 and one room 4. Each of the rooms 3, 4 includes the electronic white board 1 and the personal computer 100 in electrical connection with each other as shown in FIG. 4. In each room 3, the personal computer 100 is connected to a corresponding LAN board 103. The personal computer 100 in the room 4 is connected to a modem 108. The LAN board 103 provided to each room 3 is connected to a hub 105 by a corresponding LAN cable 104. The hub 105 is connected to a server 106. The server 106 can be connected to other companies 5 through the Internet 300. The modem 108 in the room 4 can be connected to other companies 5 through a telephone line 109 and a public communication exchange network 301. Although not shown in the drawings. the other companies 5 have the electronic white boards 1 that can perform communication with personal computers 100 in the same manner as in the company 2.

In the network having the above-described arrangement, written data stored in the electronic white board 1 in one room 3 is transmitted from the electronic white board 1 to the personal computer 100 via the connection cable 101, and then to the personal computer 100 in another designated room 3 through the LAN board 103 and the hub 105. A user that receives the written data can view the content of the received data by displaying the received data on the monitor 103 of the personal computer 100 or by printing out the received data onto a sheet using the printer 200 that 18 is connected to the personal computer 100.

The written data can be transmitted also to other companies 5 from the server 106 across the Internet 300 as an image file, in Tag Image File Format (TIFF), appended to an e-mail message. In this case, the other companies 5 can view the content of the written data by decoding the image file, appended to the e-mail message, transmitted from the company 2.

Figure 7A:
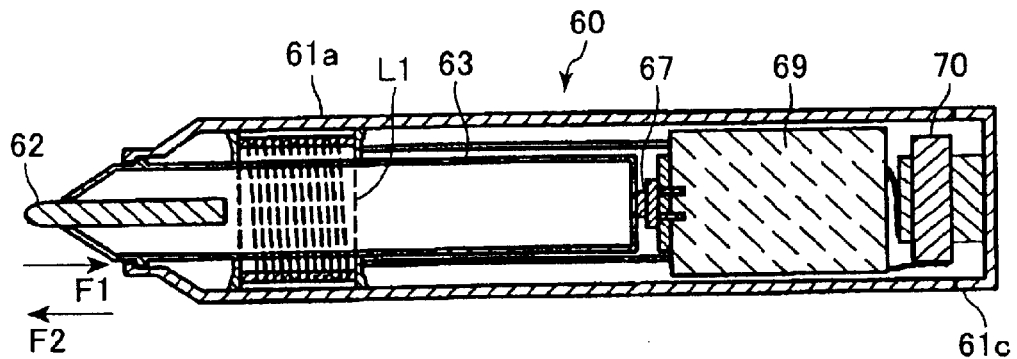
FIG. 7(a) is a cross-sectional view showing internal configuration of the pen 60.
Figure 7B:
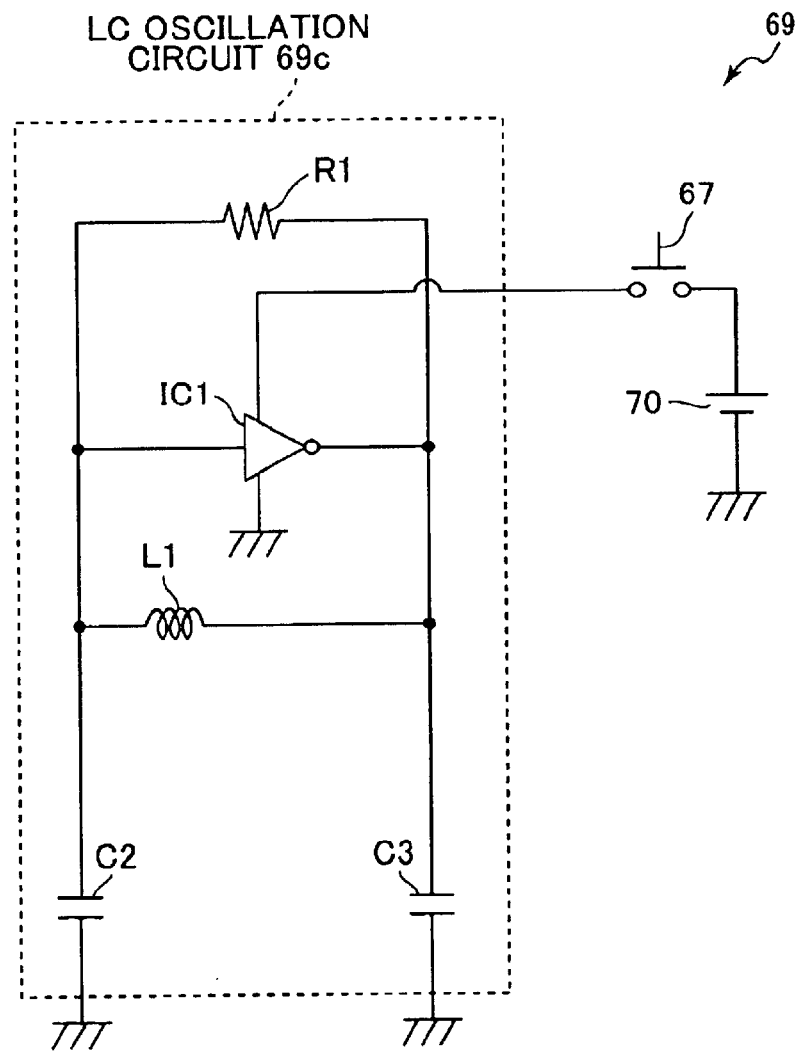
FIG. 7(b) is a circuit diagram showing electric configuration of the pen 60.

Next, essential configuration of the pen 60 will be explained while referring to FIGS. 7(a) and 7(b). FIG. 7(a) is a cross-sectional view showing internal configuration of the pen 60. FIG. 7(b) is a circuit diagram showing electric configuration of the pen 60.

As shown in FIG. 7(a), the pen 60 includes a cylindrical body 61a and a lid 61c which is detachably attached to one end of the body 61a. The body 61a houses a coil L1, an ink cartridge 63, a pen tip 62, a circuit board 69, and a battery 70. The ink cartridge 63 stores ink and is removable in a direction indicated by an arrow F2. The pen tip 62 is inserted into the ink cartridge 63. The circuit board 69 serves as an oscillation circuit for oscillating the coil L1 to generate an alternating magnetic field. The battery 70 serves as a power source for supplying electric power to the circuit board 69.

The coil L1 has a ring shape and is formed from a plurality of turns of windings. The coil L1 is mounted inside the pen 60 so that the coil L1 will be separated by some distance from the tip of the pen tip 62 when the tip of the pen tip 62 abuts against the writing surface 21a of the writing panel 10.

A push button switch 67 is provided between the ink cartridge 63 and the circuit board 69. The push button switch 67 is for supplying electric power from the battery 70 to the circuit board 69, and also for terminating supply of the electric power to the circuit board 69. When the pen tip 62 is pressed against the writing surface 21a, the ink cartridge 63 moves in a direction indicated by an arrow F1, as a result of which the push button switch 67 turns ON. When the pen tip 62 is separated away from the writing surface 21a, the ink cartridge 63 moves in the direction indicated by the arrow F2 by a spring (not shown) provided within the push button switch 67. As a result, the push button switch 67 turns OFF. Thus, an alternating magnetic field is generated from the coil L1 only when the pen 60 is pressed against the writing surface 21a to draw images such as characters and/or figures on the writing surface 21a.

As shown in FIG. 7(b), the circuit board 69 in the pen 60 includes an LC oscillation circuit 69c for oscillating the coil L to generate an alternating magnetic field (carrier wave), whose oscillation frequency is determined by capacitances of the condensers C1, C2, C3, the resistance of the resistor R1, and inductance of the coil L1.

With the above-described structure, when the push button switch 67 is turned ON, electric power from the battery 70 is supplied to the entire circuitry. Upon receipt of the electric power, the coil L1 oscillates to generate an alternating magnetic field.

The eraser 40 shown in FIG. 3 also houses a coil, an oscillating circuit for oscillating the coil, and a battery that supplies electric power to the oscillating circuit. The coil generates an alternating magnetic field when being oscillated by the oscillating circuit.

Figure 8A:
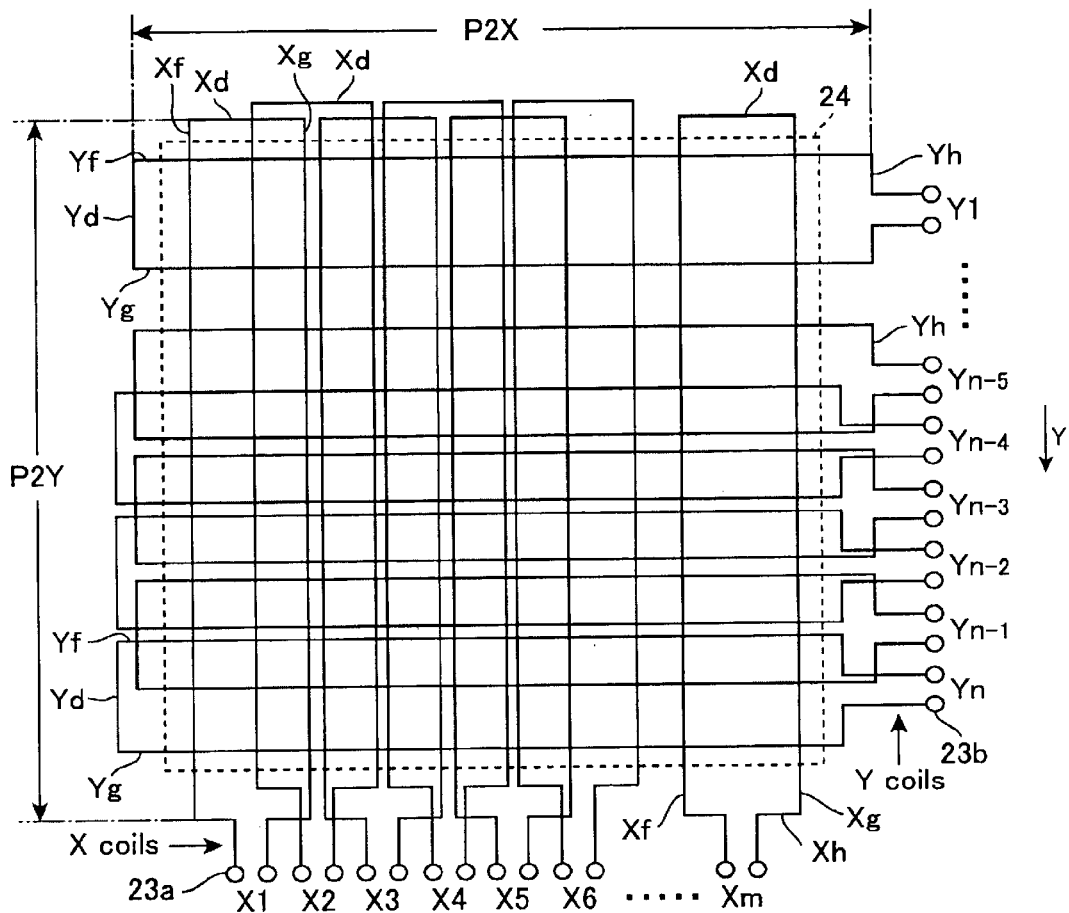
FIG. 8(a) illustrates how a plurality of sense coils 23 are arranged on the attachment panel 24 while omitting a part of the sense coils.
Figure 8B:
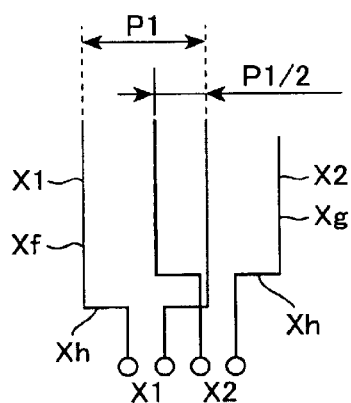
FIG. 8(b) illustrates a width of the sense coils 23 and a pitch, by which the sense coils 23 are arranged while being partly overlapped with one another.

As shown in FIGS. 5 and 8(a) and 8(b), the attachment panel 24 in the writing panel 10 is provided with the plurality of sense coils (loop wires or loop coils) 23. The sense coils 23 are for producing signals by magnetic coupling with the alternating magnetic field generated from the coil L1 in the pen 60 or generated from the coil in the eraser 40. The electronic white board 1 uses the signals thus produced by the sense coils 23 to determine the position of the pen 60 or the eraser 40. Thus. the electronic white board 1 can read the coordinates of successive points of images drawn by the pen 60 and can read the coordinates of points to be erased by the eraser 40. For example, each sense coil 23 is formed from a copper wiring that has a diameter of 0.35 mm and that is covered with an insulation film of enamel layer or nichrome plating layer, for example, on its outer surface.

The sense coils 23 include a plurality of X sense coils 23 and a plurality of Y sense coils 23 which are arranged on the attachment panel 24 as shown in FIG. 8(a). The plurality of X sense coils 23 are arranged in a direction of a predetermined X axis. As shown In FIG. 3, the X axis extends horizontally when the writing panel 10 is being used. In this example, as shown in FIG. 8(a), X coils X1 to Xm are disposed following the direction of the X axis. The total number of the X coils is "m" wherein "m" is an integer greater than one (1). The X coils X1 to Xm are for detecting the X coordinate in the coordinates (X, Y) of the pen 60 or the eraser 40 on the writing surface 21a.

The plurality of Y sense coils 23 are arranged in a direction of a predetermined Y axis that is perpendicular to the X axis. AS shown in FIG. 3, the Y axis extends vertically when the writing panel 10 is being used. As shown in FIG. 8(a). in this example, Y coils Y1 to Yn are arranged along the Y axis. The total number of the Y coils is "n" where "n" is an integer greater than one (1). The Y coils Y1 to Yn are for detecting the Y coordinate in the coordinates (X, Y) of the pen 60 or the eraser 40.

Each of the X and Y coils 23 is formed in a loop-shaped coil with a single turn and has approximately a rectangular shape as shown in FIG. 8(a). Thus, each coil 23 has a pair of short sides that are located opposite to each other, and a pair of long sides that extend between the pair of short sides.

More specifically, each of the X coils X1–Xm has: a pair of short sides Xd and Xh that are located opposite to each other, and a pair of long sides Xf and Xg that extend between the pair of short sides Xd and Xh. Each of the Y coils X1–Yn has: a pair of short sides Yd and Yh that are located opposite to each other, and a pair of long sides Yf and Yg that extend between the pair of short sides Yd and Yh. The short side Xh of each X coil X1–Xm is connected to a pair of coil terminal 23a, and the short side Yh of each Y coil Y1–Yn is connected to a pair of coil terminal 23b.

Each of the X coils 23 has a length of P2Y in the lengthwise direction of the rectangular shape. In other words, the long sides Xf and Xg of each X coil 23 has the length of P2Y. Each of the Y coils 23 has a length of P2X in the lengthwise direction of the rectangular shape. In other words, the long sides Yf and Yg of each Y coil 23 has the length of P2X.

As shown in FIG. 8(b), each of the X and Y coils 23 has a width of the same amount P1. Thus, each X coil 23 has a length P2Y along its long sides Xf and Xg, and has a width P1 along its short sides Xd and Xh. Each Y coil 23 has a length P2X along its long sides Yf and Yg, and has a width P1 along its short sides Yd and Yh. Adjacent X coils 23 are arranged along the X axis to overlap with one another by a half of the width P1, that is, P1/2. Similarly, adjacent Y coils 23 are arranged along the Y axis to overlap with one another also by a half of the width P1, that is, P1/2.

It is noted that in FIG. 8(a), for clarity and simplicity, the sides of the coils 23 are shifted from one another. However, actually, they are arranged to overlap with one another. For example, the long sides X1g, X2g, ..., and Xm–2g of the X coils X1, X2, ..., Xm–2 overlap with long sides X3f, X4f, ..., Xmf of X coils X3, X4, ..., Xm, respectively. Similarly, the long sides Y1g, Y2g, ..., and Yn–2g of the Y coils Y1, Y2, ..., Yn–2 overlap with long sides Y3f, Y4f, ..., Ynf of Y coils Y3, Y4, ..., Yn, respectively. Also, the pair of terminals 23a for each X coil 23 are configured to have the minimum interspacing therebetween. Similarly, the pair of terminals 23b for each Y coil 23 are configured to have the minimum interspacing therebetween.

As shown in FIG. 9, the pair of coil terminals 23a for each X coil 23 is connected to an X coil switching circuit 50a that is provided in a control portion 50 of the electronic white board 1. Similarly, the pair of coil terminals 23b for each Y coil 23 is connected to a Y coil switching circuit 50b that is also provided in the control portion 50 of the electronic white board 1.

Next, electrical configuration of the control portion 50 will be described while referring to the block diagram of FIG. 9.

The electronic white board 1 includes the control device 50 that is internally provided in the writing panel 10. The control device 50 includes: the X coil switching circuit 50a for switching the X coils X1 to Xm in this order to successively scan the X coils X1 to Xm; and a Y coil switching circuit 50b for switching the Y coils Y1 to Yn in this order to successively scan the Y coils Y1 to Yn. Although not shown in the drawing, each circuit 50a, 50b includes a switching element such as a transistor (MOS FET, for example).

The control portion 50 further includes: an amplifier 50c, an amplitude detection circuit 51, an analog-to-digital (A/D) conversion circuit 52, an input/output (I/O) circuit 53, a CPU 56, a ROM 58, a RAM 59, an interface (I/F) device 57, a sound circuit 31a.

Figure 10:
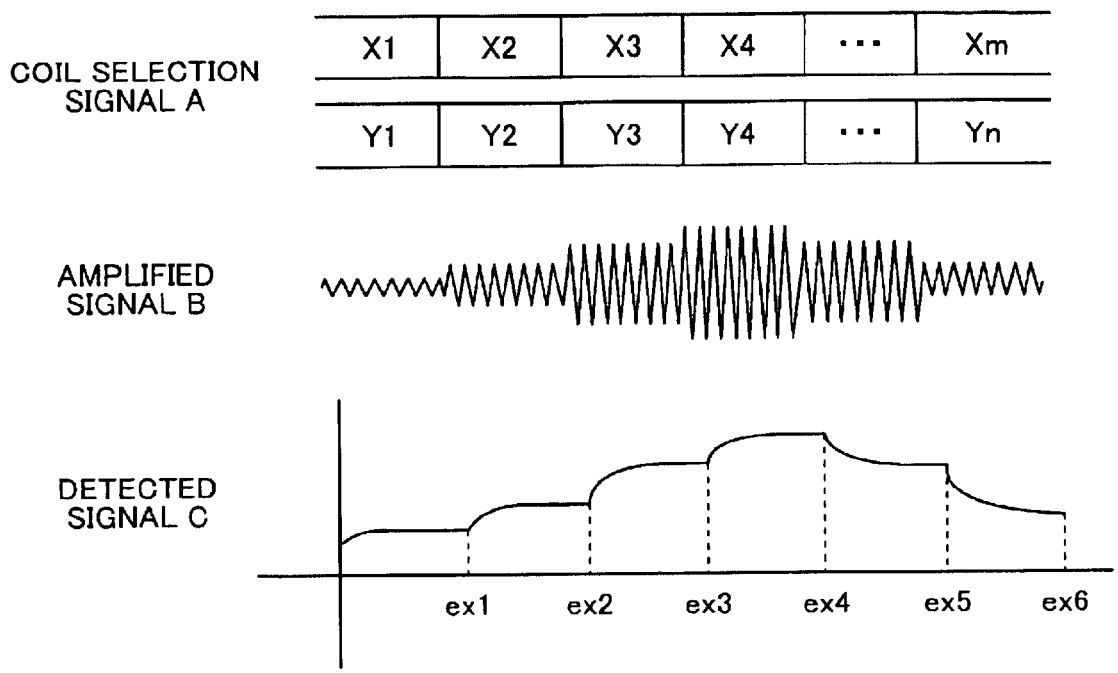
FIG. 10 illustrates signals A, B, and C in the block diagram of FIG. 9.

When the pen 60 is placed on the writing surface 21a, the X and Y sense coils 23 are magnetically coupled with the alternating magnetic field from the pen 60, and produces electric signals. The I/0 circuit 53 is controlled by the CPU 56 to output coil selecting signals A, as shown in FIG. 10, to control the X and Y coil switching circuits 50a and 50b to successively scan the X coils X1–Xm and the Y coils Y1–Yn. As a result, the electric signals induced on the X coils X1–Xm and the Y coils Y1–Yn are scanned, and inputted through the sense coil terminals 23a and 23b to the X and Y coil switching circuits 50a and 50b.

The amplifier 50c is for receiving the signals thus scanned by the X and Y coil switching circuits 50a and SOb, and for amplifying the received signals to produce amplified signals B shown in FIG. 10. The amplitude detection circuit 51 is for detecting amplitudes (voltage values) of the thus amplified signals B, and produces detection amplitude signals C also shown in FIG. 10.

The A/D conversion circuit 52 is for converting those analog signals C, which are outputted from the amplitude detection circuit 51 and which are indicative of the amplitudes of the amplified signals, into digital signals that correspond to the amplitudes of the amplified signals. The CPU 56 receives the thus obtained digital signals through the I/O circuit 53.

Figure 13:
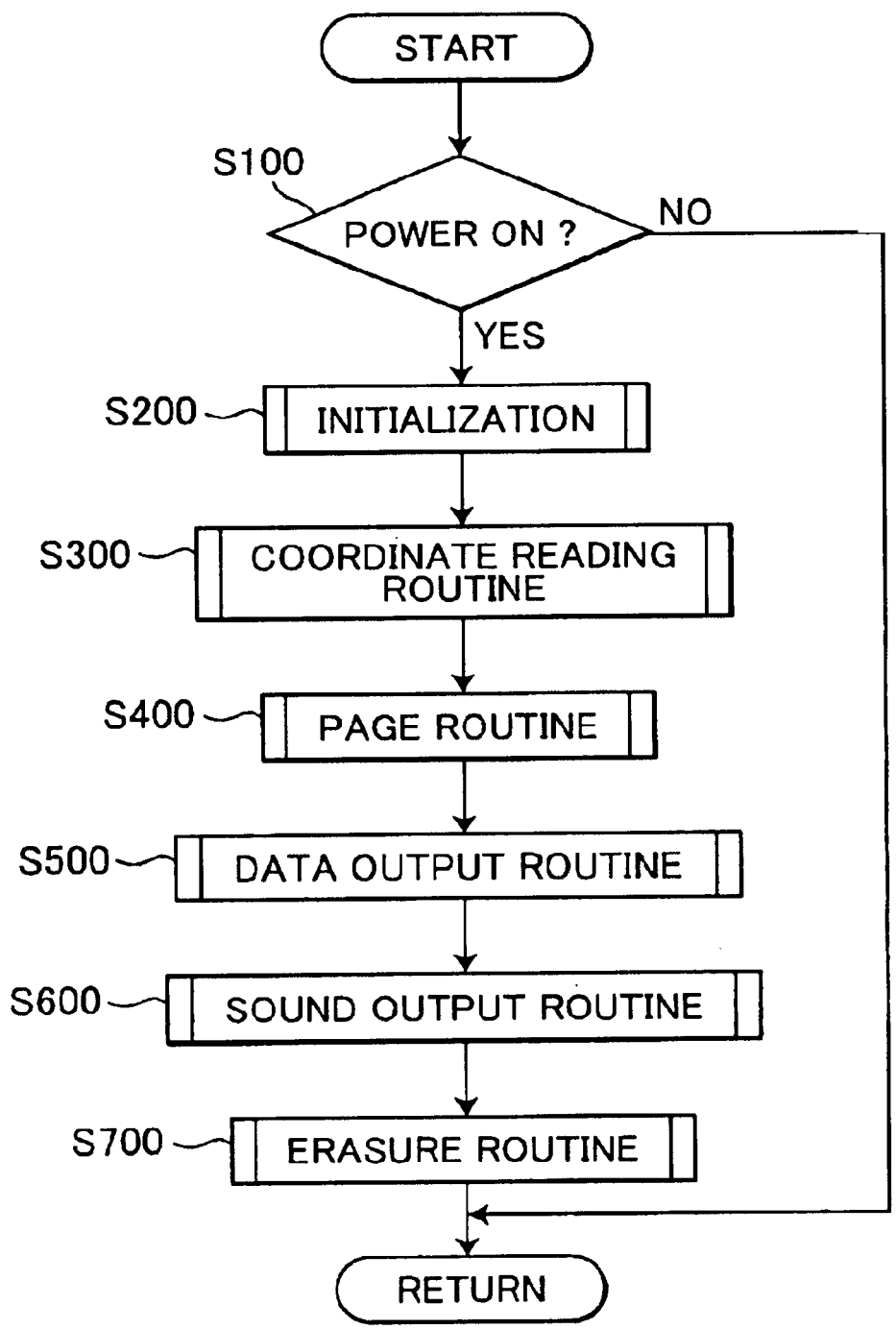
FIG. 13 is a flowchart of a main routine executed by the CPU in the control portion of FIG. 9.

The ROM 58 stores therein a variety of control programs to be executed by the CPU 56, such as the programs of the routines of FIGS. 13–14. The ROM 58 further stores a position coordinate table 58a (FIG. 11(b)) as will be described later.

The I/F device 57 is connected to the CPU 56 and to the control panel 30 (FIG. 3). When, one of the page reverse button 33, the page forward button 34, and the erasure button 35 is pressed, then the CPU 56 will execute appropriate page process, such as, reversing, forwarding, or erasing the stored written data in page units. The sound circuit 31a is controlled by the CPU 56 to generate operational sounds, such as beeps, through the speaker (SP) 31 when one of the buttons on the operation panel 30 is pressed.

Next, the position coordinate table 58a will be described while referring to FIGS. 11(a) and 11(b).

Figures 11A, 11B, 11C:
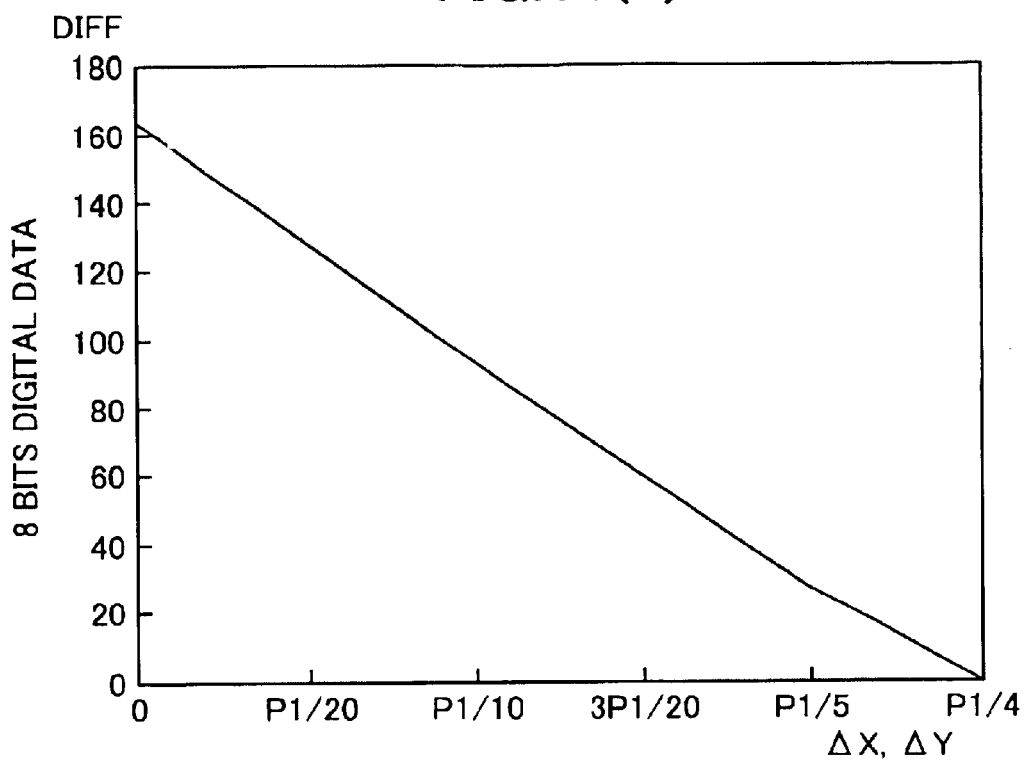

The position coordinate table 58a, shown in FIG. 11(b), is used for detecting the coordinates indicative of the position of the pen 60 on the writing surface 21a. FIG. 11(a) is a graph representing the position coordinate table 58a.

The position coordinate table 58a is produced in a manner described below.

Figure 12A:
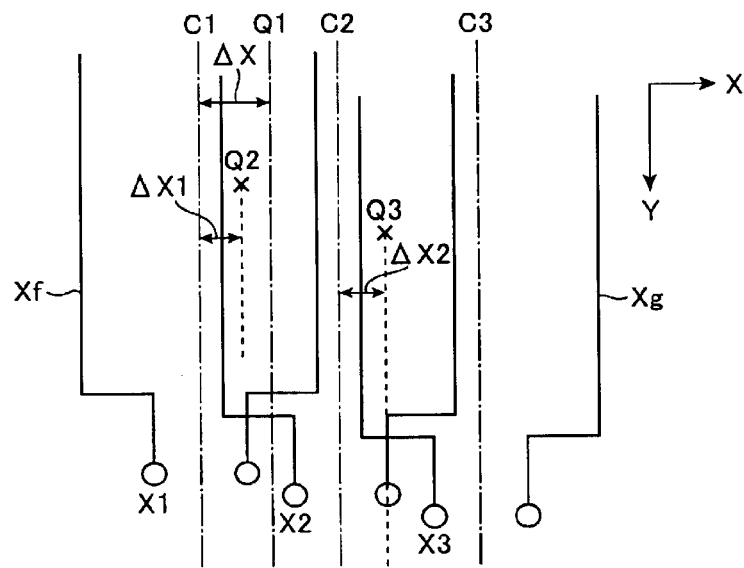
FIG. 12(a) illustrates a part of X coils X1–X3.
Figure 12B:
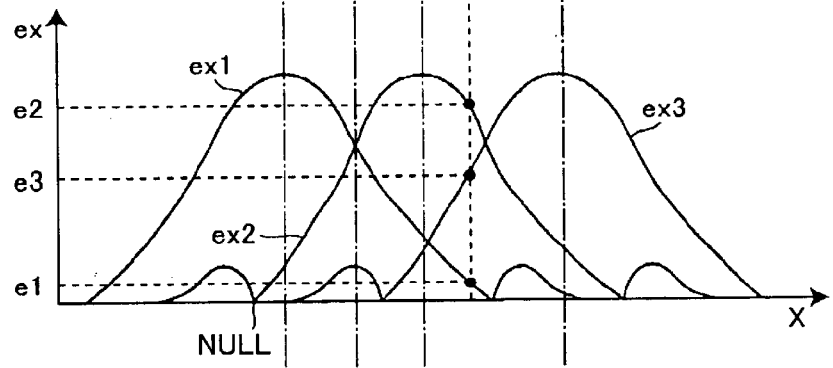
FIG. 12(b) shows how the voltages induced at the X coils X1–X3 change when the position of the pen 60 moves along the X direction.

As shown in FIG. 12(a), the X coils X1, X2, X3 have center lines c1, c2, and c3, respectively. Each center line c1, c2, c3 extends along the Y direction. If the pen 60 is positioned at some place near the X coils X1–X3 on the writing surface 21a, the X coils X1, X2, X3 generate voltages ex1, ex2, ex3, respectively, as shown in FIG. 12(b). FIG. 12(b) shows how the voltages induced at the loop coils X1–X3 change when the position of the pen 60 moves along the X direction. As apparent from FIG. 12(b), each of the voltages ex1 to ex3 becomes maximum when the pen 60 comes close to the corresponding center line c1 to c3, and gradually decreases as the pen 60 goes away from the corresponding center line toward the long sides Xf and Xg of the corresponding loop coil X1, X2, X3.

The voltage line ex1–ex3 for each X coil X1–X3 has a pair of null points where the voltage ex1–ex3 has a voltage of zero (0) value. In other words, each X coil generates a voltage of zero value when the pen 60 is located on one of the null points along the X axis. According to the present embodiment, the X coils X1–Xm are arranged to overlap with adjacent X coils by a half of the width P1 so that each null point for each X coil will be located at a position that is separated from the corresponding center line by a distance greater than the half of the width P1. Accordingly, the null point for each X coil is separated away from the corresponding center line by a distance that is greater than the distance of the corresponding center line to the center lines of adjacent X coils. In this example shown in FIG. 12(b), the null points for the X coil X2 are separated away from the center line C2 by a distance that in greater than the distance from the center line C2 to the center lines C1 and C3 of the adjacent X coils X1 and X3. Accordingly, when the pen 60 is positioned on the center line of one of the sense coils, not only the subject loop coil but also its adjacent loop coils will generate induction voltages. It should be noted that in the drawings of FIGS. 12(a)–12(c), the width of the sense coils 23 is indicated slightly smaller than the actual size in order to facilitate understanding of the overlap between the sense coil 23.

Figure 12C:
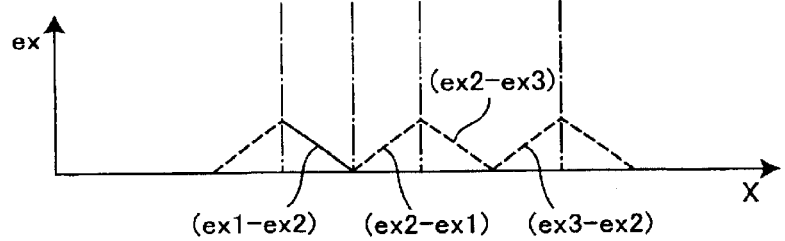
FIG. 12(c) shows how the voltage difference between two adjacent loop coils among the X loop coils X1 to X3 changes when the position of the pen 60 moves along the X axis.

FIG. 12(c) shows how the voltage difference between two adjacent loop coils 23 among the X loop coils X1 to X3 changes when the position of the pen 60 moves along the X axis. As shown in FIG. 12(c), the voltage difference is largest when the pen 60 is located at the center c1 to c3 of each sense coil, and becomes zero when the pen 60 is located at the position in the intermediate position between the center of each sense coil and a long aide (Xg or Xf) of the corresponding sense coil. That is, the voltage difference is zero at the middle position in the area where two adjacent sense coils overlap with one another.

For example, FIG. 12(c) indicates, using a solid line, how the voltage difference value (ex1−ex2) between the voltages at the X coils X1 and X2 changes when the pen 60 goes away from the center C1 of the X coil X1 toward the intermediate point Q1 (FIG. 12(a)), which is the middle point in the area where the X coil X1 overlaps with the X coil X2. In this case, the distance ΔX of the pen 60 from the center C1 of the X coil X1 changes from a zero value toward a half of the intercoil pitch (P1/2), that is, P1/4. It is therefore apparent that the distance ΔX of the pen 60 from the center C1 can be known based on the voltage difference (ex1−ex2) between the voltages at the adjacent X coils X1 and X2.

For example, when the pen 60 is located at a position Q2 of FIG. 12(a), by detecting the voltage difference (ex1−ex2), the distance ΔX1 of the pen 60 from the center C1 can be determined, and the X coordinate of the point Q2 can be determined accordingly.

When the voltage difference (ex1−ex2) is expressed in digital data DIFF of eight bits. the relationship between the digital data DIFF and the distance ΔX [mm] from the center C1 can be indicated as shown in FIG. 11(a). More specifically, the graph of FIG. 11(a) is obtained when the pen 60 is located at some place on the writing surface 21a in the area between the center line C1 and the middle line Q1. The voltages induced at the X coils X1 and X2 are scanned by the x-coil scanning circuit 50a, amplified by the amplifier 50c, detected by the amplitude detection circuit 51, and converted into eight-bit digital data. The digital data DIFF is obtained by calculating the difference between the eight-bit digital data for the voltages at the X coils X1 and X2. The relationship between the position ΔX [mm] of the pen 60 from the center line C1 and the digital difference data DIFF is shown in FIG. 11(a). The position coordinate table 58a of FIG. 11(b) is obtained simply by converting the graph of FIG. 11(a) into a table form.

As indicated by a solid line in FIG. 12(c), in the area from the center line C1 to the middle line Q1, the characteristic in FIG. 11(a) shows the relationship between the voltage difference (ex1−ex2) and the pen location ΔX [mm] from the center line C1 in the positive direction along the X axis. However, as indicated by broken lines in FIG. 12(c), in another area from the middle line Q1 to the center line C2, the same characteristic in FIG. 11(a) shows the relationship between the voltage difference (ex2−ex1) and the pen location ΔX [mm] that is now defined from the center line C2 in the negative direction along the X axis.

Thus, in the area from the center line Ci of each X coil Xi (where $1 \leq i \leq m-1$) to the middle line Qi between the center line Ci and the center line Ci+1 of its next X coil Xi+1, the characteristic of FIG. 11(a) represents the relationship between the voltage difference (exi−exi+1) and the pen location ΔX [mm] that is defined from the center line Ci of the X coil Xi in the positive direction along the X axis. Contrarily, in the area from the middle line Qi to the center line Ci+1, the same characteristic of FIG. 11(a) represents the relationship between the voltage difference (exi+1−exi) and the pen location ΔX [mm] defined from the center line Ci+1 in the negative direction along the X axis.

It is noted that as apparent from FIG. 12(c), the maximum value in the voltage difference appears on the center line of each X coil. The amount of the maxim value, however, decreases as the position of the pen 60 comes close to each of both edges (short sides Xd and Xh) of the X coil along the center line C.

Additionally, the same characteristic in FIGS. 12(a)–12(c) is obtained for the relationship between the voltages induced at the Y sense coils Y1–Yn and the position of the pen 60 in the Y axial direction. Accordingly, in the area from the center line of each Y coil Yi (where $1 \leq i \leq n-1$) to the middle line between the center line of the subject Y coil Yi and the center line of the next Y coils Y1+1, the characteristic in FIG. 11(a) represents the relationship between the voltage difference (eyi−eyi+1) for the coils Yi and Yi+1 and the pen location ΔY [mm] that is defined from the center line of the Y coil Yi in the positive direction along the Y axis. Contrarily, in the area from the middle line to the center line of the Y coil Yi+1, the characteristic in FIG. 11(a) represents the relationship between the voltage difference (eyi+1−eyi) and the pen location ΔY [mm] that is defined from the center line Ci+1 in the negative direction along the Y axis.

As will be described later, when the pen 60 is located at some place on the writing surface 21a, the voltages induced at the X coils X1–Xm are scanned by the x-coil scanning circuit 50a, amplified by the amplifier 50c, detected by the amplitude detection circuit 51, and converted into eight-bit digital data. The thus obtained eight-bit digital data are stored in the RAM 59 at its voltage value storage area 59a as shown in FIG. 11(c). When the voltage at some X coil Xi is the largest among all the X coils X1–Xm and when the voltage at its adjacent coil Xi+1 is greater than the voltage at its other adjacent coil Xi−1, it can be known that the pen 60 is within the area between the center line Ci of that coil Xi and the middle line Qi between the center lines Ci and Ci+1. Accordingly, the X coordinate of the pen can be obtained by adding, to the X coordinate of the center line Ci, the distance ΔX [mm] that is indicated in the table of FIG. 11(b) in correspondence with one value DIFF that is most near to a difference value calculated between the digital data for the coils Xi and Xi+1.

Similarly, when the voltage at some X coil Xi is the largest among all the X coils X1–Xm and when the voltage at the adjacent coil Xi−1 is greater than that at the adjacent coil Xi+1, it can be known that the pen 60 is within the area between the center line Ci of that coil Xi and the middle line Qi−1 between the center lines Ci and Ci−1. Accordingly, the X coordinate of the pen can be obtained by subtracting, from the X coordinate of the center line Ci, the distance ΔX [mm] that is indicated in the table of FIG. 11(b) In correspondence with one value DIFF that is most near to a difference value calculated between the digital data for the coils Xi and Xi−1. Thus, the x coordinate of the pen 60 on the writing surface 21a can be determined.

In a similar manner, the y coordinate of the pen 60 on the writing surface 21a can be determined. That is, the voltages induced at the Y coils Yi–Yn are scanned by the y-coil scanning circuit 50b, amplified by the amplifier 50c, detected by the amplitude detection circuit 51, and converted into eight-bit digital data. The thus obtained eight-bit digital data are stored in the RAM 59 at its voltage value storage area 59a in the same manner as shown in FIG. 11(c). Then, in the same manner as described above for the x-coordinate, the y-coordinate of the pen 60 can be determined using the difference between the voltages of two adjacent Y coils that induce the largest and the second largest voltages and referring to the table 58a.

As described already, the position coordinate table 58a is stored in the ROM 58, and will be referred to as table data for determining coordinates of the position of the pen 60 using the detected induction voltages.

With the above-described structure, the CPU 56 controls the entire device 1. More specifically, the CPU 56 executes the main routine as shown in FIG. 13.

When the CPU 56 detects that the power button 38 is pressed down to be turned ON (S100:YES), then in S200, the CPU 56 executes initialization processes. During the initialization processes, the CPU 56 loads the various control programs from the ROM 58 into a work area of the RAM 59. The CPU 56 also loads the position coordinate table 58a from the ROM 58 into the work area of the RAM 39.

Next, the CPU 56 executes a coordinate reading process in S300 to read X and Y coordinates of the position of the pen 60 on the writing surface 21a, and to store data of the read X and Y coordinates in the RAM 59. While the pen 60 to being pressed against the writing surface 21a and is used to draw images on the writing surface 21a, the pen in continuously detected by the sense coils 23 and the X and Y coordinates of the position of the pen 60 are repeatedly determined, and stored in the RAM 59. The thus successively-determined position coordinate data of the pen 60 constitute a set of written data that is indicative of an image (characters and/or figures) drawn on the writing surface 21a by the pen 60. A plurality of sets of written data, indicative of a plurality of pages' worth of images, can be stored in the RAM 59, wherein each set of written data indicates a corresponding page image.

When the pen 60 is taken away from the writing surface 21a and is not detected by any sense coils 23, the coordinate reading process of S300 is ended, and the routine proceeds to a page process of S400. During the page process of S400, when the user presses down either one of the page reverse button 33, the page forward button 34, and the erasure button 35, the CPU 50 executes appropriate page process, such as a page reversing process, a page forwarding process, or a page erasing process, in page units onto the written data now stored in the RAM 59. More specifically, the CPU 56 receives, through the I/O circuit 57, a switching signal which is generated in response to an operation of some button on the operation portion 30, and executes the page processes. For example, the CPU 56 reverses or forwards, by page units, the written data stored in the RAM 59. Or, the CPU 56 erases the written data also in page units.

In S500, the CPU 56 executes a data output process to convert all the written data (pen position coordinate data) of the user's desired page, that is now stored in the RAM 59, into an appropriate format and to output the resultant data to the PC 100 or the printer 200. In S600, the CPU 56 executes a sound output routine for generating operational sounds, such as beeps, by operating the sound circuit 31a in response to the switching signals, which are generated when one of the buttons is pressed, and by controlling the speaker (SP) 31 accordingly.

Then, the routine proceeds to S700. In S700, if the eraser 40 is located on the writing surface 21a and is detected by the sense coils 23, the CPU 56 determines the X and Y coordinates of the eraser 40, in the same manner as in the pen coordinate reading process of S300, based on values of the voltages generated by the X and Y coils 23 that are magnetically coupled with the alternating magnetic field from the coil in the eraser 40. The CPU 56 then determines the course followed by the eraser 40. The CPU 56 deletes, from the RAN 59, some pen coordinate data (written data) that corresponds to the course followed by the eraser 40.

After process of S700 is completed, one series of processes represented by the flowchart in FIG. 13 are completed, whereupon the program returns to 9100 and repeats the processes in S100 to S700.

The coordinate reading process of S300 will be described below in greater detail with reference to FIG. 14.

When the coordinate reading process in started, then X coils X1–Xm are successively scanned in S302. In S302 the CPU 56 outputs the coil selection signal A (FIG. 10) to the X coil switching circuit 50a through the input/output circuit (IO) 53. By thus outputting the coil selection signal A to the X coil switching circuit 50a, the X coils X1 to Xm are scanned in this order.

When the pen 60 is not pressed against the writing surface 21a and is therefore not detected at the X coils (S304:NO), then the coordinate reading process of S300 is ended, and the routine proceeds to the page routine of S400. On the other hand, when the pen 60 is located on the writing surface 21a, some X coils are magnetically coupled with the alternating magnetic field from the coil L1 in the pen 60, and generate electric signals. These signals are amplified by the amplifier 50c into the amplified signals B shown in FIG. 10. Then, amplitude detection is performed onto the amplified signals B at the amplitude detection circuit 51. The amplitude detection circuit 51 outputs detection signals C (FIG. 10) to the A/D conversion circuit 52, whereupon the A/D conversion circuit 52 converts the amplitude, that is, the voltage value, of the amplified signals B into corresponding digital signals. The digital signals are inputted into the CPU 56 through the input/output circuit 53. Thus, when the CPU 56 receives those digital signals, the CPU 56 determines that the pen 60 is detected (S304:YES), then the program proceeds to S306.

In S306, the CPU 56 successively stores voltage values (e1) to (em) of the received digital signals, which are inputted from the scanned X coils X1 to Xm. As shown in FIG. 11(c), the CPU 56 successively stores those voltage values e1 to em in the voltage value storage area 59a in association with the corresponding X coil numbers of 1 to m.

Next, the CPU 56 calculates in S308 the X coordinate of the pen 60 based on the voltage values e1 to em now stored in the storage area 59a.

The calculation in S308 will be described below in greater detail.

First, the CPU 56 selects the largest voltage value e(max) among all the voltage values e1 to em stored in the voltage value storage area 59a, where $1 \leq max \leq m$. The CPU 56 then determines the coil number "max" of the X coil X(max) that has generated the largest voltage value e(max).

For example, if the pen 60 is located at a position Q3 shown in FIG. 12(a), the X coils X1, X2, X3 generate voltage values e1, e2, e3, respectively, as shown in FIG. 12(b). In this case, the CPU 56 selects the voltage value e2 as the largest voltage value e(max). The CPU 56 selects the coil number (2) of the X coil X2 as the coil number "max", and stores the coil number (2) in the RAM 59.

The CPU 56 then compares voltage values e(max+1) and e(max−1) with each other. The voltage value e(max+1) is the value of a voltage induced at a X coil X(max+1) that is located adjacent to and in the right side of the maximum coil X(max). In other words, the X coil X(max+1) is located in the positive direction from the X coil X(max) along the X axis. The voltage value e(max−1) is the value of a voltage induced at another X coil X(max+1) that is located adjacent to and in the left side of the maximum coil X(max). In other words, the X coil X(max−1) is located in the negative direction from the X coil X(max) along the X axis. The CPU is 56 selects one of the voltage values e(max+1) and e(max−1) that is greater than the other, and then stores, in the RAM 59, the coil number (max2) of the X coil that has generated the selected greater voltage value e(max+1) or e(max−1). The thus selected X coil (max2) is the second maximum voltage coil that has induced the second largest voltage among all the X coils (X coil (1)–X coil (m)).

In the example shown in FIGS. 12(a) and 12(b), because the maximum coil number (max) is equal to 2, the voltage value e1 (e(max−1)) of the X coil X1 and the voltage value e3 (e(max+1)) of the X coil X3 are compared with each other. Because e3 is greater than e1 for the position of Q3, the corresponding coil number (3) of the X coil X3 is stored in the RAM 59 as the coil number (max2).

Next, the CPU 56 compares the value of the coil number (max) and the coil number (max2) which are now stored in the RAM 59. The CPU 56 then judges whether or not the coil number (max2) is greater than or equal to the coil number (max). In other words, the CPU 56 judges whether the coil X(max2) exists in the positive direction (rightside) or in the negative direction (leftside) from the coil X(max) along the X axis.

When the max2≧max, it is determined that the coil X(max2) exists in the positive direction (rightside) from the coil X(max) along the X axis. Accordingly, a variable "SIDE" is set to 1. On the other hand, when max2<max, it is determined that the coil X(max2) exists in the negative direction (leftside) from the coil X(max) along the X axis. Accordingly, the valuable "SIDE" is set to −1.

In the example of FIGS. 12(a) and 12(b), because max=2 and max2=3, max2>max, and therefore the variable SIDE is set to 1.

Next, the CPU 56 calculates a difference voltage "DIFF" between the voltages e(max) and e(max2) by calculating the following formula (1):

$$\text{DIFF} = e(\text{max}) - e(\text{max2}) \tag{1}$$

Next, the CPU 56 retrieves, from the position coordinate table 58a, a coordinate offset amount ΔX that corresponds to an OFFSET value that is closest to the calculated value DIFF. The CPU 56 sets the retrieved coordinate offset amount ΔX as a value "OFFSET".

The CPU 56 then determines the X coordinate X1 of the pen 60 by calculating the following formula (2):

$$X1 = (P1/2) \times (\text{max}) + \text{OFFSET} \times \text{SIDE} \tag{2}$$

wherein the value of "(P1/2)×(max)" represents the X coordinate of the center line of the maximum voltage-inducing coil X(max).

In the example shown in FIGS. 12(a)–12(c), X1 of the pen 60 at the location Q3 is calculated as being equal to (P1/2)×2+(e2−e3)×1. Thus, it is known that the position Q3 is separated, in the positive direction along the X axis, from the center line C2 of the X coil X2 by the distance ΔX2 that corresponds to the voltage value difference (e2−e3).

When the X coordinate of the pen is thus determined, the process of S308 is completed. Then, similar processes are performed in S310–S314 to calculate the Y coordinate of the pen. More specifically, similarly to the process of S302, the CPU 50 successively scans the Y coils Y1 to Yn in S310 by outputting the coil selection signals A (FIG. 10) to the Y coil switching circuit 50b through the input/output circuit (I/O) 53. In S312, similarly to the process of S306, the values inputted from the Y coils Y1–Yn are stored as e1 to en in the voltage storage area 59a. In S314, the y coordinate of the pen 60 is calculated in the same manner as in the process of S308.

Thereafter, the X coordinate value and the Y coordinate values determined in S308 and in S314, are stored as a set of pen coordinate data (X, Y) in the RAM 59 in S320.

According to the present embodiment, in order to suppress increase in the voltage induced at the sense coils 23 at their edges (near to the short sides Xd, Xh, Yd, Yh), the sense coils 23 are mounted on the attachment panel 24 in a manner described below.

Figure 15A:
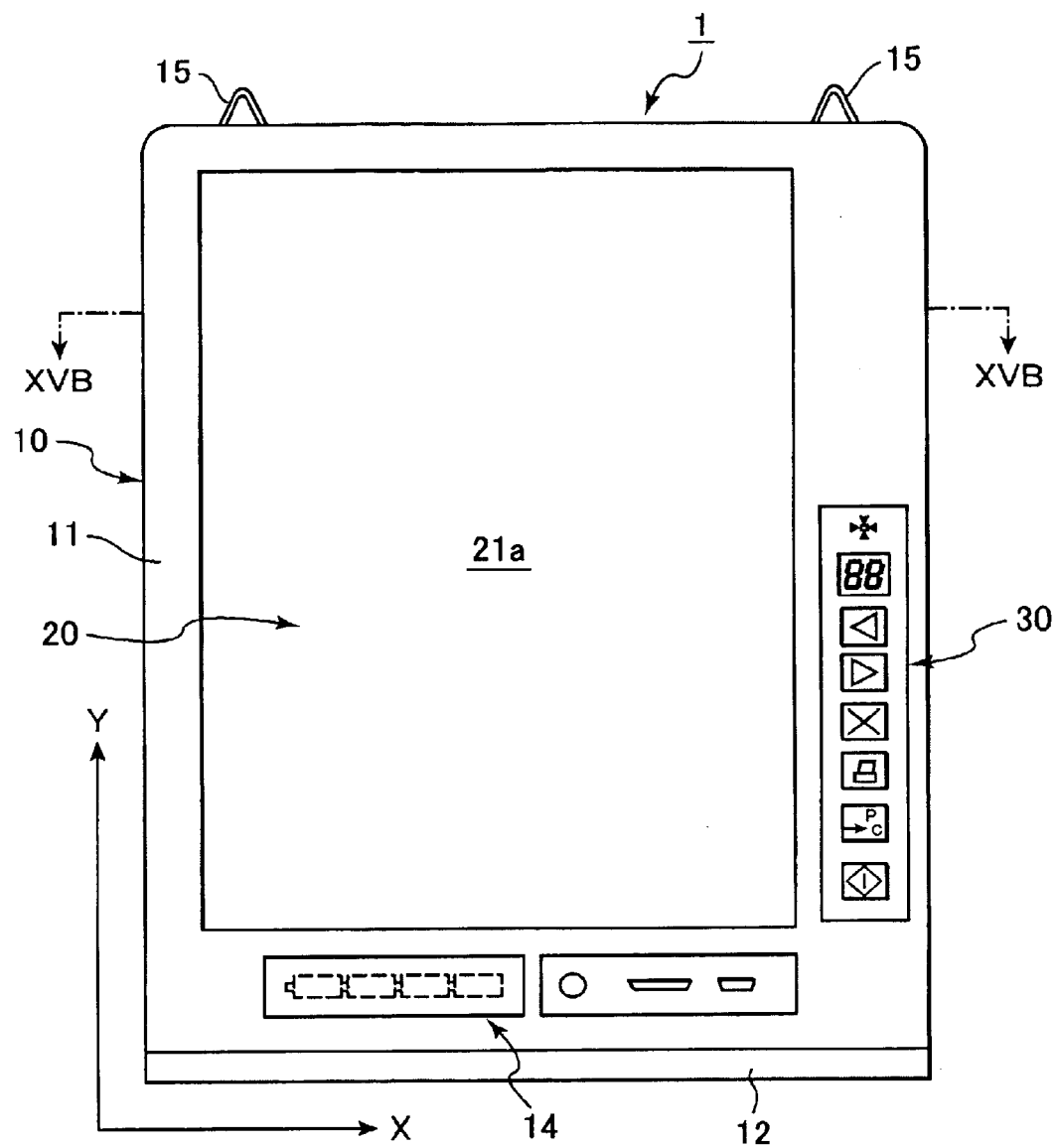
FIG. 15(a) is a front view of the writing panel 10 of the electronic white board.
Figure 15B:
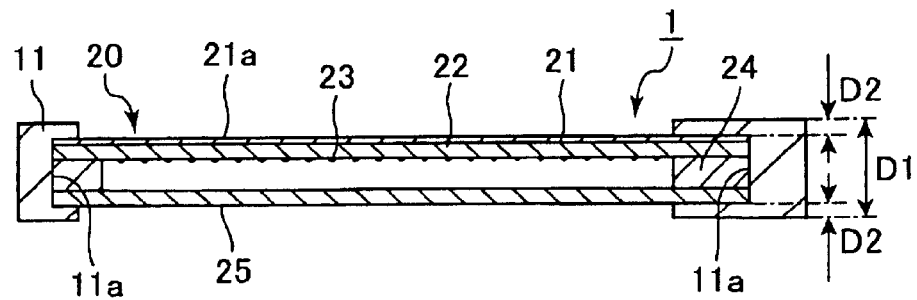
FIG. 15(b) is a cross-sectional view of the writing panel 10 taken along a line XVB—XVB in FIG. 15(a)

It is noted that the electronic white board 1 has a front view and a cross-sectional view shown in FIGS. 15(a) and 15(b). As described already, the writing sheet 21 has a thickness of 0.1 mm. The panel 22 has a thickness of 3.0 mm. The attachment panel 24 has a thickness of 40 mm. The back panel 25 has a thickness of 1 mm. As shown in FIG. 15(b), the overall thickness of the frame 11 has a thickness D1 of 50 mm. All the components 21, 22, 23, 24, and 25 of the panel main body 20, shown in FIG. 5, are mounted one on another, and then the thus obtained laminated-structure is fitted to a concave portion 11a of the frame 11. Thus, the writing panel 10 is obtained. The frame 11 has a portion of a thickness D2 of 3.0 mm on each side (front side and back side) of the concave portion 11a.

As described already, the sense coils 23 are arranged on the attachment panel 24 as shown in FIGS. 8(a) and 8(b). In this example, the total number of X coils X1–Xm is 13 and the total number of Y coils Y1–Yn is 20. Each of the x-sense coils X1–Xm has the length P2X of 680 mm. Each of the y-sense coils Y1–Yn has the length P2X of 980 mm. Each of the x- and y-sense coils X1–Xm and Y1–Yn has the width P1 of 80 mm. Accordingly, the P1/4 is equal to 20 mm, and therefore the position coordinate table 58a is prepared as shown in FIG. 16. The relationship between the position coordinate values ΔX, ΔY and the voltage difference values DIFF are as shown in FIG. 11(a) where P1/4 is equal to 20 mm.

Next will be described how the sense coils 23 are mounted on the attachment panel 24 with reference to FIGS. 17–20.

It is noted that as shown in FIG. 5, the frame-shaped attachment panel 24 has: a front surface 24n that confronts the panel 22, a rear surface 24b that confronts the back panel 25, a pair of (left and right) edge surfaces 24a that extend in the Y axis direction and that connect the front surface 24n and the rear surface 24b with each other, another pair of (upper and lower) edge surfaces 24p that extend in the X axis direction and that connect the front surface 24n and the rear surface 24b with each other, a first edge 24a1 that is defined between the front surface 24n and the edge surfaces 24a and 24p, and a second edge 24a2 that is defined between the edge surfaces 24a and 24p and the rear surface 24b.

Each coil X1–X13 is mounted on the attachment panel 24 so that the pair of long sides Xf and Xg of each coil X1–X13 will follow the front surface 24n vertically along the Y axis direction. The long sides Xf and Xg of each coil X1–X13 are bent at the edge surface 24p, on the upper side, so that the short side Xd of each coil X1–X13 is located on the rear surface 24b. The long sides Xf and Xg of each coil X1–X13 are bent at the edge surface 24p, also on the lower side, so that the short side Xh of each coil X1–X13 is located also on the rear surface 24b so as to be connected to the corresponding terminal 23a.

Similarly, each coil Y1–Y20 is mounted on the attachment panel 24 so that the pair of long sides Yf and Yg of each coil Y1–Y20 will follow the front surface 24n horizontally along the X axis direction. The long sides Yf and Yg of each coil Y1–Y20 are bent at the edge surface 24a, on the left side, so that the short side Yd of each coil Y1–Y20 is located on the rear surface 24b. The long sides Yf and Yg of each coil Y1–Y20 are bent at the edge surface 24a, also on the right side, so that the short side Yh of each coil Y1–Y20 is located also on the rear surface 24b so as to be connected to the corresponding terminal 23b.

If the short sides Xd, Xh, Yd, and Yh of each loop coil 23 are formed flash with the front surface 24n, then if the pen 60 is located on the writing surface 21a in some edge of some loop coil 23, the coil L1 in the pen 60 will become too close to the corresponding short side of the subject loop coil 23. In this case, it is impossible to obtain accurate detection voltages due to undesirable great influence from the short side of the loop coil 23. To avoid this problem, according to the present embodiment, each coil 23 is bent at its edge portions from the front surface 24n to the rear surface 24b, that is, in a direction away from the writing surface 21a, on which the pen 60 will be located. The undesirable influence from the short sides of the loop coils can be prevented.

FIGS. 17 to 20 show the rear surface 24b of the attachment panel 24 facing upward. X, Y, and Z axes extend as indicated by arrows in each figure. In the following explanation, grooves extending in directions of X, Y, and Z axes will be referred to as X axis grooves, Y axis grooves, and Z axis grooves, respectively.

Figure 17:
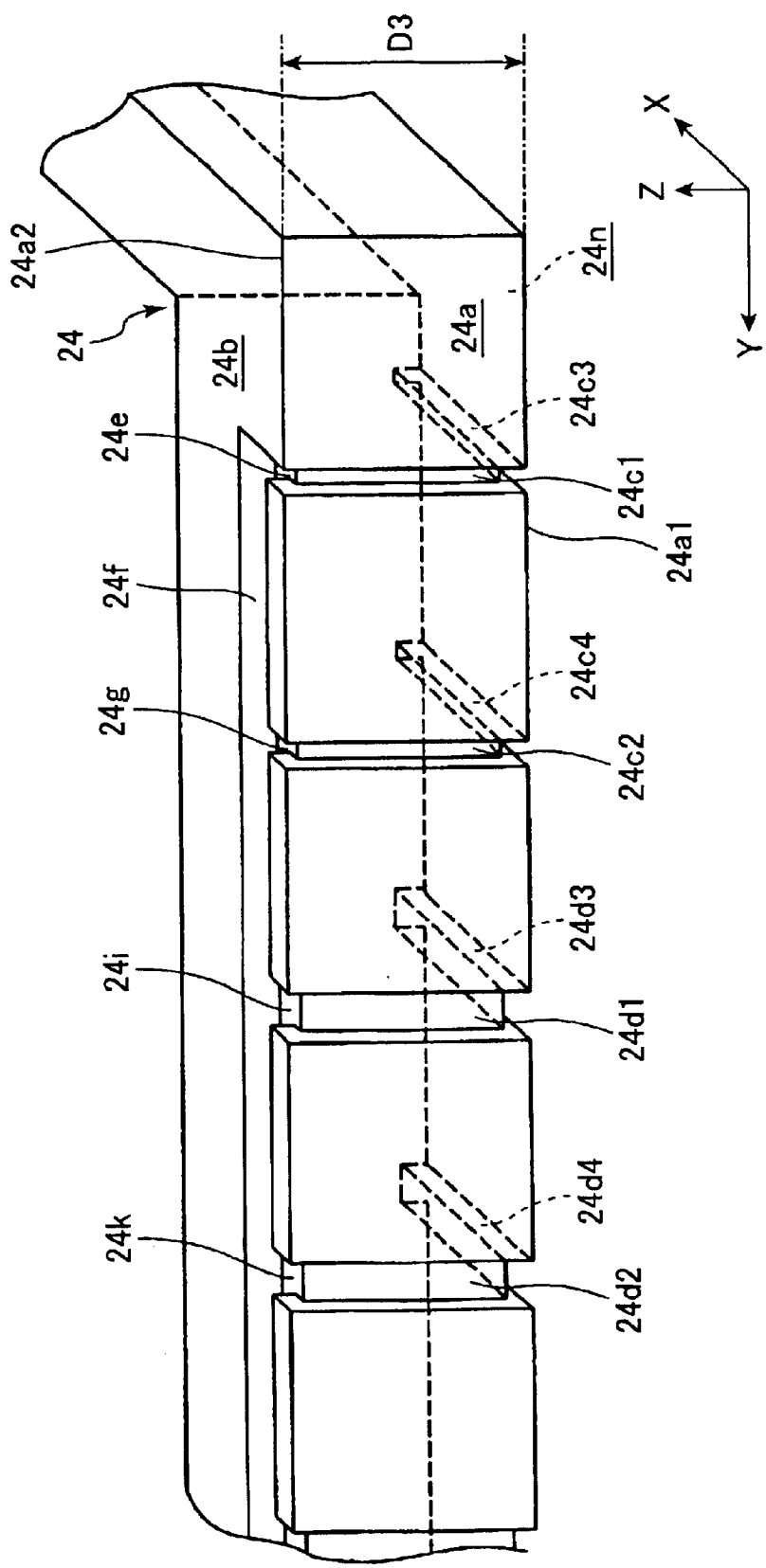
FIG. 17 illustrates a structure of an edge surface of the attachment panel.

FIG. 17 shows the configuration of one corner portion (upper-left corner in FIG. 5) of the attachment panel 24 where the edges (short sides Yd) of the Y coils Y1–Y4 are to be mounted. In other words, FIG. 17 shows the state of the attachment panel 24 before the sense coils 23 are mounted. As described already, the attachment panel 24 has the thickness D3 of 40 mm.

As shown in FIG. 17, a Y axis groove 24f is formed in the rear surface 24b in parallel with the second edge 24a2. Thus, the Y axis groove 24f extends in the Y axial direction. An X axis groove 24e is formed in the edge portion of the rear surface 24b, in connection with the Y axis groove 24f. The X axis groove 24e extends in the X axial direction. Other X axis grooves 24g, 24i, 24k are further formed in the rear surface 24b in connection with the Y axis groove 24f. The X axis grooves 24g, 24i, 24k extend also in the X axial direction. The X axis grooves 24e, 24g, 24i, and 24k are arranged in the Y axis direction and are separated from one another by a pitch of P1/2. The X axis grooves 24e and 24g are formed to a width and a depth for receiving a wire of a single coil 23. The Y axis groove 24f and the X axis grooves 24i, 24k are formed with a width and a depth for receiving wires of two coils 23.

A Z axis groove 24c1 in formed in the edge surface 24a, in connection with the X axis groove 24e. The Z axis groove 24c1 extends in a Z axis direction, which extends perpendicularly both to the X and Y axial directions, to thereby extend from the first edge 24a1 to the second edge 24a2. Other Z axis grooves 24c2, 24d1, 24d2 are also formed in the edge surface 24a to extend in the Z axis direction. The 2 axis grooves 24c2, 24d1, 24d2 are in connection with the X axis grooves 24g, 24i, and 24k, respectively. Those Z axis grooves 24c1, 24c2, 24d1, and 24d2 are arranged in the Y axis direction and are separated from one another by a pitch P1/2. The Z axis grooves 24c1 and 24c2 are both formed with a width and a depth for receiving a wire of a single coil. The Z axis grooves 24d1 and 24d2 are formed with a width and a depth for receiving wires of two coils.

X axis grooves 24c3, 24c4, 24d3, 24d4, which are in connection with the Z axis grooves 24c1, 24c2, 24d1, 24d2, respectively, are formed in the front surface 24n. The X axis grooves 24c3, 24c4, 24d, 24d4 extend in the X axial direction. The X axis grooves 24c3, 24c4, 24d3, 24d4 are arranged in the Y axis direction and are separated from one another by a pitch P1/2. The X axis grooves 24a3 and 24c4 are formed with a width and a depth for receiving a wire of a single coil. The X axis grooves 24d3 and 24d4 are formed with a width and a depth for receiving wires of two coils.

The Y coils Y1–Y4 are attached to the attachment panel 24 in a manner described below.

Figure 18:
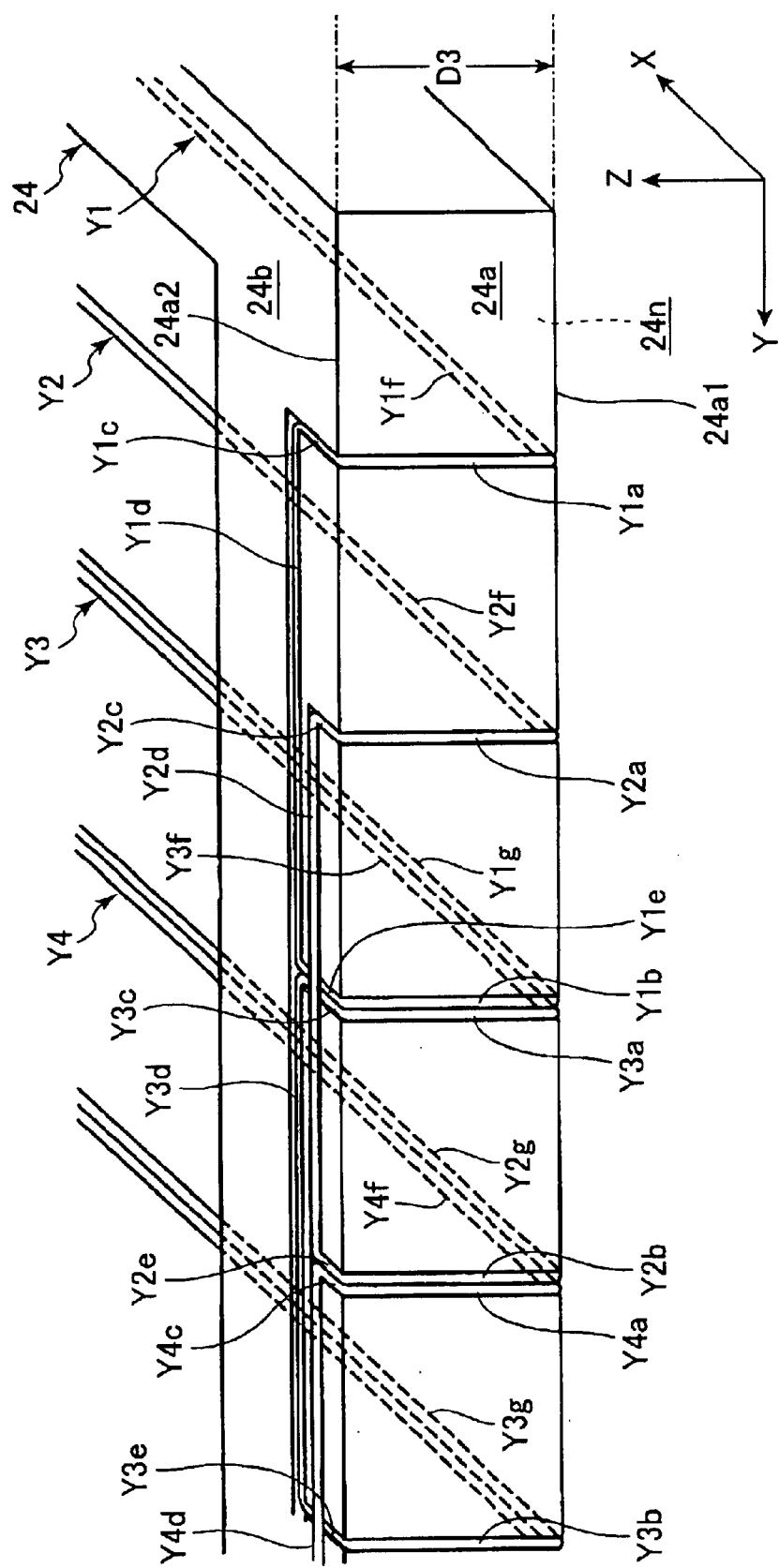
FIG. 18 illustrates how Y coils are attached to the edge surface of the attachment panel of FIG. 17 to provide the short sides Yd.

As shown in FIG. 18, the Y coil Y1 is mounted on the attachment panel 24 so that its pair of long sides Y1f and Y1g will follow the front surface 24n of the attachment panel 24 and will bend onto the edge surface 24a at the first edge 24a1. The long sides Y1f and Y1g are further bent at the second edge 24a2 onto the rear surface 24b. The Y coil Y2 is mounted on the attachment panel 24 so as to partly overlap with the Y coil Y1 by an amount equal to the pitch of P1/2. A pair of long sides Y2f and Y2g of the Y coil Y2 follow the front surface 24n and are bent at the first edge 24a1 and the second edge 24a2 in the same manner as the Y coil Y1. The Y coil Y3 is mounted on the attachment panel 24 so as to partly overlap with the Y coil Y2 by the amount equal to the pitch of P1/2. A pair of long sides Y3f and Y3g of the Y coil Y3 follow the front surface 24n and are bent at the first and second edges 24a1 and 24a2 in the same manner as the Y coil Y1. Similarly, the Y coil Y4 is mounted on the attachment panel 24 so as to partly overlap with the Y coil Y3 by the amount equal to the pitch of P1/2. A pair of long sides Y4f and Y4g of the Y coil Y4 follow the front surface 24n and are bent at the first and second edges 24a1 and 24a2 in the same manner as the Y coil Y1.

Accordingly, short sides Y1d, Y2d, Y3d, Y4d of the Y coils Y1, Y2, Y3, Y4 are inserted into the X axis groove 24f. A second bent portion Y1c of the Y coil Y1 in inserted in the X axis groove 24e. A second bent portion Y2c of the Y coil Y2 is inserted in the X axis groove 24g. Another second bent portion Y1e of the Y coil Y1 and a second bent portion Y3c of the Y coil Y3 are inserted in the X axis groove 24i. Further, another second bent portion Y2e of the Y coil Y2 and a second bent portion Y4c of the Y coil Y4 are inserted in the X axis groove 24k.

A first bent portion Y1a of the Y coil Y1 is fitted into the Z axis groove 24c. A first bent portion Y2a of the Y coil Y2 is fitted in the Z axis groove 24c2. Another first bent portion Y1b of the Y coil Y1 and a first bent portion Y3a of the Y coil Y3 are fitted in the Z axis groove 24d1. Another first bent portion Y2b of the Y coil Y2 and a first bent portion Y4a of the Y coil Y4 are fitted in the Z axis groove 24d2.

A portion of the long side Y1f of the Y coil Y1 is fitted in the X coil groove 24c3. A portion of the long side Y2f of the Y coil Y2 is fitted in the X axis groove 24c4. A portion of the long side Y1g of the Y coil Y1 and a portion of the long side Y3f of the Y coil Y3 are fitted in the X axis groove 24a3. A portion of the long side Y2g of the Y coil Y2 and a portion of the long side Y4f of the Y coil Y4 are fitted in the X axis groove 24d4.

Because each Y coil is mounted on the attachment panel 24 in the above-described manner, each Y coil is bent to a depth of D3 (40 mm) that is equal to the thickness of the attachment panel 24.

Thus, the Y coils Y1 to Y4 are attached to the attachment panel 24 with the long sides Yf and Yg, the first and second bent portions Ya, Yb, Yc, and Ye, and short aides Yd being fitted into the grooves formed in the front surface 24n, the edge surface 24a, and the rear surface 24b. Although not shown in the drawings, other grooves are additionally formed at positions for attaching the remaining Y coils Y5 to Y20 on the attachment panel 24. Those other grooves have the same structures as those of the above-described grooves for the Y coils Y1 to Y4. The Y coils Y5 to Y13 are fitted in these grooves, thereby being mounted on the attachment panel 24.

Figure 19:
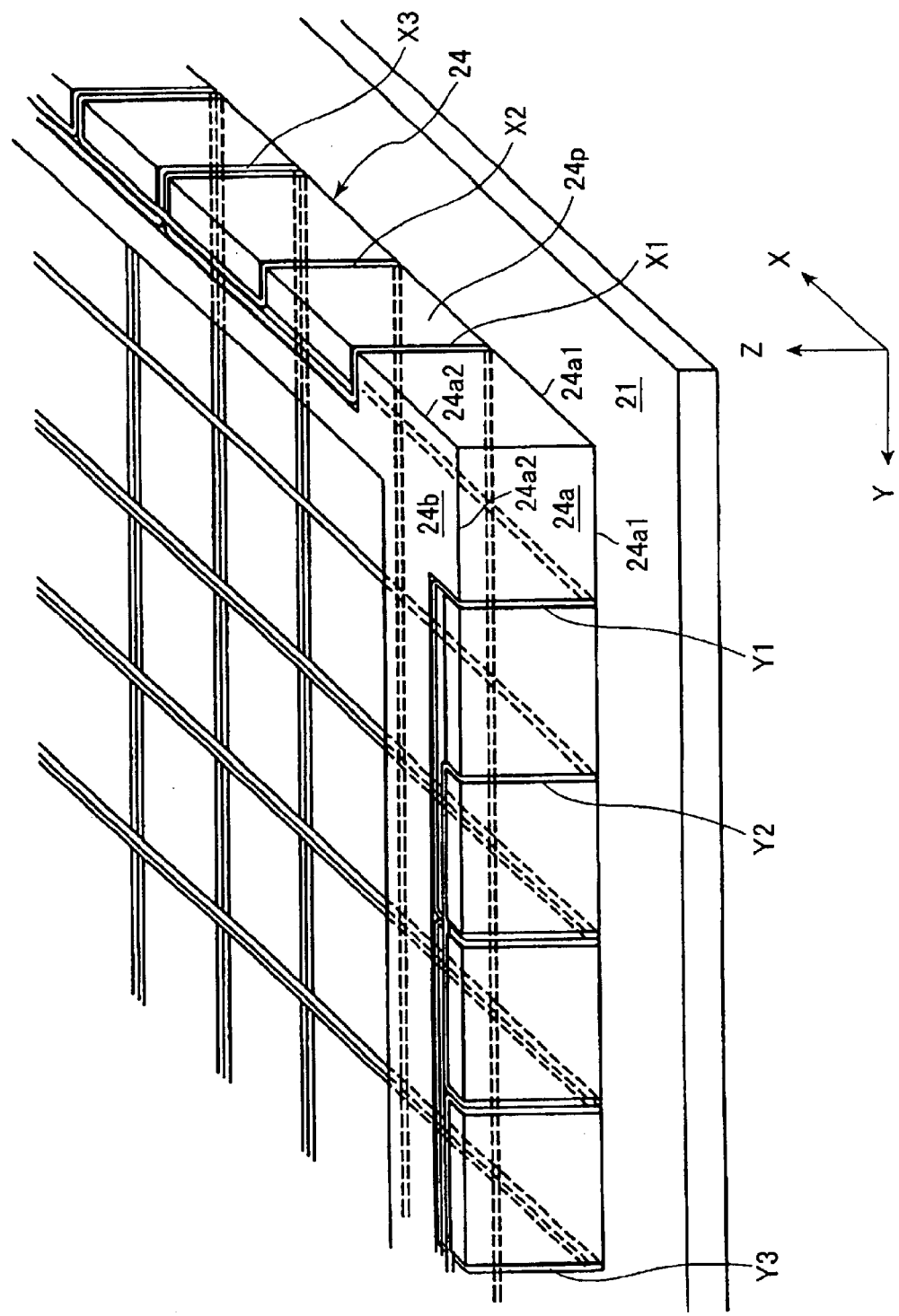
FIG. 19 illustrates how Y and X coils are attached to edge surfaces of the attachment panel to provide the short sides Yd and Xd.
Figure 20:
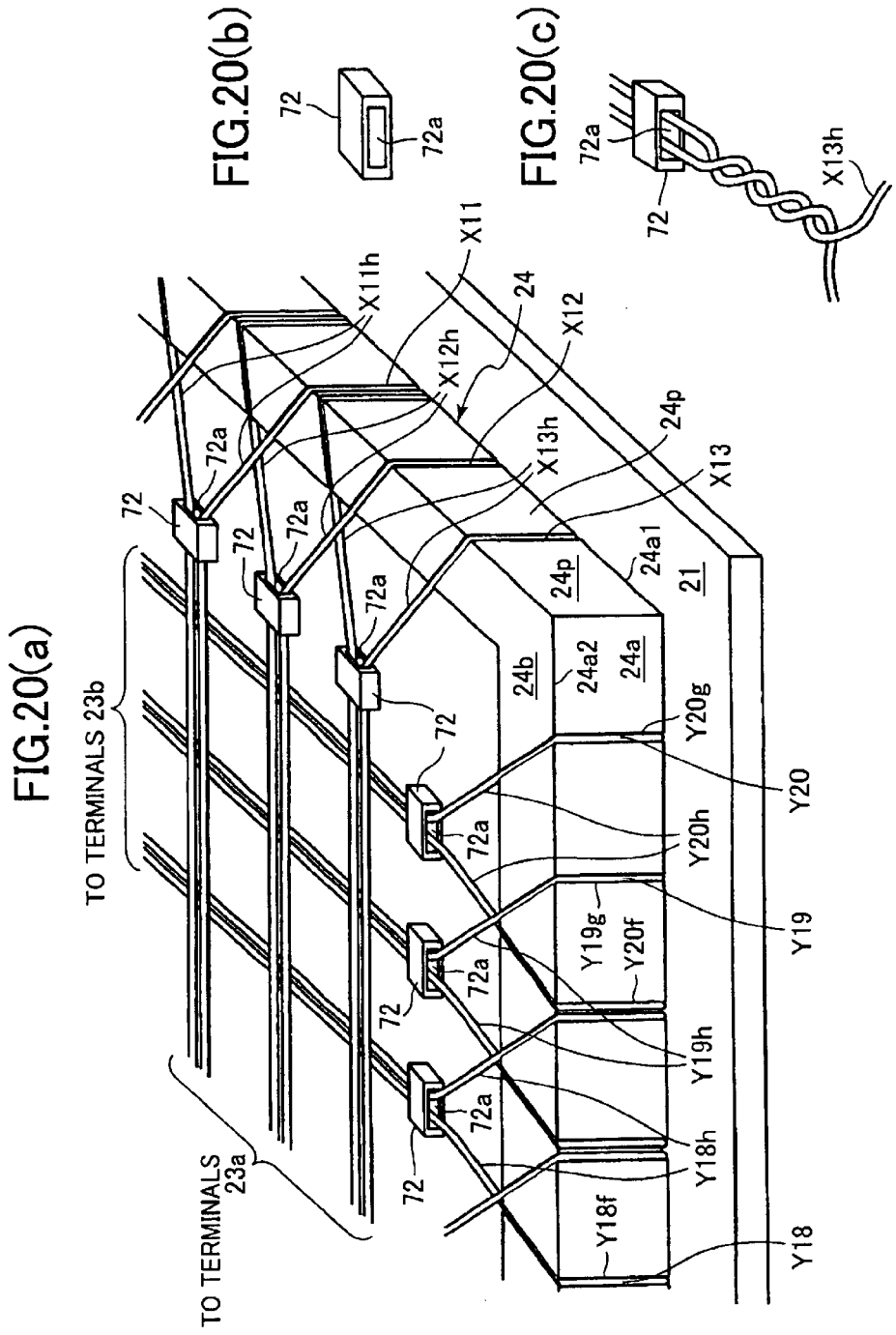
FIG. 20(a) Illustrates how Y and X coils are attached to the opposite edge surfaces of the attachment panel to provide the short sides Yh and Xh.
FIG. 20(b) is an external view of a binding member shown in FIG. 20(a)
FIG. 20(c) illustrates a modification of how the wires of a coil are terminated.

As shown in FIG. 19, the pair of long sides Xf and Xg of each of X coils X1 to X3 follow the front surface 24n, and is bent onto the edge surface 24p, on the upper side of the attachment panel 24, and is further bent onto the rear surface 24b in the same manner as the Y coils Y1–Y4. Although not shown in the drawing, remaining X coils X4 to X13 are also attached to the attachment panel 24 in the same manner as the X coils X1 to X3.

Each of the Y coils Y1–Y20 is designed to have the short side Yh in a manner shown in FIG. 20(a). The short side Yh is connected to the corresponding terminal 23b. Similarly, each of the X coils X1–X13 is designed to have the short side Xh in the same manner as Y coils. The short side Xh is connected to the corresponding terminal 23a.

FIG. 20(a) shows the rear surface 24b of the attachment panel 24 at its lower-right corner of the attachment panel 24 (FIG. 5), which is opposite to the upper-left corner shown in FIGS. 17–19.

As shown in FIG. 20(a), a binding member 72 is used to bind together the terminal ends of the pair of long sides Xf, Xg, Yf, Yg of each coil X1–X13, Y1–Y20, thereby producing the short sides Xh and Yh. As shown in FIG. 20(b), the binding member 72 is in a plate shape and is formed with a through-hole 72a that extends between its opposite edges that confront each other in the lengthwise direction of the binding member 72. The through-hole 72a has a size large enough that two wires of a single coil can pass through the through-hole 72a.

As shown in FIG. 20(a), when the pair of long sides Y20f and Y20 g of the Y coil Y20 reach the edge 24a1 of the edge surface 24a on the right side of the attachment panel 24, the long sides Y20f and Y20 g are bent at the edges 24a1 and 24a2 onto the rear surface 24b, thereby providing the short side Y20h on the rear surface 24b. The two wires constituting the short side Y20h pass through the through-hole 72a of a corresponding binding member 72, and are bound together.

Similarly, the pair of long sides Y19f and Y19g of the Y coil Y19 are bent onto the rear surface 24b, thereby providing the short side Y19h on the rear surface 24b. The two wires constituting the short side Y19h pass through the through-hole 72a of a corresponding binding member 72, and are bound together.

Similarly, the pair of long sides Y18f and Y18g of the Y coil Y18 are bent onto the rear surface 24b, thereby providing the short side Y18h on the rear surface 24b. The two wires constituting the abort side Y18h pass through the through-hole 72a of a corresponding binding member 72, and are bound together. The thus bounded terminal portion of each coil Y20–Y18 is connected to the corresponding terminal 23b.

Similarly, when the pair of long sides X13f and X13g of the X coil X13 reach the edge 24a1 of the edge surface 24p on the lower side of the attachment panel 24, the long sides X13f and X13g are bent at the edges 24a1 and 24a2 onto the rear surface 24b, thereby providing the short side X13h on the rear surface 24b. The two wires constituting the short side X13h pass through the through-hole 72a of a corresponding binding member 72, and are bound together.

Similarly, the pair of long sides X12f and X12g of the X coil X12 are bent at the edges 24a1 and 24a2 toward the rear surface 24b, thereby providing the short side X12h on the rear surface 24b. The two wires of the short side X12h pass through the through-hole 72a of a corresponding binding member 72, and are bound together.

Similarly, the pair of long sides X11f and X11g of the X coil X11 are bent at the edges 24a1 and 24a2 toward the rear surface 24b, thereby providing the short side X11h on the rear surface 24b. The two wires of the short side X11h pass through the through-hole 72a of a corresponding binding member 72, and are bound together. The thus bounded terminal portion of each coil X13–X11 is connected to the corresponding terminal 23a.

In this example, the terminal portions of each coil are bound together by simply passing through the through-hole 72a of the binding member 72. However, the terminal portions of each coil can be terminated as shown in FIG. 20(c). That is, the terminal portions X13h of the X coil X13 are twisted together before being passed through the through-hole 72a of the corresponding binding member 72.

In the above-described example, the binding member 72 is made from a synthetic resin. However, the binding member 72 could be formed from a metal or rubber material, and its configuration need not be limited to that shown in FIG. 20(b).

The attachment panel 24 mounted with the sense coils 23 in the above-described manner is assembled with the writing sheet 21, the panel 22, and the back plate 25 into the main panel body 20 as shown in FIG. 5. Thus, the back panel 25 is fixed in place on top of the rear surface 24b of the attachment panel 24. For this reason, the short sides of the X and Y coils are fitted in the grooves on the rear surface 24b, and the second bent portions of the X and Y coils are prevented from falling out of the corresponding grooves. Therefore, the fixed condition of the X and Y coils onto the attachment panel 24 can be maintained. On the other hand, by simply removing the back panel 25 from the attachment panel 24, the X coils and Y coils can be removed from the attachment panel 24. Therefore, if one of the sense coils is broken or cut, the defective sense coil can be easily replaced to a new sense coil. Moreover, because the back panel 25 is formed from a foam resin, it is relatively easy to form grooves at desired positions so that special orders for individual electronic white board 1 can be easily satisfied.

The X coils and Y coils can be attached by a variety of other different methods. Representative examples of those methods are described below.

① The X and Y coils can be adhered fixedly into the grooves using adhesive.

② The grooves for fitting a wire for single coil can be formed to a width that is slightly narrower than the diameter of the wire so that the coil will fit in the groove with a tight fit, thereby fixing the coil in place.

③ The X and Y coils can be fixed in place by adhering adhesive tapes onto the attachment panel 24.

④ A metal or synthetic-resin clasp can be used to straddle and pin down the short side of the X or Y coils.

⑤ Protrusions, such as pins, can be formed on the rear surface 24b or the edge surface 24a of the attachment panel 24 at positions corresponding to the angled ends of the short sides Xd, Yd of the X and Y coils. The short sides Xd, Yd of the X and Y coils are caught on the protrusions.

In particular, the method ② allows forming grooves at desired positions with relative ease in the surface of the attachment panel 24 where the sense coils 23 are to be provided. The grooves are formed with a width either the same as or slightly narrower than the thickness of the wire making the loop-shaped sense coil 23, and to a length equivalent to the long sides of the loop-shaped sense coil 23. The long sides of the loop-shaped sense coil are pulled straight on the front surface 24n and then bent to the rear surface 24b. This provides appropriate holding force for maintaining the long sides on the front surface 24n. According to this method, the long sides of each sense coil 23 need only be fitted into the grooves and fixed in place. Accordingly, special orders for individual electronic white boards 1 can be easily satisfied, and in addition, there is no need to provide a special jig to fix the sense coils 23 onto the attachment panel 24. There is also no need to adhere the sense coils 23 in place on the attachment panel 24. It becomes extremely easy to produce a light weight electronic white board by simply pulling straight the long sides of the sense coils 23 on the panel 24. The entire electronic white board 1 can be made lighter in comparison with the case where adhesive is used to fix the sense coils onto the panel 24. Also, because no adhesive is needed to attach the loop wires, any special types of coordinate reading devices can be easily produced.

The long sides of the sense coils 23, mounted on the attachment panel 24 in this manner, will not bend or will not be loosened even with changes in the ambient environment, such an changes in the temperature of the room. Accordingly, it is possible to maintain, at a high level, the precision at which the sense coils 23 can detect the position of the pen 60.

This configuration is extremely effective when many sense coils 23 Are provided on the attachment panel 24 and when the sense coils 23 are arranged at a very fine pitch. Because the sense coils 23 are always maintained in the appropriate arrangement, precision of the position detection of the pen 60 can be maintained at a properly high level.

Because all of the sense coils 23 are mounted to the panel 24 detachably, then even if one of the sense coils 23 breaks, new sense coil can be easily exchanged for the broken one.

Figure 21:
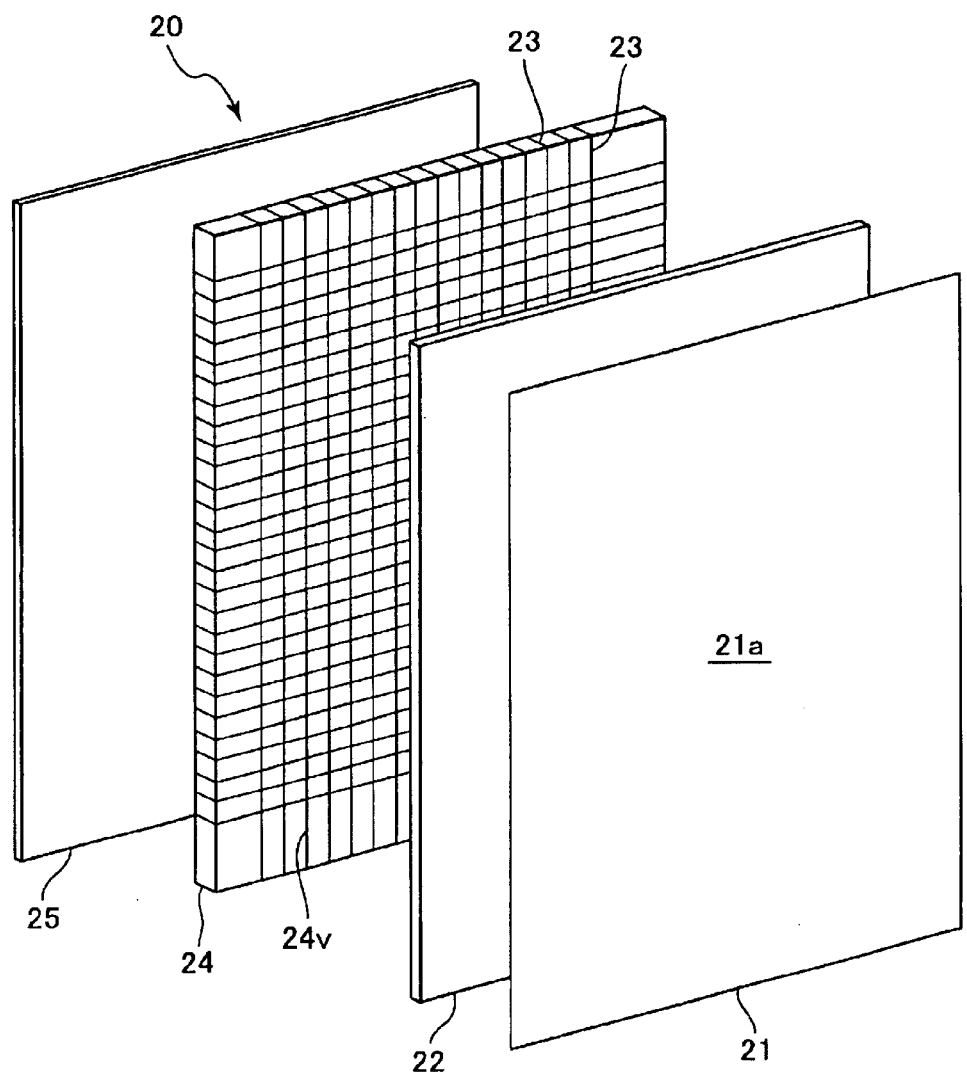
FIG. 21 is a modification of a panel main body 20.

In the above description, the attachment panel 24 in in a frame shape. However, the attachment panel 24 may be formed simply in a plate shape as shown in FIG. 21. In this example, the plate-shaped panel 24 is made from a foam resin material, such as styrene foam. A plurality of slits 24v are cut into the attachment panel 24, using a tool such as a blade. The long sides of the plurality of loop-shaped sense coils 23 are fitted into the slits 24v. By doing this, the sense coils 23 can be maintained at appropriate conditions on the attachment panel 24.

Next, other configuration for attaching the sense coils 23 will be described while referring to FIGS. 22 and 23.

Figure 22:
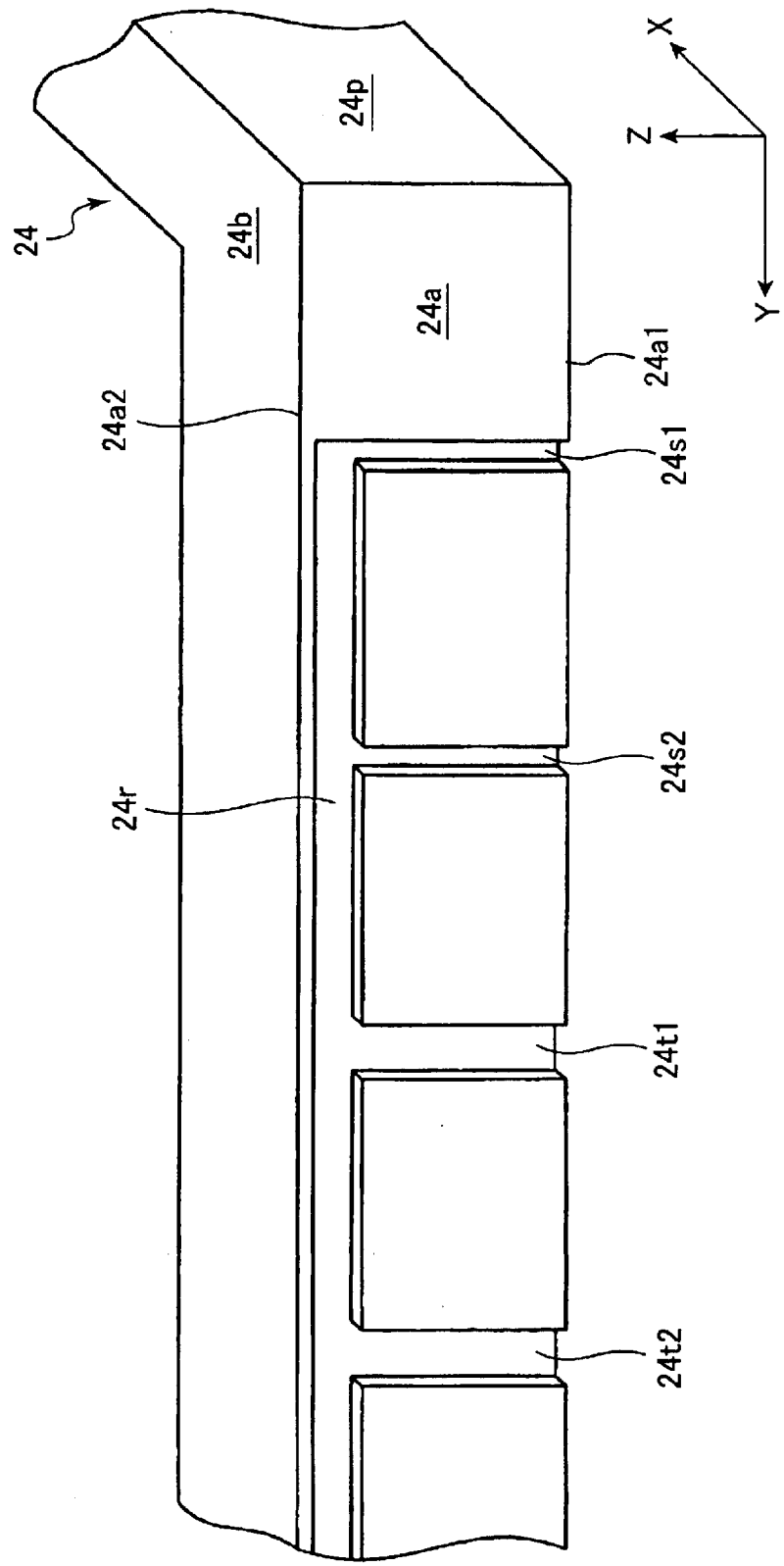
FIG. 22 illustrates a modification of the structure of the edge surface of the attachment panel 24.

FIG. 22 is a perspective view showing a variation of the attachment panel 24 with a different configuration for attaching the sense coils 23. FIG. 23 is a perspective view showing the attachment panel 24 of FIG. 22 with the Y coils Y1–Y4 being attached in place.

As shown in FIG. 22, a Y axis groove 24r and a Z axis groove 24s1, 24s2, 24t1, 24t2 are formed in the edge surface 24a of the attachment panel 24. As shown in FIG. 23, the short sides Y1d, Y2d, Y3d, Y4d of the Y coils Y1 to Y4 are fitted in the Y axis groove 24r. Also, a first bent portion Y1a of the Y coil Y1 is fitted in the Z axis groove 24s1. A first bent portion Y2a of the Y coil Y2 in fitted in the Z axis groove 24s2. The other first bent portion Y1b of the Y coil Y1 and a first bent portion Y3a of the Y coil Y3 are fitted in the Z axis groove 24t1. The other first bent portion Z2b of the Y coil Y2 and a first bent portion Z4a of the Y coil Y4 are fitted in the Z axis groove 24t3.

Figure 23:
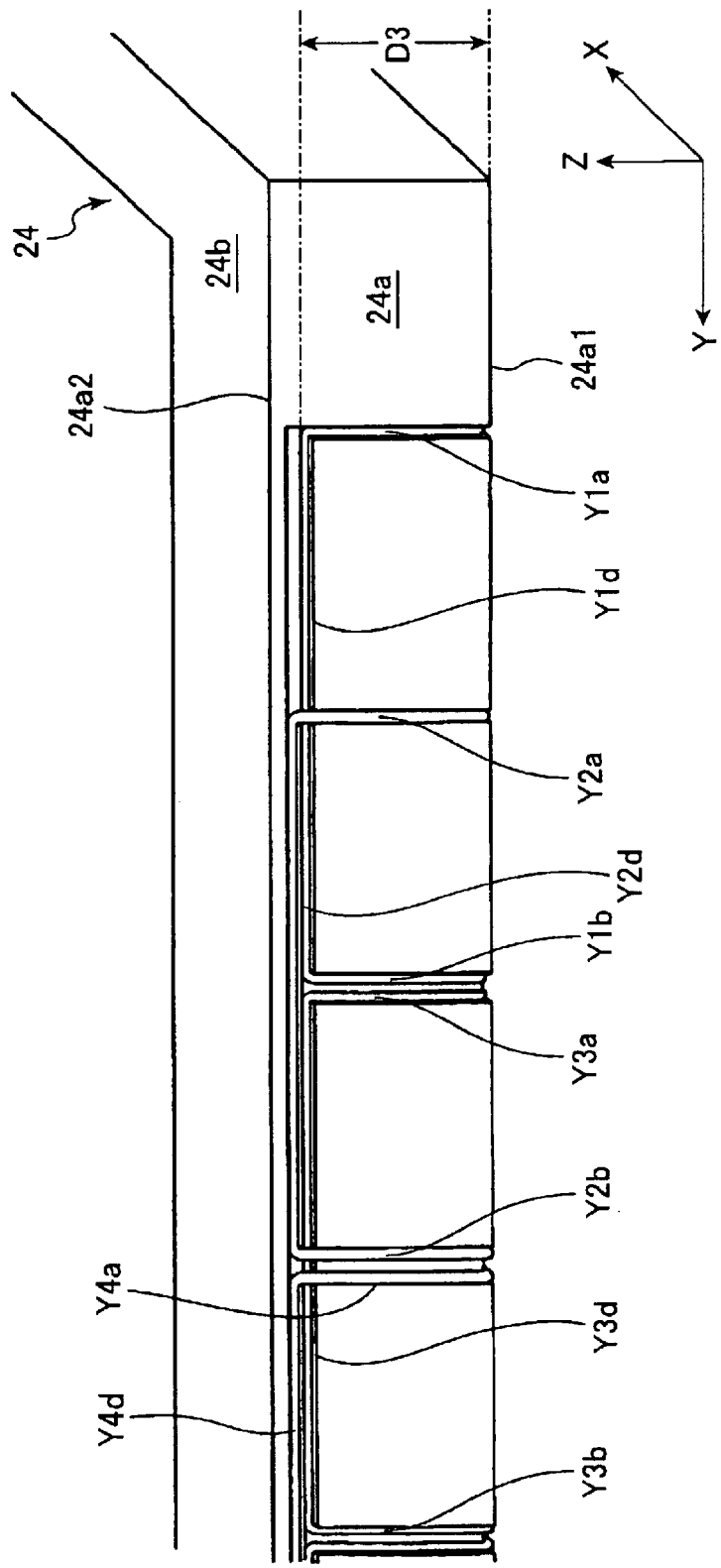
FIG. 23 illustrates how Y coils are attached to the edge surface of the attachment panel 24 of FIG. 22.

As apparent from FIG. 23, the short sides Y1d, Y2d, Y3d, Y4d of the Y coils Y1 to Y4 can be attached at positions near the second edge 24a2 on the edge surface 24a. In this case, the Y coils Y1 to Y4 may not be attached to the attachment panel 24 merely by fixing the back panel 24 onto the rear surface 24b. Therefore, one of the above-described attachment methods ① to ⑤ needs to be employed to fix the Y coils onto the edge surface 24a.

<Experiments>

First and second experiments were conducted to measure how voltages generated by the sense coils 23 change according to the depth D3 at which the sense coils are bent from the front surface 24n of the attachment panel 24.

Figure 24A:
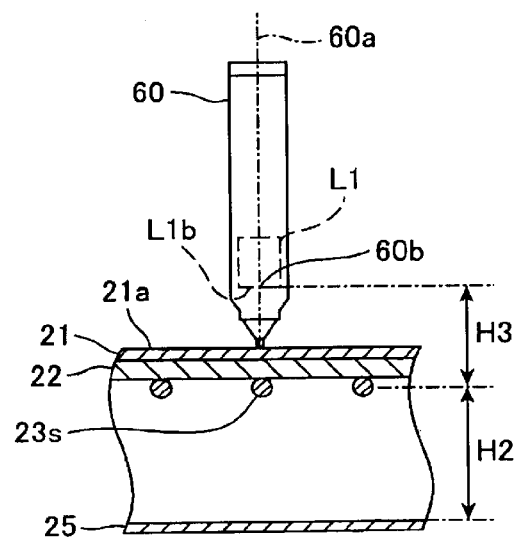
FIG. 24(a) is a cross-sectional view showing conditions employed under first and second experiments.
Figure 24B:
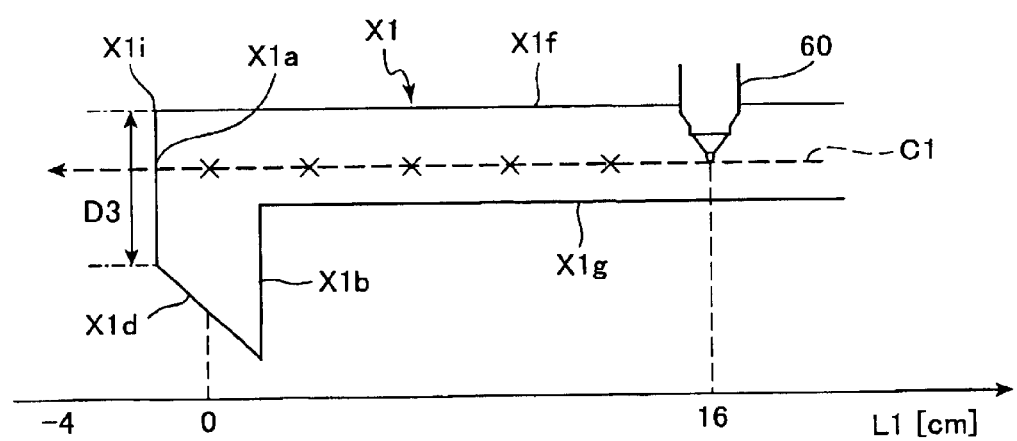
FIG. 24(b) is a schematic view showing how the first and second experiments were conducted.
Figure 25:
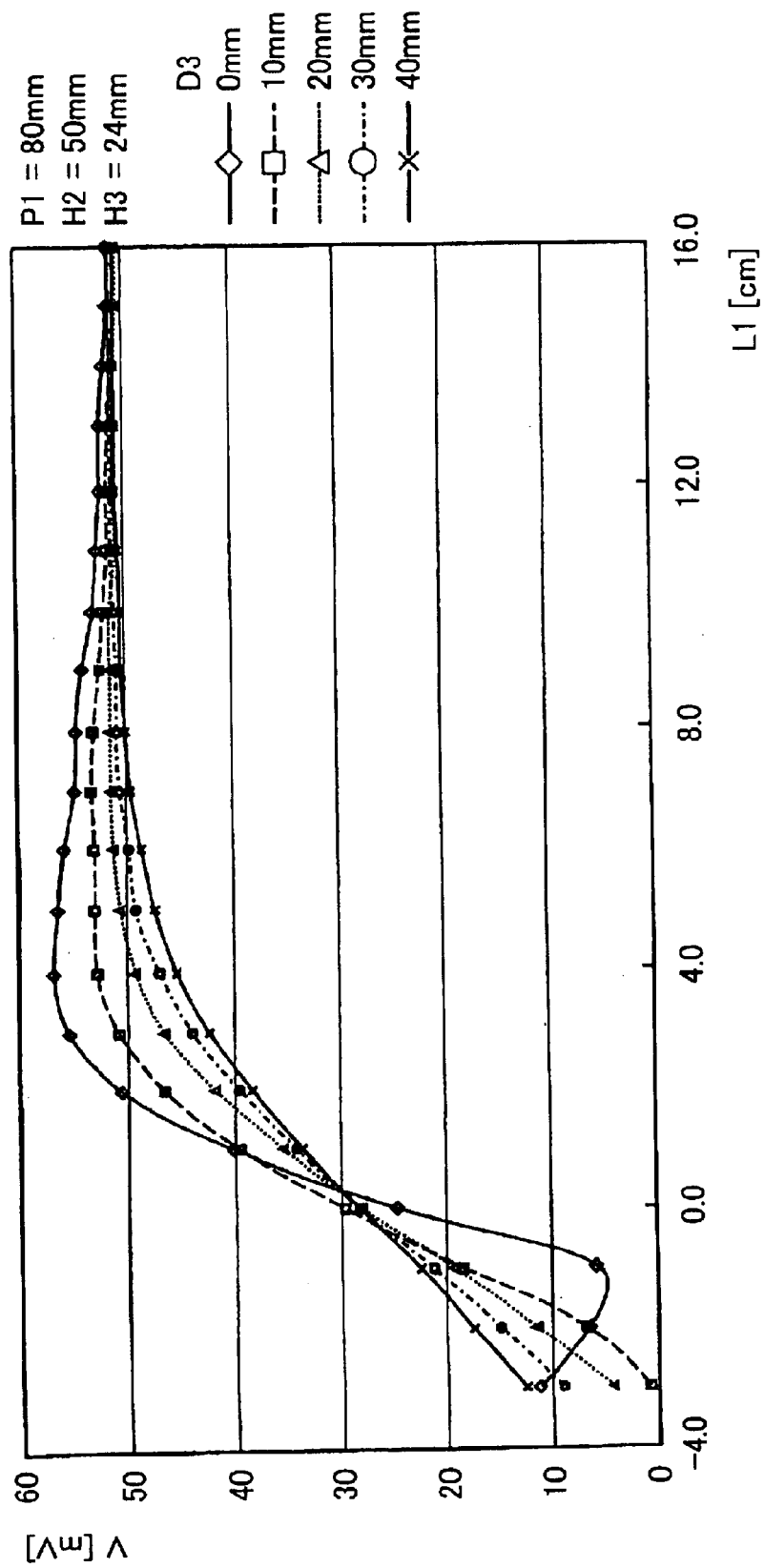
FIG. 25 is a graph showing results of the first experiments.
Figure 26:
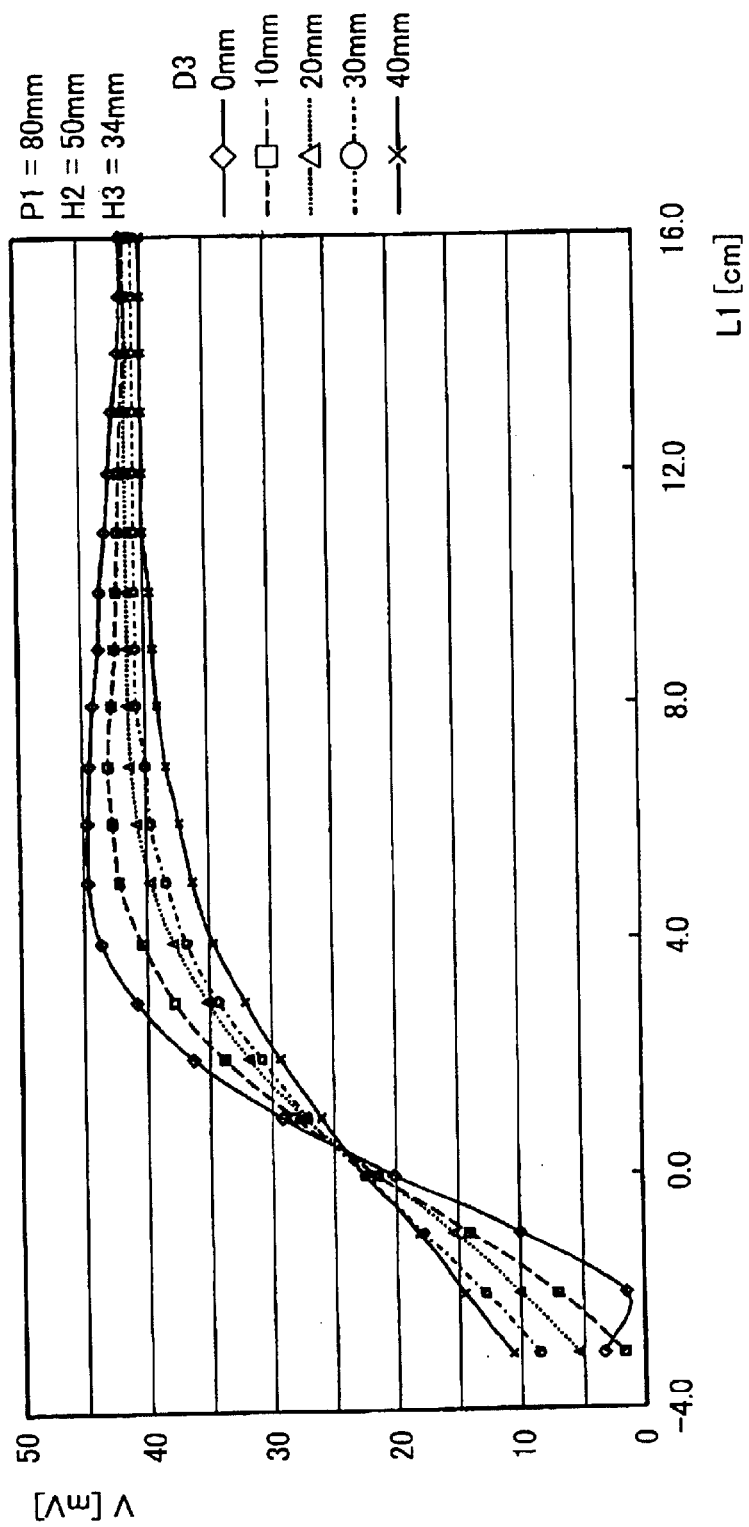
FIG. 26 is a graph showing results of the second experiments.

FIG. 24(a) is a cross-sectional view showing conditions employed under the first and second experiments. FIG. 24(b) is a schematic view showing how the first and second experiments were conducted. FIG. 25 is a graph showing results of the first experiments. FIG. 26 is a graph showing results of the second experiments.

The first and second experiments were conducted to measure the value of the voltage which was induced at the X coil X1. The coil X1 was bent at the edge 24a1 onto the edge surface 24p to provide the short side X1d on the edge surface 24p in the same manner as the Y coil Y1 shown in FIG. 23.

During the experiments, the pen 60 was placed in an upright posture normal to the writing surface 21a as shown in FIG. 24(a). The coil L1 in the pen 60, used in the experiments, was made from a ferrite core wound by a copper wire. The coil L1 generated an alternating magnetic field with frequency of 51.5 kHz. The width P1 of each sense coils 23 was 80 mm. As shown in FIG. 24(a), the distance or height H2, between the inner surface of the back panel 25 and the sense coils 23, was 50 mm. The sheet 21 was made from an acrylic plate with a thickness of 4 mm. A coil height H3 was 24 mm. As shown in FIG. 24(a), when the pen 60 is placed on the writing surface 21a with its central axis 60a extending perpendicular to some sense coil 23s, the pen 60 has an intersection point 60b, at which a lower surface L1b of the coil L1 intersects with the central axis 60a. The coil height H3 is defined as a distance between the intersection point 60b and the sensor coil 23s that intersects with the central axis 60a.

During the first experiments. as shown in FIG. 24(b), the pen 60 was placed on the writing surface 21a on the central line C1 between the pair of long sides X1f and X1g of the sense coil X1. At an initial stage, the pen 60 was placed at a position that is separated by 16 cm from an edge X1i of the sense coil X1, at which the sense coil X1 is bent on the edge 24a1 toward the edge surface 24p. In FIG. 24(b), this initial position in separated from the edge X1i in the rightward direction by a distance L1 of 16 cm. Then, the pen 60 was pressed against the writing surface 21a, whereupon the coil L1 was energized. The coil L1 generated an alternating magnetic field. Upon receipt of the alternating magnetic field, the sense coil X1 produced an electric signal. The amount of the voltage of the electric signal was measured.

After the voltage measurement, the pen was moved 1 mm at a time toward the edge X1$i$ of the sense coil X1. The voltage of the signal generated by the sense coil X1 was measured again. Thus, the measurement was repeatedly conducted while the pen was moved toward the edge X1$i$ 1 cm at a time until the pen passed the edge X1$i$ and reached a final position that is separated from the edge X1$i$ in the leftward direction of FIG. 24($b$) by the distance of 4 cm. In other words, the final position is separated from the edge X1$i$ by the distance L1 of −4 cm. Thus, voltage measurement was repeatedly performed while the pen 60 was moved by 20 cm in total from the initial position to the final position.

The above-described single series of voltage measurements were performed when the depth D3 of the bent portion of the X coil X1 was set to 40 mm. As shown in FIG. 24($b$), the depth D3 in the length from the edge portion X1$i$ to the short side X1$d$ of the X coil X1. Next, another series of the same voltage measurements were performed when the depth D3 was changed to 30 mm. Further two series of the same voltage measurements were performed when the depth D3 was changed to 20 mm and 10 mm. In a comparative situation, another series of the same voltage measurements were performed when the depth D3 was 0 mm. In this comparative situation, the sense coil X1 was not bent.

Thus, the above-described voltage measurements were taken, at 1 cm intervals for the movement of the pen 60, for each depth D3 of 0 mm, 10 mm, 20 mm, 30 mm, and 40 mm.

Results of the first experiments were shown in FIG. 25. As apparent from FIG. 25, when the bending depth D3 was 0 mm. 10 mm, or 20 mm, the voltage V increased when the pen 60 moved close to the edge portion X1$i$ of the X coil X1. However, when the bending depth D3 was 30 mm or 40 mm, the voltage value V remained flat and did not increase even when the pen 60 moved close to the edge portion X1$i$ of the X coil X1. It is therefore confirmed that when the coil height H3 is set to 24 mm, by bending the ends of the long sides of the X coil X1 to 30 mm or greater, the voltage generated by the sense coil X1 does not increase even if the pen 60 moves close to the edge X1$i$ of the sense coil 23. Accordingly, even if the pen 60 moves to the edge of the writing surface 21$a$, the processing burden placed on the CPU 56 will not increase because the amplitude value measured by the A/D conversion circuit 52 will not increase.

It is assumed that the comparative example, wherein the sense coil is not bent, requires nine bits, in total, to detect the voltage at the edge portion. Contrarily, by bending the sense coil by 30 mm or 40 mm, the voltage at edge portion can be detected using only eight bits which in a saving of the single bit. This single bit reduction translates into a reduction in burden on processes performed at the CPU 56. Additionally, there is no need to broaden the dynamic range of the amplifier 50$c$ in order to cope with the high voltage at the edge portion because the voltage will not change drastically at the edge portion.

It is noted that as shown in FIG. 25. voltage V tends to drop when the pen 60 enters the negative region of L1 (L1<0) beyond the edge X1$i$ of the sense coil X1, regardless of the amount of the bending depth D3. However, the incline in reduction of voltage V is smaller when the bending depth D3 is 30 mm or greater in comparison with the case when the bending depth D3 is 0 mm, 10 mm, or 20 mm. Accordingly, even when the pen 60 is located in the negative region of L1, by setting the bending depth D3 to 30 mm or greater, it is possible to allow the sense coil to produce a voltage of an amount appropriate for detecting position of the pen 60. Accordingly, when the coil height H3 is set to 24 mm, by bending the ends of the long sides of the sense coil X1 to 30 mm or greater, it is possible to broaden the region, where the position of the pen 60 can be detected, beyond the edge portion X1$h$.

The second experiments were conducted by setting the coil height H3 to 34 mm. That is, the coil L1 in the pen 60 was raised by 10 mm higher than in the state of the first experiment. The same procedures as in the first experiment were conducted.

As shown in FIG. 26, when the bending depth D3 of the sense coil X1 was set to 40 mm, the voltage value from the sense coil X1 remained flat and did not increase even when the pen 60 moved close to the edge portion X1$i$ of the sense coil X1. Accordingly, it is confirmed that when the coil height H3 is set to 34 mm, by bending the ends of the long sides of the sense coil 23 by 40 mm or more, burden on the CPU 56 can be prevented from increasing because the amplitude values measured by the A/D conversion circuit 52 will not increase. As shown in FIG. 26, when the bending depth D3 was set to 40 mm, then the degree, at which the voltage declines within the negative region of L1, becomes smaller in comparison with the case where the bending depth D3 was 0 mm, 10 mm, 20 mm, and 30 mm. Accordingly, by setting the bending depth D3 to 40 mm, it is possible to allow the sense coil X1 to produce a voltage of an amount that enables detection of position of the pen even when the pen 60 moves to enter the negative region of L1. Accordingly, when the coil height H3 is 34 mm, then by banding ends of the long sides of the sense coil X1 to a height of 40 mm or greater, then it is possible to broaden the region, where the position of the pen can be detected, to the region exceeding the edge portions.

Thus, according to the present embodiment, the plurality of sense coils (loop wires) are mounted on the front surface of the attachment panel 24, and are bent at their edge portions on the edge of the panel 24 toward the rear surface of the panel. Therefore, a signal generated by the sense coils is only slightly effected by signals generated at the edges of the sense coils. Therefore, increase in detection voltages at the edges of the panel can be suppressed.

The attachment panel 24 has the front surface 24$n$, and the right and left edge surfaces 24$a$, each having the first edge 24$a$1. The sense coil X1 is attached to the attachment panel 24 with its long sides X1$f$ and X1$g$ being bent at the first edges 24$a$1 from the front surface 24$n$ to the edge surfaces 24$a$. Accordingly, as shown in FIGS. 18 and 23, the distance from the first edge 24$a$1 to the short side X1$d$ of the sense coil X1 can be indicated by the distance D3. As shown in FIG. 24($a$), when the pen 60 is placed on the writing surface 21$a$ with its center axis 60$a$ being orthogonal to some sense coil 23$s$, the distance from the intersection point 60$b$ to the sense coil 23$s$ is designated by the distance H3. By setting the distance D3 longer than the distance H3, a signal generated at the short side portion X1$d$ of the sense coil X1 will give only a slight influence on the long sides X1$f$ and X1$g$ of the sense coil X1. Similarly, an shown in FIG. 20, the distance from the first edge 24$a$1 to the short side X1$h$ of the sense coil X1 is also equal to the distance D3. When the pen 60 is placed on the writing surface 21$a$, by setting the distance D3 longer than the distance H3, a signal generated at the short side portion X1$h$ will give only a slight influence on the long sides X1$f$ and X1$g$.

Therefore, even when the pen 60 is located at any edge portions of the writing surface 21$a$, rises in voltage generated from the sense coil X1 can be suppressed. For example, as shown in FIG. 25, when the distance H3 is set to 23 mm, by setting the distance D3 to 30 mm or more, increase in the detection voltage can be suppressed even when the pen is located at the edge portions of the panel.

For example, in the case of FIG. 18, the long sides X1f and X1g of X coil X1 follow the front surface 24n and are bent at the first edge 24a1 onto the edge surface 24a, and are further bent at the second edge 24a onto the rear surface 24b. With this arrangement, even if the pen moves near to any edge portion of the writing surface 21a, signals generated at the long sides X1f and X1g have little influences from signals generated at the short sides X1d or X1h. Therefore, increase in detection voltages can be suppressed even when the pen is located at any edges of the writing surface 21a.

Because the grooves are formed on the panel 24 to hold at least the bent edge portions of the sense coils, the sense coils 23 can be properly and fixedly bent at their edge portions.

Various modifications can be provided to the present embodiment.

For example, the sense coils 23 can be secured in place by providing a plurality of pins on the attachment panel 24 and by holding the bent portions of the sense coils 23 using the pins. The bent portions of the sense coils can be constructed from wires printed on a print board.

In the above description, each sense coil (loop wire) 23 is made from a copper wire covered with an insulation film, such as a nichrome plating layer or an enamel layer. However, the sense coils 23 could be constructed from a bundle of electric wires, such as a parallel ribbon electric wires. Or, the sense coils 23 could be formed on a sheet shaped film using a film-forming method, such as plating, etching, photoresist, or vapor deposition. By bending edges of the sheet film, the ends of the sense coil 23 can be bent.

<Second Embodiment>

A second embodiment will be described below with reference to FIGS. 27(a)–33.

The electronic white board 1 of the present embodiment is the same as that of the first embodiment except for the points described below.

According to the present embodiment, the edge portions of the coils 23 are not bent contrarily to the first embodiment. According to the present embodiment, not only the long sides Xf, Xg, Yf, Yg but also the short sides Xd, Xh, Yd, Yh of all the sense coils 23 are provided over the front surface 24n of the attachment panel 24.

Figure 27A:
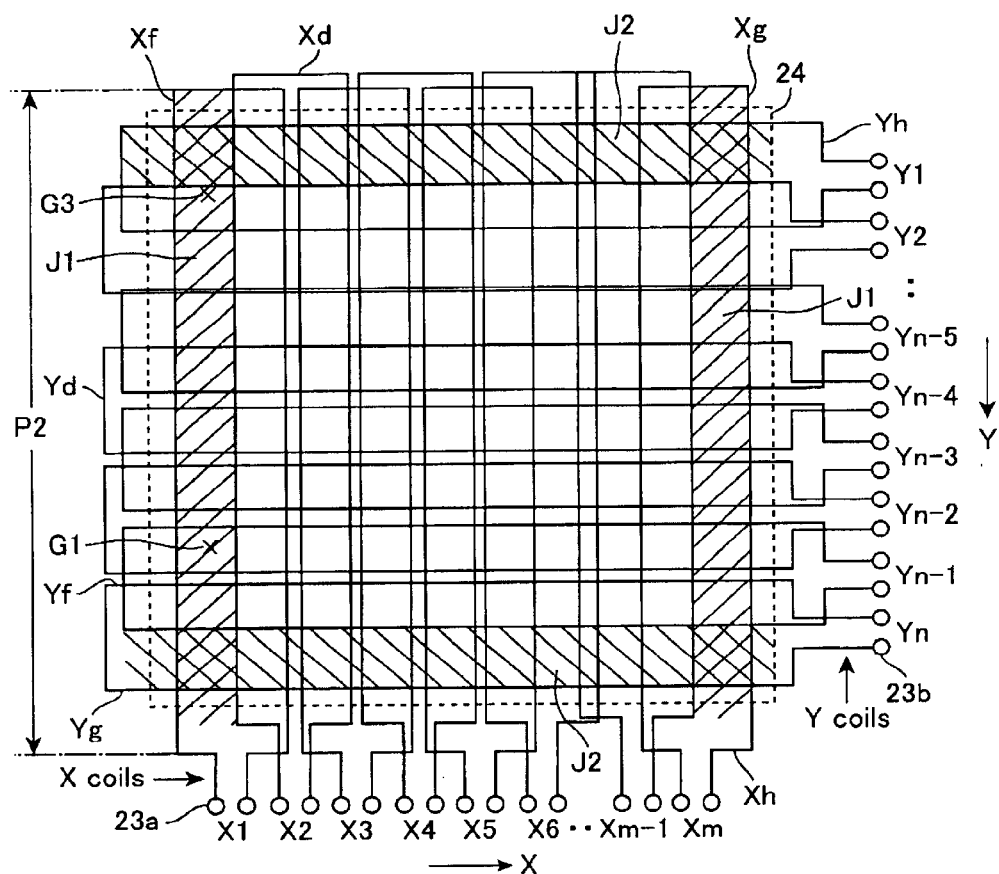
FIG. 27(a) illustrates how a plurality of sense coils 23 are arranged on the attachment panel 24, according to a second embodiment, while omitting a part of the sense coils.
Figure 27B:
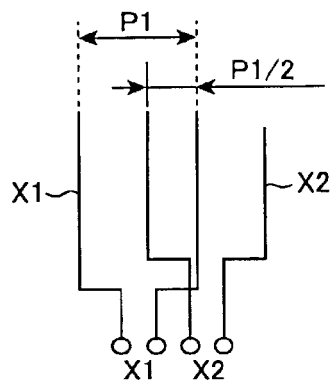
FIG. 27(b) illustrates a width of the sense coils 23 and a pitch, by which the sense coils 23 are arranged, while being partly overlapped with one another.

According to the present embodiment, the X and Y coils 23 are arranged as shown in FIG. 27(a). It is noted that in FIG. 27(a), for clarity and simplicity, the sides of the coils 23 are shifted from one another. However, actually, they are arranged to overlap with one another. Accordingly, the long sides X1g, X2g, . . . , and Xm-2g of the X coils X1, X2, . . . , Xm-2 overlap with long sides X3f, X4f, . . . , Xmf of X coils X3, X4, . . . , Xm, respectively. The long sides Y1g, Y2g, . . . , and Yn-2g of the Y coils Y1, Y2, . . . , Yn-2 overlap with long sides Y3f, Y4f, . . . , Ynf of Y coils Y3, Y4, . . . , Yn, respectively. Additionally, according to the present embodiment, the short sides Yd of all the Y coils 23 overlap with the long side Xf of the X coil X1, and the short sides Yh of all the Y coils 23 overlap with the long side Xg of the X coil Xm. The short sides Xd of all the X coils 23 overlap with the long side Yf of the Y coil Y1, and the short sides Xh of all the X coils 23 overlap with the long aide Yg of the Y coil Yn.

Figure 28:
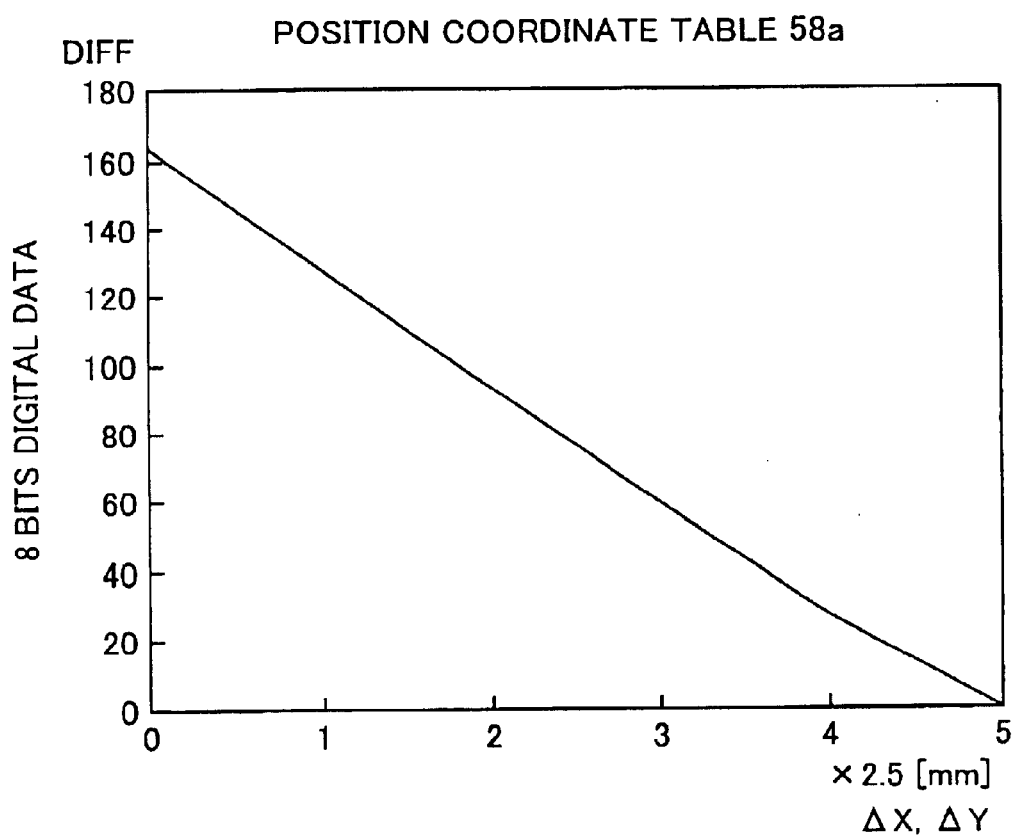
FIG. 28 is a graph representing a position coordinate table 58a according to the second embodiment.

The X coils X1–Xm and the Y coils Y1–Yn have the same lengths P2 as shown in FIG. 27(a). The length P2 is 900 mm. The total number m of X coils X1–Xm is 23, and the total number n of Y coils Y1–Yn is 34. The width P1, shown in FIG. 27(b), of each of the X and Y coils 23 is 50 mm. Accordingly, the P1/4 is equal to 12.5 mm, and therefore the position coordinate table 58a is prepared to indicate the relationship between the position coordinate values ΔX, ΔY and the voltage difference values DIFF as shown in FIG. 28. In other words, the position coordinate table 58a is prepared as shown in FIG. 11(b) where P1/4 is equal to 12.5 mm.

The present embodiment is provided to correct detection voltages, which are produced by the sense coils 23, when the pen 60 is located at the edges of the sense coils 23.

First, experiments were performed to measure the effect of the short sides Xd of the X coils to the detection voltages induced by the X coils.

It is noted that the position coordinate table 58a of FIG. 28 is prepared by repeatedly detecting a voltage difference (exi–exi+1) between the voltages at one set of two adjacent X coils Xi and Xi+1 (where 1≦i≦m) while moving the pen 60 from the center line Ci of the X coil Xi (ΔX=0) toward the intermediate line Qi (ΔX=P1/4), that is, the middle point in the area where the X coil Xi overlaps with the X coil Xi+1. Thus, the relationship between the distance ΔX and the voltage difference (exi–exi+1) is obtained. In this case, the pen 60 is moved on an imaginary line that is parallel to the X axis direction and that is separated from the short sides Xd, Xh of the X coils Xi and Xi+1 by a distance (of about P2/2) that is large enough so that no influences from the short sides Xd, Xh be given to that imaginary line position.

During the experiments, the relationship between the distance ΔX and the voltage difference (exi–exi+1) was obtained by moving the pen 60 on several different imaginary lines that are separated from the short sides Xd of the X coils Xi and Xi+1 by different distances of 0 cm to 13 cm.

Figure 29A:
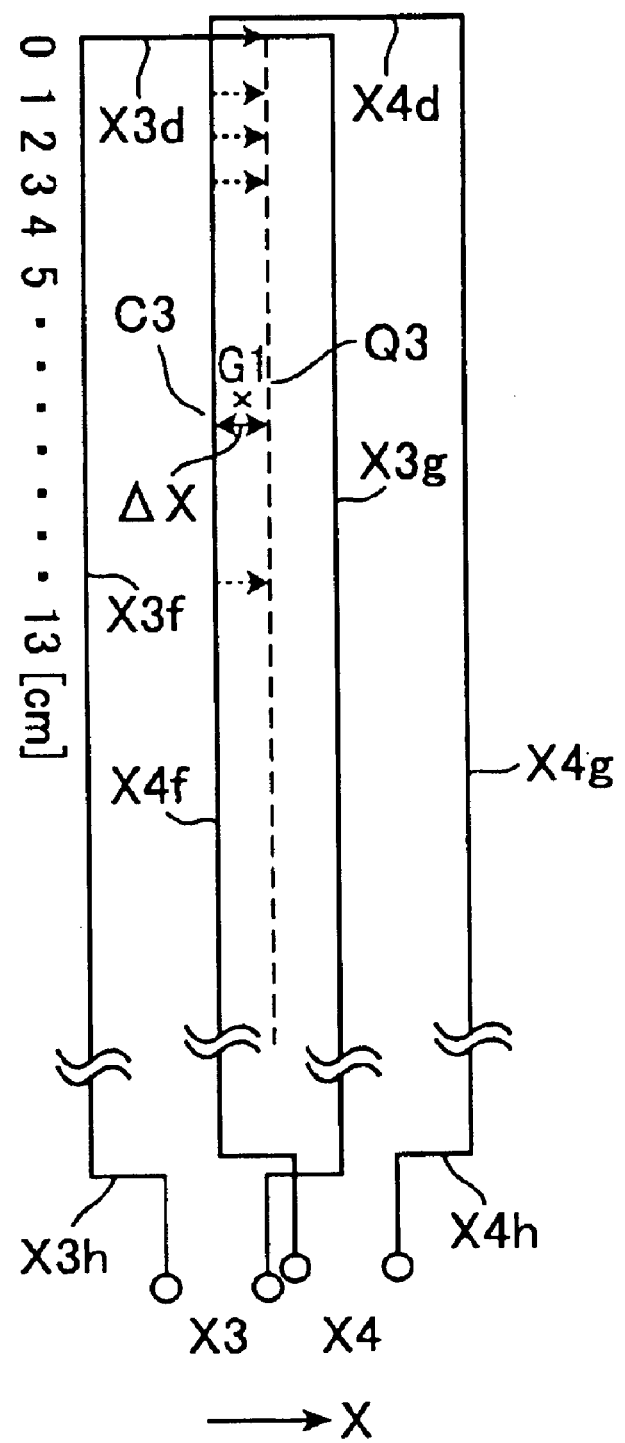
FIG. 29(a) shows how an experiment was conducted to examine the relationship between the distance ΔX from the center line C3 of the X coil X3 and the voltage difference (ex3−ex4) while moving the pen 60 on several different imaginary lines that are separated from the short sides Xd of the X coils by different distances of 0 cm to 13 cm.

More specifically, in the first series of measurements, as shown in FIG. 29(a), the pen 60 was moved on a first imaginary line that was exactly on the short sides X3d and X4d of the X coils X3 and X4 and therefore that was separated from the short sides X3d and X4d by a distance of zero (0) cm. The voltages ex3 and ex4 from the X coils X3 and X4 were detected. The relationship between the detected voltage difference (ex3–ex4) and the distance ΔX, of the pen from the center C3 of the X coil X3, was obtained.

More specifically, the voltage difference (ex3–ex4) between the voltages at the X coils X3 and X4 were measured while the pen 60 (point G1 in FIG. 29(a)) was moved along the short aides X3d and Y4d, from a position on the center line C3 (ΔX=0) to another position on the intermediate line Q3 (ΔX=P1/4), that is, the middle position in the area where the X coil X3 overlaps with the X coil X4. As a result, the relationship between the distance ΔX and the voltage difference (ex3–ex4) was obtained as indicated by a solid line in FIG. 29(b).

The same measurements were conducted while moving the pen 60 from the center line C3 to the intermediate line Q3 along another imaginary line that is separated from the short sides X3d and X4d by a distance of 1 cm. As a result, the relationship between the distance ΔX and the voltage difference (ex3–ex4) was obtained as indicated by a broken line in FIG. 29(b).

The same measurements were performed while moving the pen 60 from the center line C3 to the intermediate line Q3 along another imaginary line that is separated from the short sides X3d and X4d by a distance of 2 cm. As a result, the relationship between the distance ΔX and the voltage difference (ex3–ex4) was obtained as indicated by a two-dots-and-chain line in FIG. 29(b).

Figure 29B:
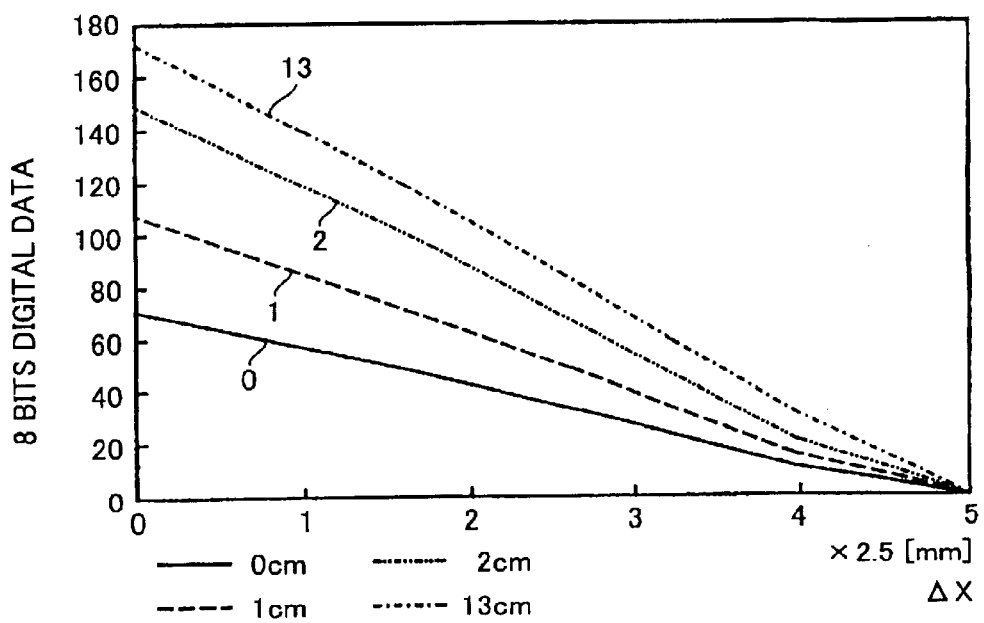
FIG. 29(b) shows the results of the experiment of FIG. 29(a)

The same measurements were performed repeatedly while moving the pen 60 from the center line C3 to the intermediate line Q3 along a plurality of different imaginary lines that are separated from the short sides X3d and X4d by different distances of 3 cm to 13 cm and that are separated from one another by a unit of 1 cm. In FIG. 29(b), a one-dot-and-chain line indicates the relationship between the distance ΔX and the voltage difference (ex3−ex4) that was obtained when the imaginary line wan separated from the short sides X3d and X4d by the amount of 13 cm.

As apparent from the graph of FIG. 29(b), the slant of the graph, indicative of the relationship between ΔX and the voltage difference (ex3−ex4), decreases as the position of the pen 60 becomes closer to the short sides X3d and X4d. The voltage difference (ex3−ex4) between the Y coils X3, X4 drops as the position of the pen 60 becomes closer to the short aides X3d and X4d.

It is confirmed from the above-described experiments that the influence of voltages generated from the short sides X3d and X4d increases as the position G1 of the pen 60 moves close to the short sides X3d and X4d. It is therefore known that X positional coordinate could not be accurately determined using the positional coordinate table 58a of FIG. 28 when the pen 60 is located close to the short sides Xd of the X coils because the voltage difference required for determining the X coordinate drops as shown in FIG. 29(b) when the pen is located close to the short sides Xd of the X coils.

The experimental results indicated by FIG. 29(b) show that the graphs of FIG. 29(b) can be corrected into the graph of FIG. 28 by correcting detection voltages, detected by sense coils X3 and X4, using a correction table 58b shown in FIG. 30. The correction coefficient K in the correction table 58b can properly correct the error in the X positional coordinate, which is occurred when the positional coordinate table 58a is used for determining the coordinate of the pen 60, when the pen 60 is located near the short side Xd of the X sense coil.

The correction table 58b shows how the correction coefficient K changes as the distance of the pen from the short sides Xd of the X sense coils changes. It is apparent that the correction coefficient K increases as the distance of the pen from the short aides Xd of the X sense coils decreases. Accordingly, when the pen 60 is positioned close to the short side Xd of some X coil, voltages detected at the X coils should be multiplied by the correction coefficient K that is stored in the table 58b in correspondence with the distance of the pen 60 from the short sides Xd of the X coils. The thus multiplied voltage values are used to determine the x coordinate value of the pen 60 while referring to the position coordinate table 58a. Thus, the x-positional coordinate can be properly determined.

It is noted that FIG. 29(b) shows the characteristics of the X coils in their one edge that in near to their short sides Xd. The X coils X1–Xm have the same characteristics as that shown in FIG. 29(b) also in their other edge that is near to their short side Xh. Accordingly, the correction table 58b of FIG. 30 should also be used when the pen is located close to the short sides Xd of the X coils. In this case, the horizontal axis in FIG. 30 indicates the distance of the pen from the short sides Xh of the X coils.

It is further noted that the Y coils have the same characteristic as that of the X coils described above. More specifically, the Y coils Y1–Yn have the same characteristics as that of FIG. 29(b) in both of their opposite edges that are near to their short sides Yd and Yh. Accordingly, the correction table 58b of FIG. 30 should also be used when the pen is located close to the short side Yd or Yh of the Y coils. In this case, the horizontal axis in FIG. 30 indicates the distance of the pen from the short sides Yd or Yh of the Y coils.

Thus, the correction table 58b of FIG. 30 can be used for detection of both the x and y positional coordinates. According to the present embodiment, therefore, data of the correction table 58b is stored in the ROM 58.

Figure 31A:
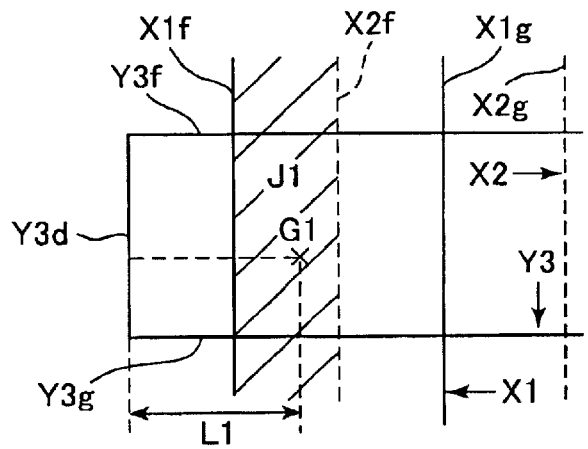
FIG. 31(a) shows a first situation where the pen 60 is located in one of a pair of most edge regions J1.
Figure 31B:
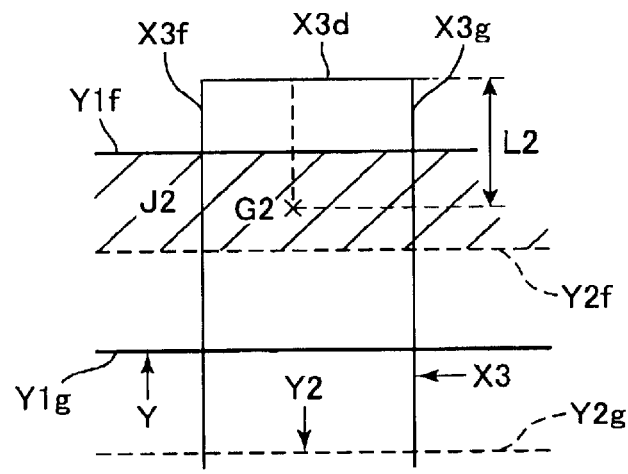
FIG. 31(b) shows a second situation where the pen 60 is located in one of another pair of most edge regions J2.
Figure 31C:
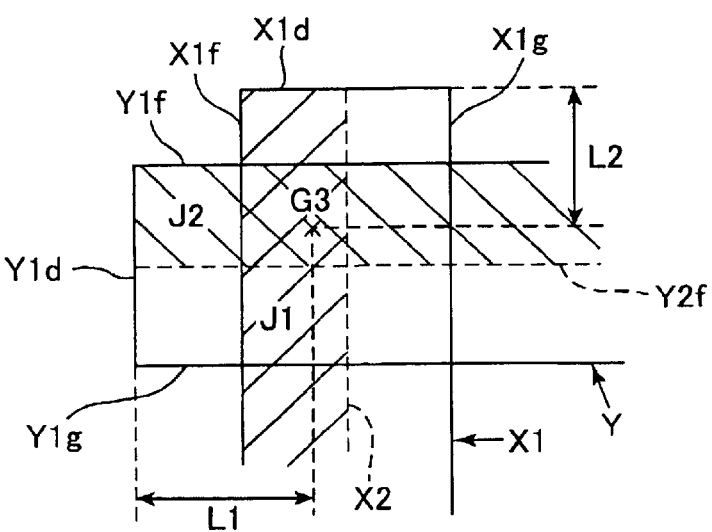
FIG. 31(c) shows a third situation where the pen 60 is located in one of four overlapping regions of the pair of most edge regions J1 and the pair of most edge regions J2.

As shown in FIGS. 31(a)–31(c), there are three different situations where the pen 60 is located at the pair of edge portions of the X and Y sense coils 23.

In a first situation, the pen 60 is located in either one of a pair of most edge regions J1 shown in FIG. 27(a). The pair of most edge regions J1 are defined in correspondence with a pair of border coils Xb. It is noted that the pair of border coils Xb are the X coil X1 and the X coil Xm, which are located at both ends of the group of X cools X1–Xm in the X direction. Each most edge region J1 is defined within the corresponding border X coil Xb (X1 or Xm) but outside of the adjacent X coil (X2 or Xm−1) which is adjacent to the border X coil (X1 or Xm). In other words, each most edge region J1 is defined as a region that is within the corresponding border X coil Xb (X1 or Xm) and that is outside the region where the X coil Xb (X1 or Xm) overlaps with the adjacent X coil (X2 or Xm−1). In this first situation, the pen 60 receives large influences from the short sides Yd or Yh of Y coils. More specifically, when the pen is located in the most edge region J1 for the border coil X1, the pen 60 receives large influences from the short sides Yd of Y coils. On the other hand, when the pen is located in the most edge region J1 for the border coil Xm, the pen 60 receives large influences from the short sides Yh of Y coils.

FIG. 31(a) shows the example where the position G1 of the pen 60 is located in the most edge region J1 for the border coil X1. In this example, the location G1 is in the Y coil Y3, and therefore the pen 60 receives large influences from the short side Y3d of Y coil Y3. Therefore, the Y coordinate of the position G1 cannot be accurately detected. Therefore, the error in the Y coordinate needs to be corrected. In this case, the distance L1 from the short side Y3d to the position G1 can be known when the X coordinate of the position G1 is determined. Accordingly, when the X coordinate of the position G1 is determined by the detection of the X coils and when the determined X coordinate indicates that the position G1 is sufficiently close to the short side Y3d, the correction table 58b shown in FIG. 30 is referred to using the determined X coordinate (distance L1). A coefficient K that corresponds to the determined X coordinate (distance L1) is selected from the table 58b, and is multiplied to the voltages detected at the Y coils. The thus multiplied voltages are used to determine the Y coordinate of the position G1 while referring the position coordinate table 58a (FIG. 28).

Although not shown in the drawing, if the position G1 of the pan 60 is located in the most edge region J1 for the border coil Xm, the distance L1 from the short side Yh to the position G1 is known from the X coordinate of the position G1. The correction table 58b is referred to using the distance L1, a coefficient K that corresponds to the distance L1 is selected, and is multiplied to the voltages detected at the Y coils. The thus multiplied voltages are used to determine the Y coordinate of the position G1.

In a second situation, the pen 60 is located in either one of a pair of most edge regions J2 shown in FIG. 27(a). The pair of most edge regions J2 are defined in correspondence with a pair of border coils Yb. It is noted that the pair of border coils Yb are the Y coil Y1 and the Y coil Yn, which are located at both ends of the group of Y coils Y1–Yn in the Y direction. Each most edge region J2 is defined within the corresponding border Y coil Yb (Y1 or Yn) but outside of the adjacent Y coil (Y2 or Yn−1) which is adjacent to the border Y coil (Y1 or Yn). In other words, each most edge region J2 is defined as a region that is within the corresponding border Y coil Yb (Y1 or Yn) and that is outside the region where the Y coil Yb (Y1 or Ym) overlaps with the adjacent Y coil (Y2 or Yn−1). In this second situation, the pen 60 receives large influences from the short sides Xd or Xh of X coils. More specifically, when the pen is located in the most edge region J2 for the border coil Y1, the pen 60 receives large influences from the short aides Xd of X coils. On the other hand, when the pen is located in the most edge region J2 for the border coil Yn, the pen 60 receives large influences from the short sides Xh of X coils.

FIG. 31(b) shows the example where the position G2 of the pen 60 is located in the most edge region J2 for the border coil Y1. In this example, the location G2 is in the X coil X3, and therefore the pen 60 receives large influences from the short side X3d of X coil X3. Therefore, the X coordinate of the position G2 cannot be accurately detected. Therefore, the error in the X coordinate needs to be corrected. In this case, the distance L2 from the short side X3d to the position G2 can be known when the Y coordinate of the position G2 is determined. Accordingly, when the Y coordinate of the position G2 is determined by the detection of the Y coils and when the determined Y coordinate indicates that the position G2 is sufficiently close to the short side X3d, the correction table 58b shown in FIG. 30 is referred to using the determined Y coordinate (distance L2). A coefficient K that corresponds to the determined X coordinate (distance L2) is selected from the table 58b, and is multiplied to the voltages detected at the X coils. The thus multiplied voltages are used to determine the X coordinate of the position G2 while referring the position coordinate table 58a (FIG. 28).

Although not shown in the drawing, if the position G2 of the pen 60 is located in the most edge region J2 for the border coil Yn, the distance L2 from the short side Xh to the position G2 is known from the Y coordinate of the position G2. The correction table 58b is referred to using the distance L2, a coefficient K that corresponds to the distance L2 is selected, and is multiplied to the voltages detected at the X coils. The thus multiplied voltages are used to determine the X coordinate of the position G2.

In a third situation, the pen 60 is located in either one of four overlapping regions where tho pair of most edge regions J1, and the pair of most edge regions J2 are overlapped as shown in FIG. 27(a). The four overlapping region include: a first overlapping region where the most edge region J1 for the X coil X1 and the most edge regions J2 for the Y coil Y1 are overlapped; a second overlapping region where the most edge region J1 for the X coil X1 and the most edge regions J2 for the Y coil Yn are overlapped; a third overlapping region where the most edge region J1 for the X coil Xm and the most edge regions J2 for the Y coil Y1 are overlapped; and a fourth overlapping region where the most edge region J1 for the X coil Xm and the most edge regions J2 for the Y coil Yn are overlapped.

In this third situation, the pen 60 receives large influences from both the short sides of X and Y coils. More specifically, when the pen is located in the first overlapping region, the pen 60 receives large influences from the short sides Xd of X coils and from the short sides Yd of Y coils. On the other hand, when the pen is located in the second overlapping region, the pen 60 receives large influences from the short sides Xh of X coils and from the short sides Yd of Y coils. When the pen is located in the third overlapping region, the pen 60 receives large influences from the short sides Xd of X coils and from the short sides Yh of Y coils. On the other hand, when the pen is located in the fourth overlapping region, the pen 60 receives large influences from the short sides Xh of X coils and from the short sides Yh of Y coils.

FIG. 31(c) shows the example where the position G3 of the pen 60 is located in the first overlapping region. In this example, the location G3 is in the X coil X1 and the Y coil Y1, and therefore the pen 60 receives large influences from the short side X1d of X coil X1 and from the short side Y1d of Y coil Y1. Therefore, both of the X and Y coordinates of the position G3 cannot be accurately detected. Therefore, the errors in the X and Y coordinates need to be corrected. In this case, the distance L1 from the short side Y1d to the position G3 can be known when the X coordinate of the position G3 is determined. Accordingly, when the X coordinate of the position G3 is determined by the detection of the X coils and when the determined X coordinate indicates that the position G3 is sufficiently close to the short side Y1d, the correction table 58b shown in FIG. 30 in referred to using the determined X coordinate (distance L1). A coefficient K that corresponds to the determined X coordinate (distance L1) is selected from the table 58b, and is multiplied to the voltages detected at the Y coils. The thus multiplied voltages are used to determine the Y coordinate of the position 63 while referring the position coordinate table 58a (FIG. 28).

Similarly, the distance L2 from the short aide X1d to the position G3 can be known when the Y coordinate of the position G3 is determined. Accordingly, when the Y coordinate of the position G3 is determined by the detection of the Y coils and when the determined Y coordinate indicates that the position G3 is sufficiently close to the short side X1d, the correction table 58b shown in FIG. 30 is referred to using the determined Y coordinate (distance L2). A coefficient K that corresponds to the determined X coordinate (distance L2) is selected from the table 58b, and is multiplied to the voltages detected at the X coils. The thus multiplied voltages are used to determine the X coordinate of the position G3 while referring the position coordinate table 58a (FIG. 28).

Although not shown in the drawing, even when the position G3 of the pen 60 is located in any of the other second through fourth overlapping regions, the distance L1 from the short side Yd or Yh to the position G3 is known from the Y coordinate of the position G3. The distance L2 from the short side Xd or Xh to the position G3 is known from the Y coordinate of the position G3. The correction table 58b is therefore referred to using the distances L1 and L2, coefficients K that correspond to the distances L1 and L2 are selected, and are multiplied to the voltages detected at the Y and X coils. The thus multiplied voltages are used to determine the Y and X coordinates of the position G3.

Figure 32:
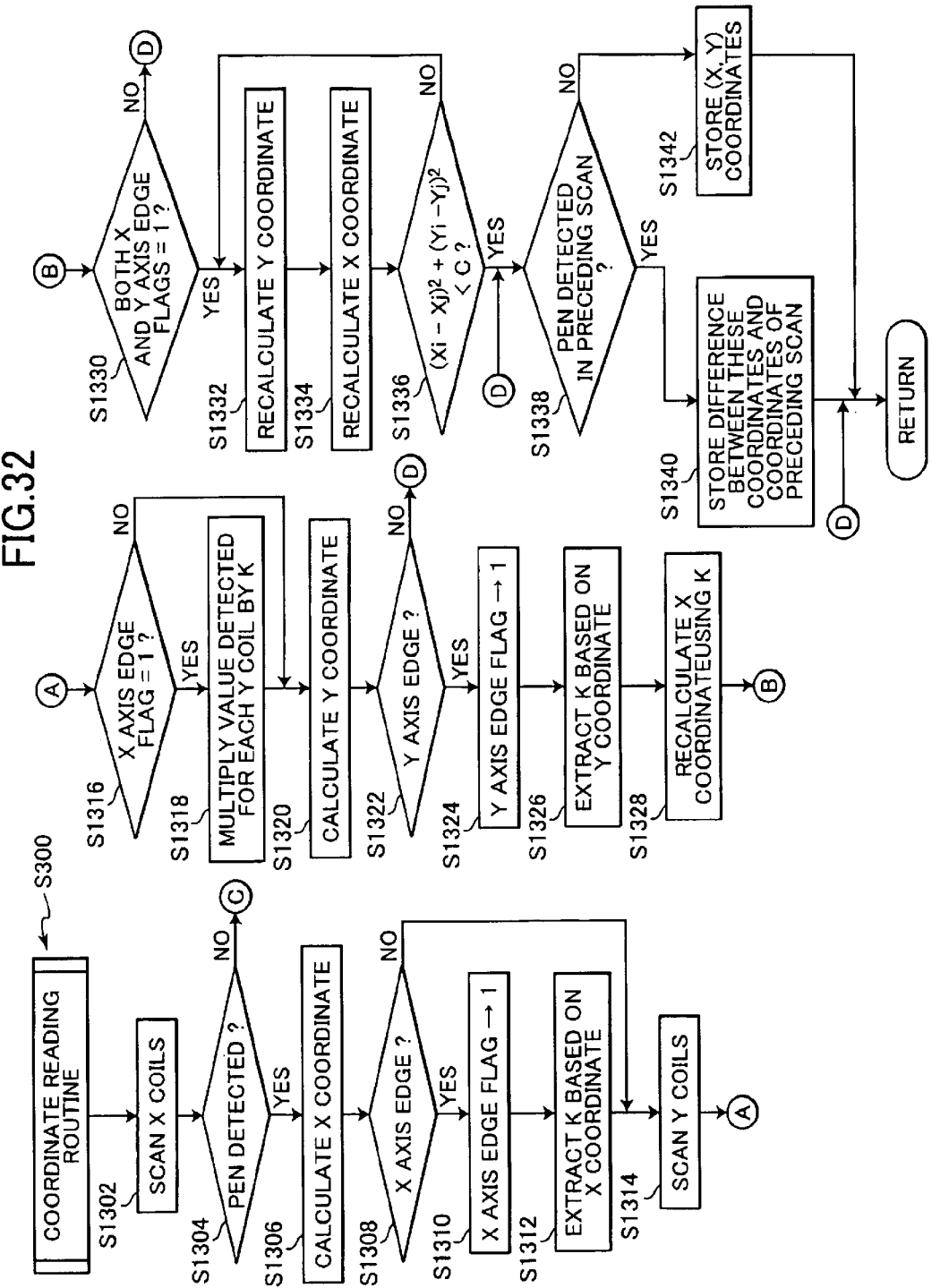
FIG. 32 is a flowchart of a coordinate reading process of S300 according to the second embodiment.

According to the present embodiment, therefore, the coordinate reading process of S300 in the first embodiment (FIG. 14) is modified as shown in FIG. 32 in order to correct the coordinate value when the pen is judged to be located in some edge of the panel 24 that is close to some short side (Xd, Xh, Yd, Yh) of some coil.

During the coordinate reading process of S300 in the present embodiment, as shown in FIG. 32, first, the X coils X1–Xm are scanned in S1302 in the same manner as in S302 (FIG. 14) of the first embodiment. Then, similarly to S304 (FIG. 14) of the first embodiment, when the pen 60 is detected (yes in S1304), in S1306, all the voltage values detected by the X coils X1–Xm are stored in the RAN 59 and the X coordinate of the pen 60 is determined in the same manner as in S306 and S308 of the first embodiment. That is, the X coordinate is deter ed while referring to the coordinate position table 58a (FIG. 28).

Then, in S1308, the CPU 56 judges whether or not the determined X coordinate indicates that the pen 60 is located at some edge portion in the X axis direction and is close to the short sides Yd or Yh of Y coils Y1–Yn. In order to perform this judgement, the CPU 56 first calculates the distance L1 (FIG. 31) of the pen 60, from the short side Yd of Y coils Y1–Yn, based on the determined X coordinate value. The CPU 56 then refers to the correction table 58b in the ROM 58, and selects the values of the correction coefficient K that correspond to the calculated distance L1. The CPU 56 judges whether or not the selected value of the correction coefficient K is greater than one (1). When the selected value of the correction coefficient K is greater than one (1), it is known that the pen 60 is now located close to the short side Yd of that Y coil and therefore exists in one edge region along the X axis, and therefore the Y coordinate of the position of the pen 60 should be corrected.

It is noted that in S1308, the CPU 56 also calculates the distance L1 (FIG. 31) of the pen 60, from the other short side Yh of Y coils Y1–Yn, based on the determined X coordinate value. In the same manner as described above, the CPU 56 judges whether the value of the correction coefficient K, corresponding to the calculated distance L1 is greater than one (1). When the selected value of the correction coefficient K is greater than one (1), it is known that the pen 60 is now located close to the short side Yh of that Y coil and therefore exists in the other edge region along the X axis.

Thus, if the pen 60 is judged to be located close to the short sides Yd or Yh of Y coils (yes in S1308), then in S1310, the CPU 56 sets an X axis edge flag to indicate that the pen 60 is now in some X axis edge region. Next, in S1312, the CPU 56 extracts, from the correction table 58b, the correction coefficient K that is selected in S1308 and that is judged to be greater than one (1).

Next in S1314, the CPU 56 scans all the Y coils Y1–Yn in the same manner as in S310 in the first embodiment (FIG. 14). When the X axis edge flag is judged to be set (S1316:YES), then in S1318, the CPU 56 corrects the voltage value e(1)–e(n) detected by each Y coil Y1–Yn by multiplying them by the extracted correction coefficient K. Then, the routine proceeds to S1320. On the other hand, when the X axis edge flag is not set (S1316:NO), then the process directly proceeds to S1320.

In S1320, by using the voltage values e(1)–e(n), which are modified in S1318 if the X axis edge flag is set or which are not modified if the X axis edge flag is not set, the CPU 56 calculates the Y coordinate of the pen position in S1320 in the same manner as in S314 in the first embodiment. That is, the CPU 56 calculates the Y coordinate of the pen position while referring to the coordinate position table 58a (FIG. 28) using the voltage values e(1)–e(n).

Next, in S1322, the CPU 56 judges whether or not the calculated Y coordinate indicates that the pen to located close to the short side Xd or Xh of some X coil and therefore is located in some Y axis edge. This judgement is performed in the same manner as in S1308 by referring to the correction table 58b.

If the pen 60 is in the first situation in FIG. 31(a), the calculated Y coordinate is not within the Y axis edge (S1322:NO). Accordingly, the routine proceeds to S1338 to judge whether or not the pen 60 has been detected in the preceding coil-scanning operation. If so (S1338:YES), then the CPU 56 calculates the difference between the coordinate calculated this time and the coordinate calculated in the preceding time, and stores the calculated difference value in the RAM 59 in S1340. When no pen has been detected in the preceding coil-scan (S1335:NO), then in S1342, the Y coordinate calculated in S1320 and the X coordinate calculated in S1306 are stored in the RAN 59.

On the other hand, when the pen 60 is in the second situation as shown in FIG. 31(b), the CPU 56 determines in S1322 that the calculated Y coordinate indicates that the pen 60 is within some Y axis edge portion (S1322:YES). Accordingly, in S1324, the Y axis edge flag is set to indicate that the pen 60 is in the Y axis edge. Then, in S1326, the CPU 56 calculates the distance L2 of the pen 60 from the corresponding short side Xd or Xh of the X coils (X3d in the example of FIG. 31(b)) based on the calculated Y coordinate, and then extracts, from the correction table 58b, a value of the correction coefficient K that corresponds to the calculated distance L2.

Next, in S1328, the CPU 56 modifies the voltage values e(1)–e(m), which have been detected by the X coils X1–Xm in S1306, by multiplying those values by the extracted correction coefficient K. The CPU 56 recalculates the X coordinate using the thus modified voltage values e(1)–e(m), while referring to the coordinate position table 58a (FIG. 28).

Next, in S1330, the CPU 56 judges whether or not both the X and Y axis flags are set to judge whether the pen 60 is in the third situation. When the CPU 56 judges that both the X and Y axis edge flags are set (S1330:YES), then in S1332, the CPU 56 extracts the correction coefficient K that is associated with the X coordinate that is recalculated in S1328. The CPU 56 modifies the voltages, detected in the y-scan operations of S1314, using the extracted correction coefficient K, and recalculates the Y coordinate.

Next in S1334, the CPU 56 extracts the correction value K that is associated with the Y coordinate recalculated in S1332. The CPU 56 modifies the voltage values, detected during the x scan operation of S1302, using the extracted correction coefficient K, and recalculate the X coordinate.

In this way, when the pen 60 is located in the third situation close to the short sides (Xd or Xh and Yd or Yh) of both the X and Y coils, voltage values detected during coil scan operation are influenced by both the short sides of the X and Y coils. Therefore, the X coordinate calculated in S1306 and the Y coordinate calculated in S1320 both include errors, so the coordinate values are recalculated to obtain X and Y coordinates with only slight errors.

Next, in S1336, the CPU 56 judges whether or not the following inequality is satisfied:

$$(Xi-Xj)^2+(Yi-Yj)^2<C$$

wherein Xi is the X coordinate calculated at this recalculation operation, Xj is the X coordinate calculated at the preceding time, Yi is the Y coordinate calculated at this time, Yj is the Y coordinate calculated at the preceding time, and C is a preset value.

If not (S1336:NO), then recalculation operation in S1332 and S1324 are repeated until the value of $(Xi-Xj)^2+(Yi-Yj)^2$ becomes less than the preset value C. Thus, by repeatedly recalculating the coordinates, a more accurate coordinate with lower error can be obtained. It is noted that the results (coordinate values) of the recalculation operations may possibly never converge to some values, but may simply oscillate back and forth. Therefore, once the difference between the coordinates calculated this time and the coordinates calculated the preceding time reaches less than the preset value C, then calculations are ended (S1336:YES).

Next, in S1338, the CPU 56 determines whether the pen 60 has been detected during the preceding scan. If so (S1338:YES), then in S1340, the difference between the coordinates calculated during this scanning operation and the coordinates calculated during the preceding scanning operation is calculated and stored in the RAM 59. On the other hand, if no pen has been detected during the preceding scans (S1338:NO), then in S1342, the X and Y coordinates calculated for this scanning operation are stored in the RAM 59.

As described above, according to the coordinate reading process in the present embodiment, when the X coordinate calculated in S1306 is a coordinate in some X axis edge (S1308:YES), then the X axis edge flag is set in S1310 and a correction coefficient X that corresponds to the distance from the corresponding edge Yd or Yh of the Y coil (that is, the calculated X coordinate) is extracted in S1312 by referring to the correction table 58b. After Y coils are scanned in S1314, if the X axis edge flag is judged to be set (S1316:YES), then in S1318, all of the values detected by the Y coils in S1314 are multiplied by the correction coefficient K. In S1320, Y coordinate is calculated based on the corrected detected values. With this configuration, errors caused by influences from the short sides Yd or Yh of the Y coils can be corrected so that the Y coordinate can be accurately obtained.

During S1332–S1336, correction operation is repeatedly performed to correct one of the X and Y coordinates using the other coordinate, and then to correct the other coordinate using the corrected one coordinate until a difference defined between the coordinates obtained at the present correction operation and the coordinates obtained at the preceding correction operation becomes equal to or lower than the preset value. Thus, the repeated correction can be ended when the difference becomes equal to or lower than the preset value. Thus, the processing can be completed immediately. It is possible to prevent the correction operation from not being ended even when the corrected coordinates oscillate back and forth and do not converge to some values.

Thus, the electronic white board 1 of the present embodiment can correct one or both of the X and Y coordinates of the pen position by using at least the other one of the X and Y coordinates. Therefore, there is no need to provide any correction loop as used in the conventional technology. Accordingly, the writing panel can be produced much efficiently. Also, the effective surface area of the writing panel can be broadened by the portion that corresponds to such a correction loop. Also, the writing panel can be made smaller by the amount that corresponds to the correction loop. Coordinates can be calculated and corrected based on the levels of signals generated from the sense coils 23. There is no need to provide any conventional circuitry for calculating pulses or for performing adding or subtracting operation onto the thus calculated pulse number.

Next, a modification of the present embodiment will be described while referring to FIG. 33.

The electronic white board 1 according to the present modification can accurately calculate and correct positional coordinates of the pen 60 even if the output level of the alternating magnetic field generated by the pen 60 drops. The electronic white board 1 according to this modification can accomplish this by updating the positional coordinate table 58a and the correction table 58b in association with the reduced output level in the magnetic field from the pen 60. According to the present modification, the steps S1302–S1306 in the coordinate reading process (FIG. 32) is replaced with steps S1350–S1358 shown in FIG. 33.

Figure 33:
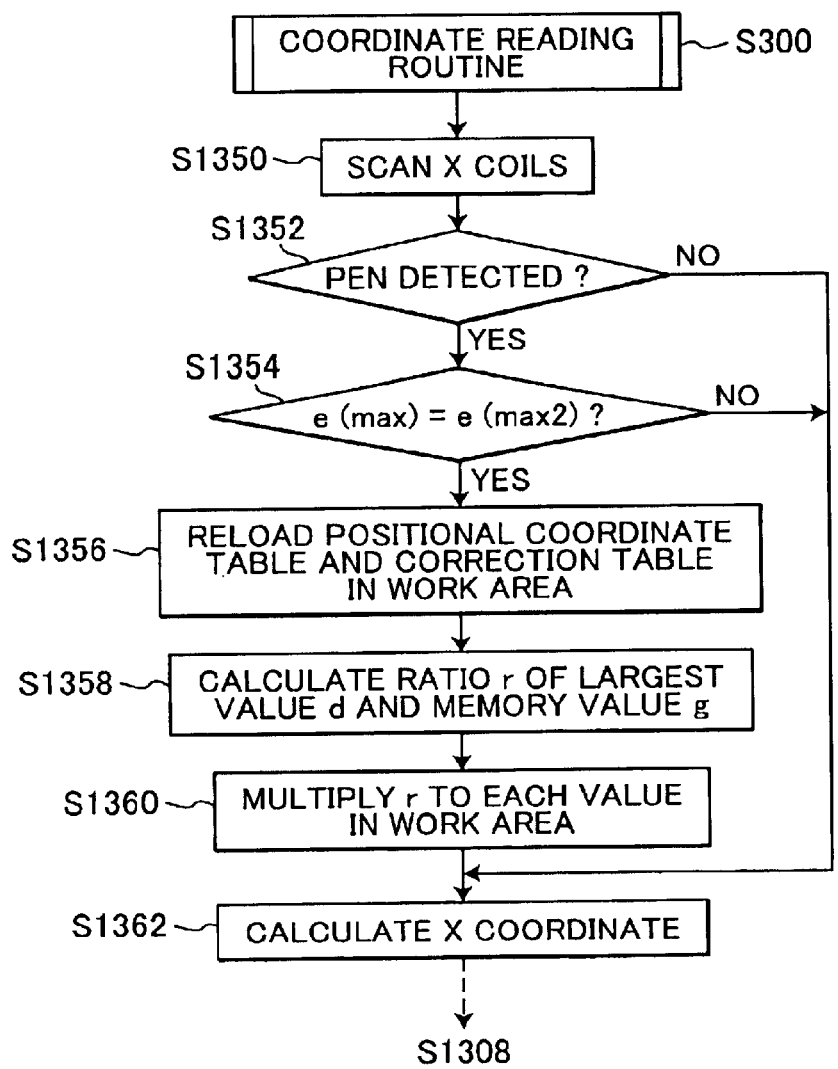
FIG. 33 is a flowchart of a coordinate reading process of S300 according to a modification of the second embodiment.

As shown in FIG. 33, first in S1350, the CPU 56 scans all of the X coils X1–Xm. If the pen 60 is detected (S1352:YES), then in S1354, all the voltage values e(1) to e(m), detected at all the X coils X1–Xm, are stored in the RAM 59, and then the CPU 56 selects the maximum voltage coil X(max) that has produced the largest value e(max) among all the voltage values e(1) to e(m). The CPU 56 judges whether or not one of the coils X(max−1) and X(max+1) is a coil X(max2) that has generated the voltage e(max2) whose value is greater than that generated from the other coil and whose value is the same as the voltage e(max) of the maximum voltage coil e(max). If the CPU 56 judges that one of the coils X(max−1) and X(max+1) is the coil e(max2) that has induced the same voltage value as the coil e(max) (S1354:YES), then in S1356, the CPU 56 reloads the positional coordinate table 58a and the correction table 58b from the ROM 58 into the work area of the RAM 59. In S1358, the CPU 56 calculates the ratio r of the largest value d (=e(max)), detected in S1354, relative to a memory value g prestored in the ROM 58. The memory value g is preset based on a voltage value that has been generated by a sense coil 23 in response to the alternating magnetic field from the pen 60 when the battery 70 in the pen 60 is not yet used at all. In other words, the memory value g is such a voltage (initial voltage) of the sense coil 23 that has not dropped at all. It is noted that when the pen 60 is located in the intermediate line between adjacent two coils, the subject two coils always generate the maximum voltage values e(max) and e(max2) of the same amounts with each other, regardless of the amount of the magnetic field from the pen 60. Therefore, the ratio r between the maximum value d (=e(max), e(max2)) and the memory value g properly indicates the degree of drop in the output level of the magnetic field from the pen 60.

In S1360, the CPU 56 multiplies, by the ratio r, each value DIFF in the positional coordinate table 58a (FIG. 28) which is now reloaded in the work area of the RAM 59. The CPU 56 also multiplies, by the ratio r, each coefficient value K in the correction table 58b which is now reloaded in the work area of the RAM 59. By doing this operation, the positional coordinate table 58a and the correction table 58b are updated to values that properly correspond to the present output level from the pen 60.

In S1362, X coordinate of the pen position is then calculated based on the updated positional coordinate table 58a. After the processes in S1362 are completed, then the processes of S1308 to S1342 of the flowchart in FIG. 32 are performed in the same manner as described above using the updated positional coordinate table 58a and the updated correction table 58b.

The electronic white board according to the present modification can update the positional coordinate table 58a and the correction table 58b in association with drop in the output level from the pen 60 even if the output level of the magnetic field from the pen 60 drops. Therefore, the positional coordinates can be calculated and corrected accurately.

As described above, according to the present embodiment, because error in the coordinate in one axial direction (X or Y axial direction) can be corrected using a coordinate in the other axial direction (Y or X axial direction), there is no need to provide any separate correction sense coils as in the conventional device. Accordingly, the writing panel body 20 can be manufactured more efficiently. Also, surface area of the writing panel body 20 is not wasted. Also, the device can be made smaller by the amount of the surface area of the writing panel body 20, so the panel body 20 is not wasted.

The positional coordinate in the X axial direction can be determined based on the signal levels generated by the X sense coils. The positional coordinate in the Y axial direction can be determined based on the signal levels generated by the Y sense coils. Accordingly, there is no need to provide any circuitry for calculating positional coordinates by calculating the number of pulses obtained from output of conductive wires, or for correcting the positional coordinates by subtracting or adding a predetermined pulse number to the calculated pulse number.

In the present embodiment, the short sides Xd, Xh, Yd, and Yh of the sense coils 23 are provided on the front surface 24n of the attachment panel 24. However, similarly to the first embodiment, the short sides Xd, Xh, Yd, and Yh may be located on the rear surface 24b or the edge surface 24a, 24p.

<Third Embodiment>

A third embodiment will be described below with reference to FIGS. 34(a)–56(b).

The electronic white board 1 of the present embodiment is the same as that of the first embodiment except for the points described below.

Figure 34A:
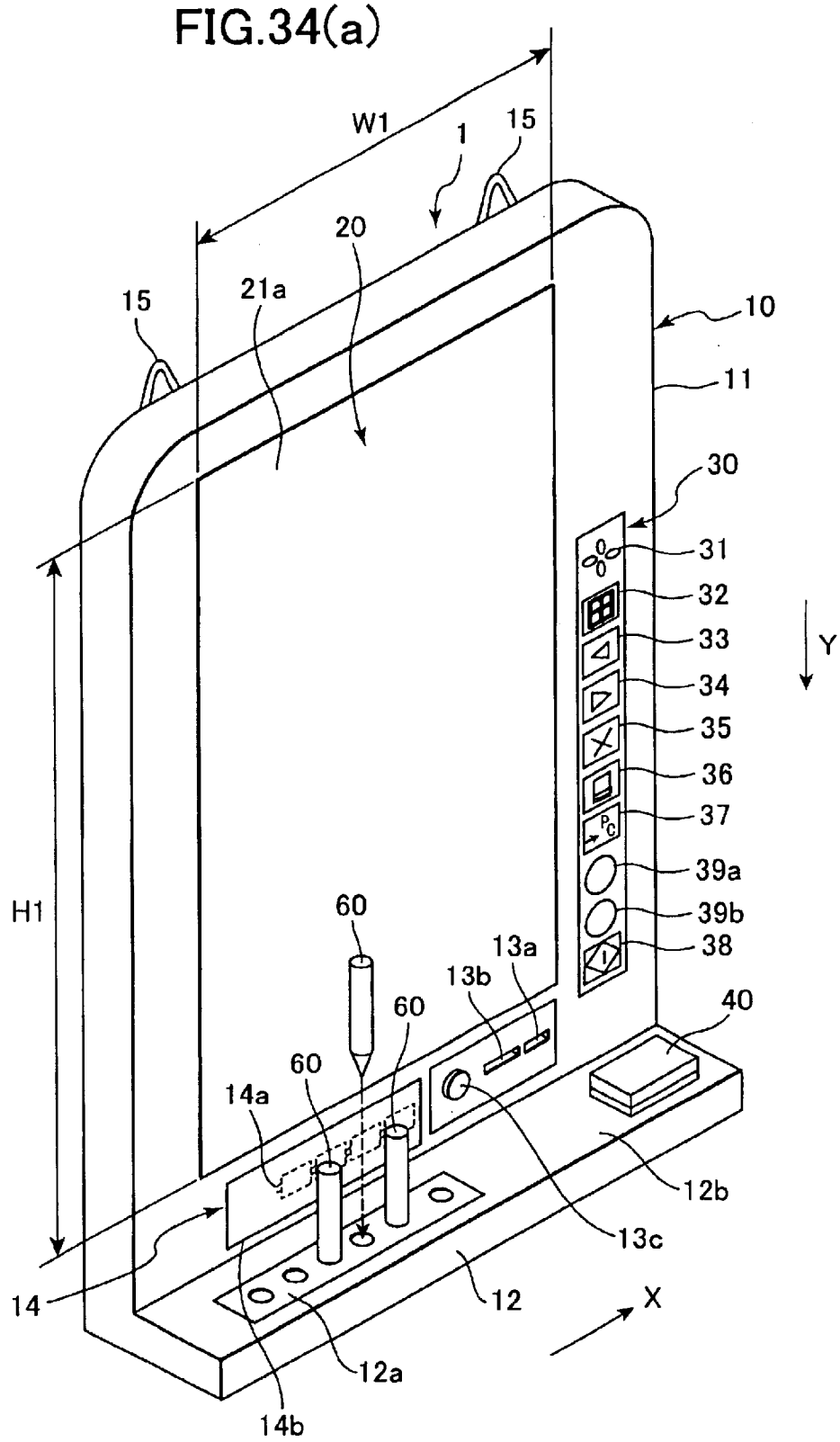
FIG. 34(a) is an external perspective view of an electronic white board according to a third embodiment of the present invention.
Figure 34B:
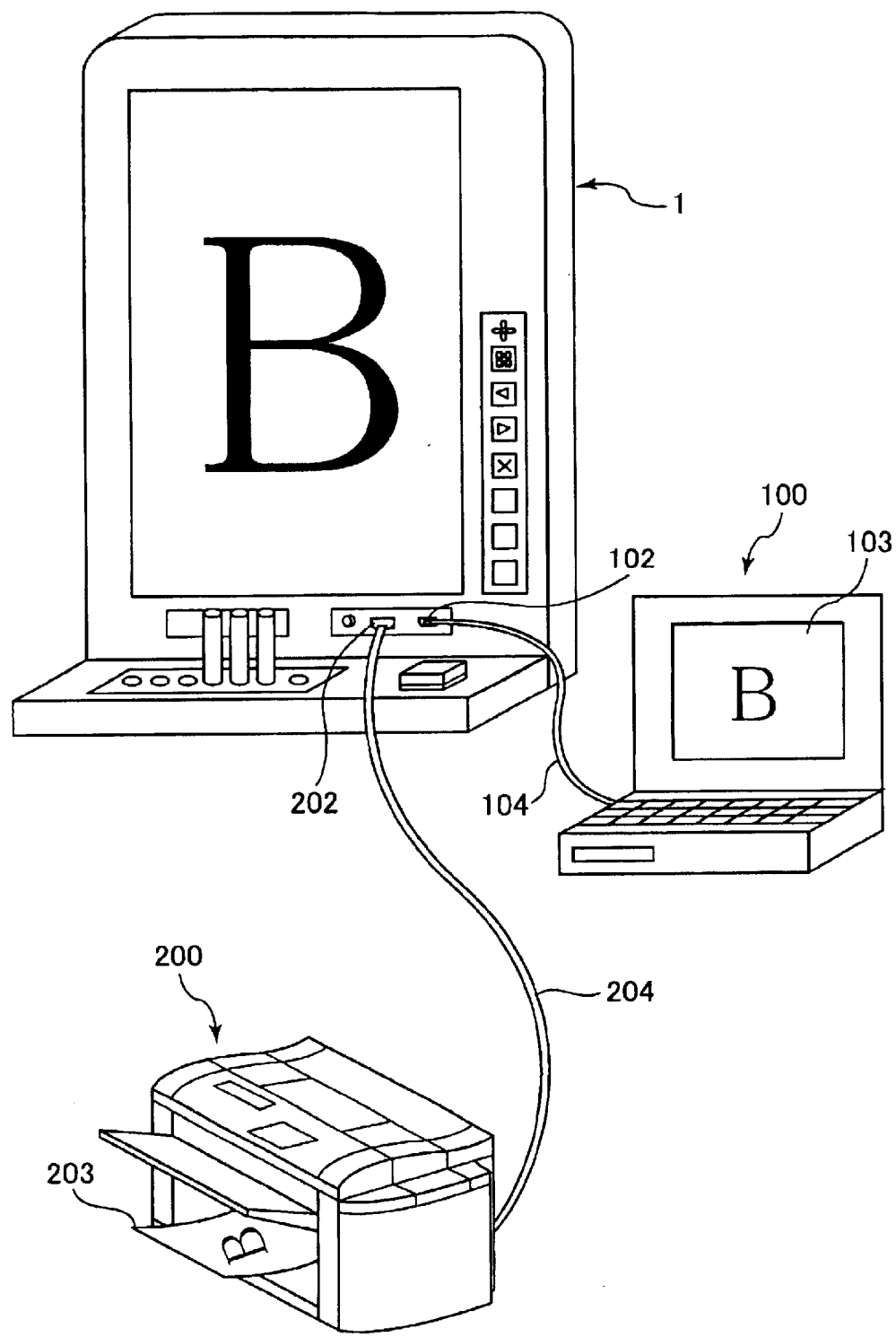
FIG. 34(b) is an illustration showing the electronic white board of FIG. 34(a) being electrically connected to a personal computer (PC) and a printer.

According to the present embodiment, as shown in FIGS. 34(a) and 34(b), several holes or concaves 12a are formed in the upper surface of the stand 12 for supporting several pens 60. An input warning LED 39a is provided on the operation portion 30. The input warning LED 39a is for warning about improper input. A battery warning LED 39b is also provided on the operation portion 30 for warning when the batteries 14a run out.

Figure 35A:
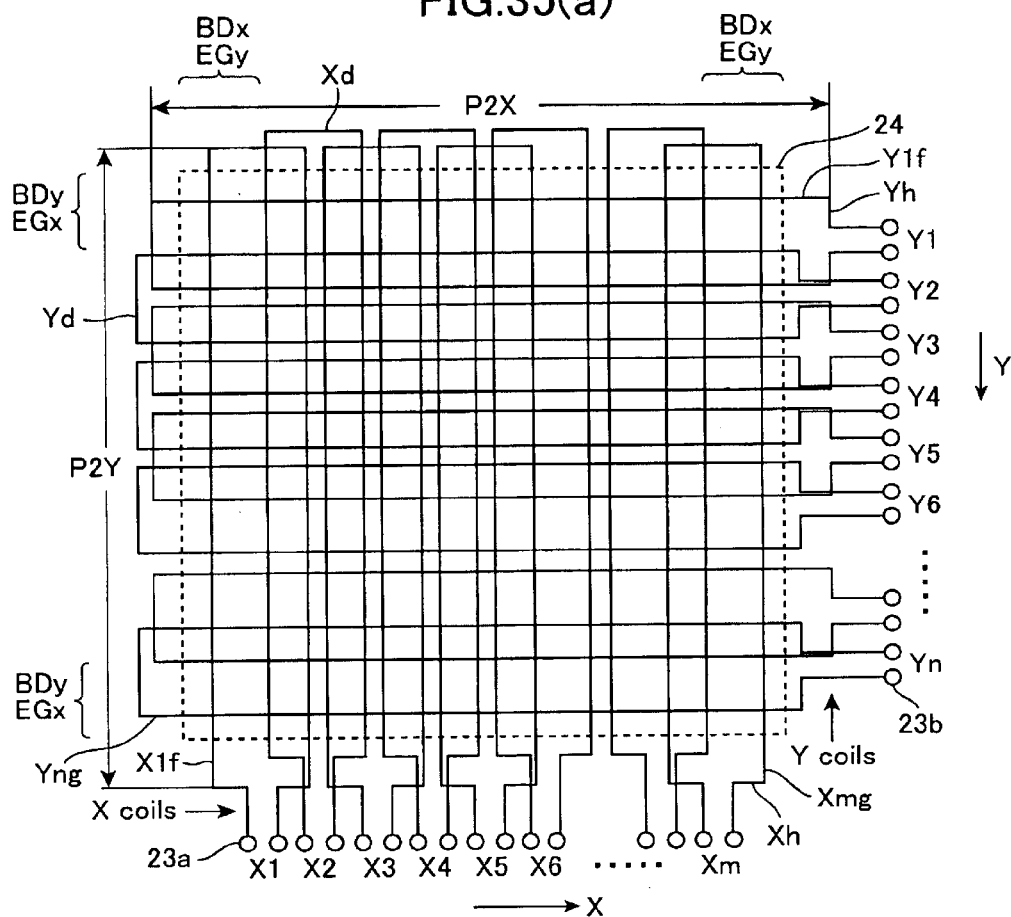
FIG. 35(a) illustrates how a plurality of sense coils 23 are arranged on the attachment panel 24, according to the third embodiment, while omitting a part of the sense coils.

In the present embodiment, the attachment panel 24 has a thickness of 30 mm. On the attachment panel 24, the x coils X1–Xm and the Y coils Y1–Yn are arranged as shown in FIG. 35(a). More specifically, the X coils X1–Xm and the Y coils Y1–Yn are arranged so that the long sides X1f and Xmg of border X coils X1 and Xm (most-outside long sides) are not overlapped with the short sides Yd and Yh of the Y coils Y1–Yn, and so that the long sides Y1f and Yng of border Y coils Y1 and Yn (most-outside long sides) are not overlapped with the short sides Xd and Xh of the X coils X1–Xn. As shown in FIG. 44, the short sides Yd and Yh of the Y coils Y1–Yn are shifted by 26 mm from the long sides X1f and Xmg, and the short sides Xd and Xh of the X coils X1–Xm are shifted by 26 mm from the long aides Y1f and Yng.

Figure 35B:
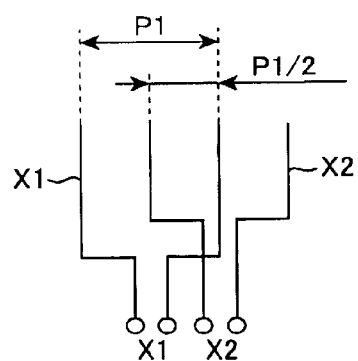
FIG. 35(b) illustrates a width of the sense coils 23 and a pitch, by which the sense coils 23 are arranged while being partly overlapped with one another.
Figures 36A, 36B:
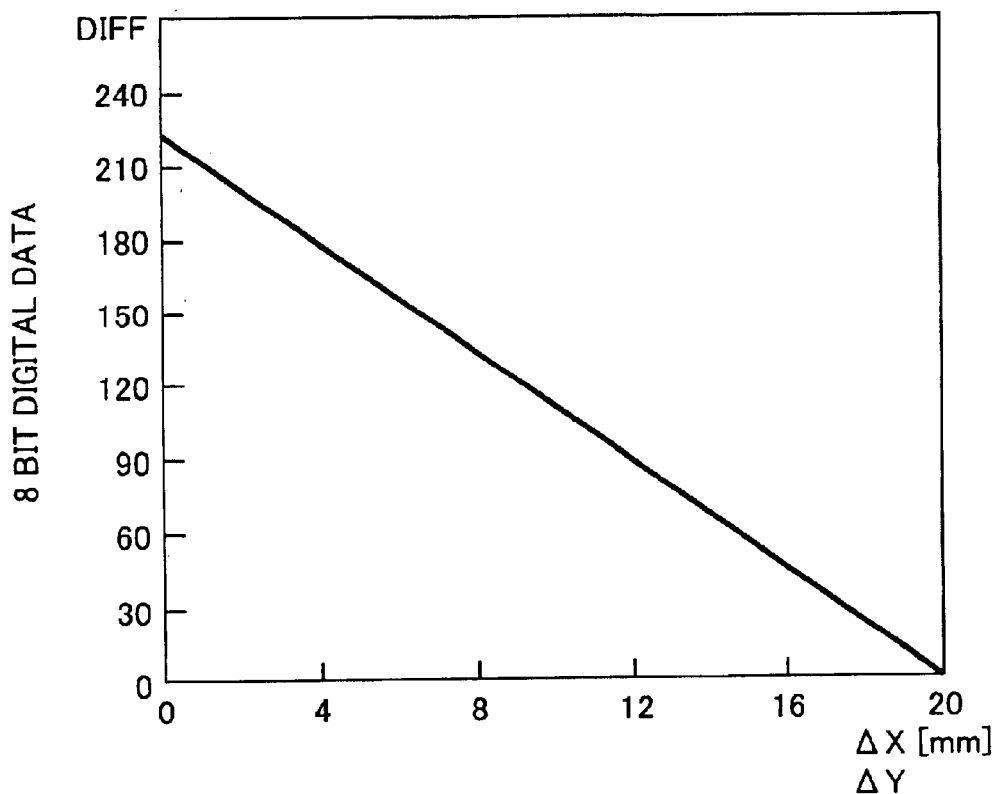
FIG. 36(a) is a graph representing a position coordinate table 58a according to the third embodiment.
FIG. 36(b) is a structure of the position coordinate table 58a of FIG. 36(a)

According to the present embodiment, the X coils X1–Xm have the length P2Y of about 977 mm. The Y coils Y1–Yn have the length P2X of about 657 mm. Thus, the Y coils are shorter than the X coils. The total number m of X coils X1–Xm is 14, and the total number n of Y coils Y1–Yn is 22. The width P1 of each of the X and Y coils 23, shown in FIG. 35(b), is 80 mm. Accordingly, the P1/4 is equal to 20 mm, and therefore the position coordinate table 58a to prepared to indicate the relationship between the position coordinate values ΔX, ΔY and the voltage difference values DIFF as shown in FIG. 36(a). In other words, the position coordinate table 58a is prepared as shown in FIG. 36(b). According to the present embodiment, each sense coil 23 is made from a copper wiring having a diameter of 0.345 mm and covered with an insulation film of enamel layer, for example, on its surface.

The coil L1 mounted in the pen 60 has a ring shape formed from 200 turns of windings with an inner diameter of about 15 mm and a length of about 15 mm. The coil L1 is mounted inside the pen 60 so that the coil L1 will be separated by about 20 mm from the tip of the pen tip 62 that abuts against the writing surface 21a of the writing panel 10.

Figure 37:
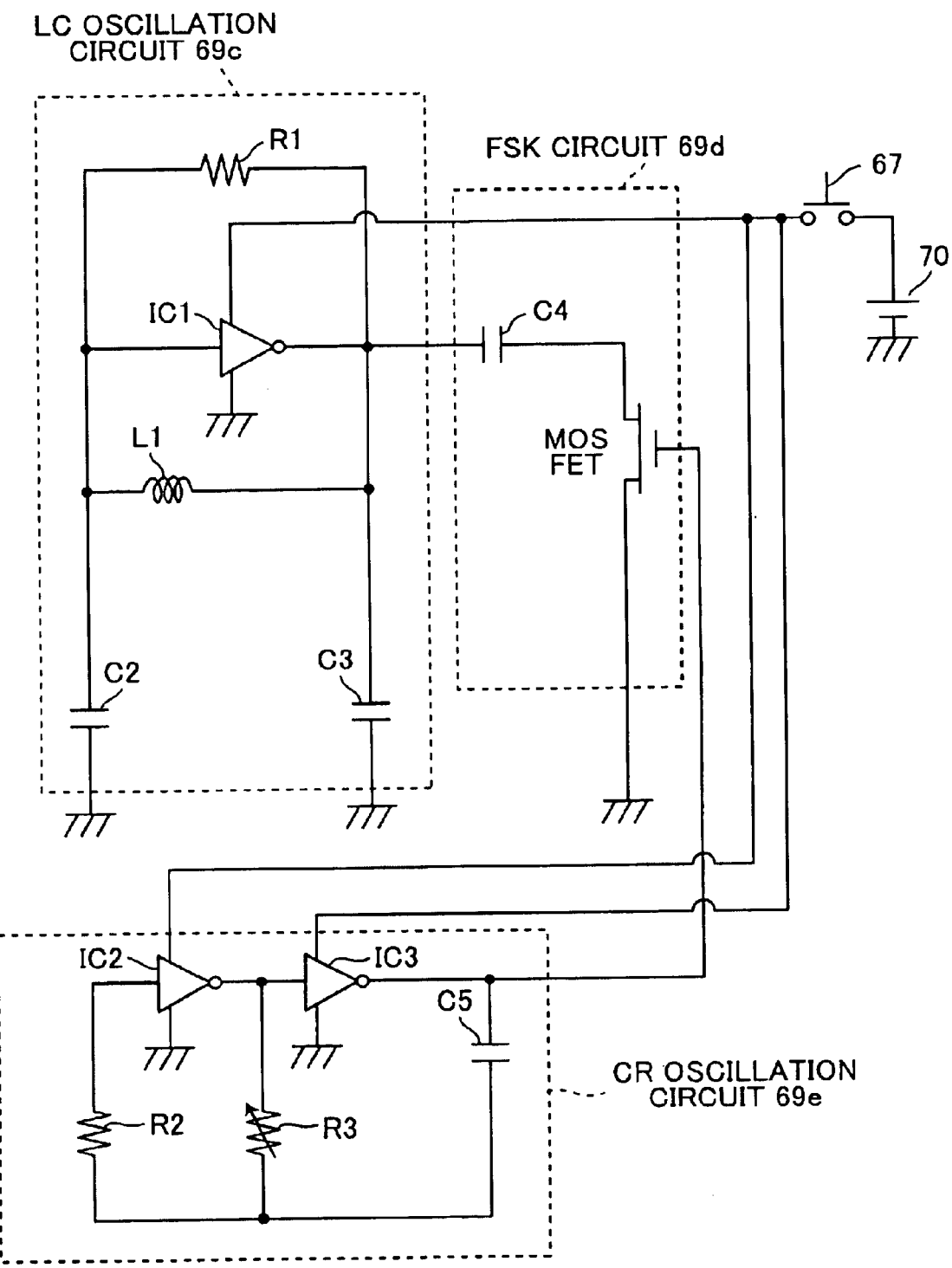
FIG. 37 is a circuit diagram showing electric configuration of the pen 60 according to the third embodiment.

According to the present embodiment, the circuit board 69 for the pen 60 has the structure shown in FIG. 37. As shown in FIG. 37, the circuit board 69 includes not only the LC oscillation circuit 69c but also a CR oscillation circuit 69e and a frequency shift keying (FSK) circuit 69d. The CR oscillation circuit 69e is for oscillating a signal whose frequency is set with one of a plurality of different modulation frequencies fm in correspondence with one of a plurality of different attributes of the pen 60 as to color of ink stored in the ink cartridge 63 and thickness of the pen tip 62. The carrier wave oscillated by the LC oscillation circuit 69c carries the signal thus oscillated by the CR oscillation circuit 69e. The FSK oscillation circuit 69d is for modulating the oscillation frequency of the LC oscillation circuit 69c using the modulation frequency fm of the signal from the CR oscillation circuit 69e. It is noted that the modulation frequency fm is determined by resistance of a variable resistor R3, resistance of a resistor R2, and capacitance of a capacitor C5 in the CR oscillation circuit 69e. The frequency deviation, by which the oscillation frequency of carrier wave deviates by the FSK circuit 69d is determined by capacitance of the condenser C4 in the FSK oscillation circuit 69d.

With the above-described structure, when the push button switch 67 is turned ON, electric power from the battery 70 is supplied to the entire circuitry. Output from the integrated circuit IC3 in the CR oscillation circuit 69e switches the MOS FET gate in the FSK oscillation circuit 69d. The carrier wave generated at the LC oscillation circuit 69c is frequency-modulated by the signal generated from the CR oscillation circuit 69e. Accordingly, the coil L1 generates an alternating magnetic field (carrier wave) whose frequency is modulated by the FSK oscillation circuit 69d.

According to the present embodiment, the central frequency of the carrier wave is 410 kHz. The frequency deviation is ±15 kHz. According to the present embodiment, the integrated circuit IC1 is a TOSHIBA TC7SLU04F. The integrated circuits IC2 and IC3 are both TOSHIBA TC7SLU04. Also, the MOS FET is a 2SK2158. The resistors R1 and R2 have both resistance of 1 MΩ. The resistor R3 has a resistance range of 0 to 1 MΩ. The capacitors C2, C3, C4, C5 are 2,700 pF, 1,000 pF, 270 pF, 100 pF, respectively. The battery 70 is LR44 with a voltage of about 1.5 V.

The relationship between the pen attributes (ink color and pen tip thickness) and modulation frequencies fm is set as shown in FIG. 38. In FIG. 38, "fine" refers to the pen tip 62 with a fine or thin tip, "thick" refers to the pen tip 62 with a thick tip. For example, "black thick" refers to an attribute of a pen that employs a thick pen tip 62 and that stores black colored ink in its ink cartridge 63. Because pens 60 with different characters (attributes) are designed to oscillate with different modulation frequencies fm, when the pen 60 with some attribute is used to write characters on the electronic black board 1 and to generate the alternating magnetic field, the electronic black board 1 will recognize the character of the pen 60.

It is noted that the eraser 40 is allocated with another modulation frequency fm, which is different from the modulation frequencies fm allocated to the pens 60, in order to allow the electronic black board 1 can recognize the eraser 40 when the eraser 40 is used to erase the images drawn on the electronic black board 1.

Figure 39A:
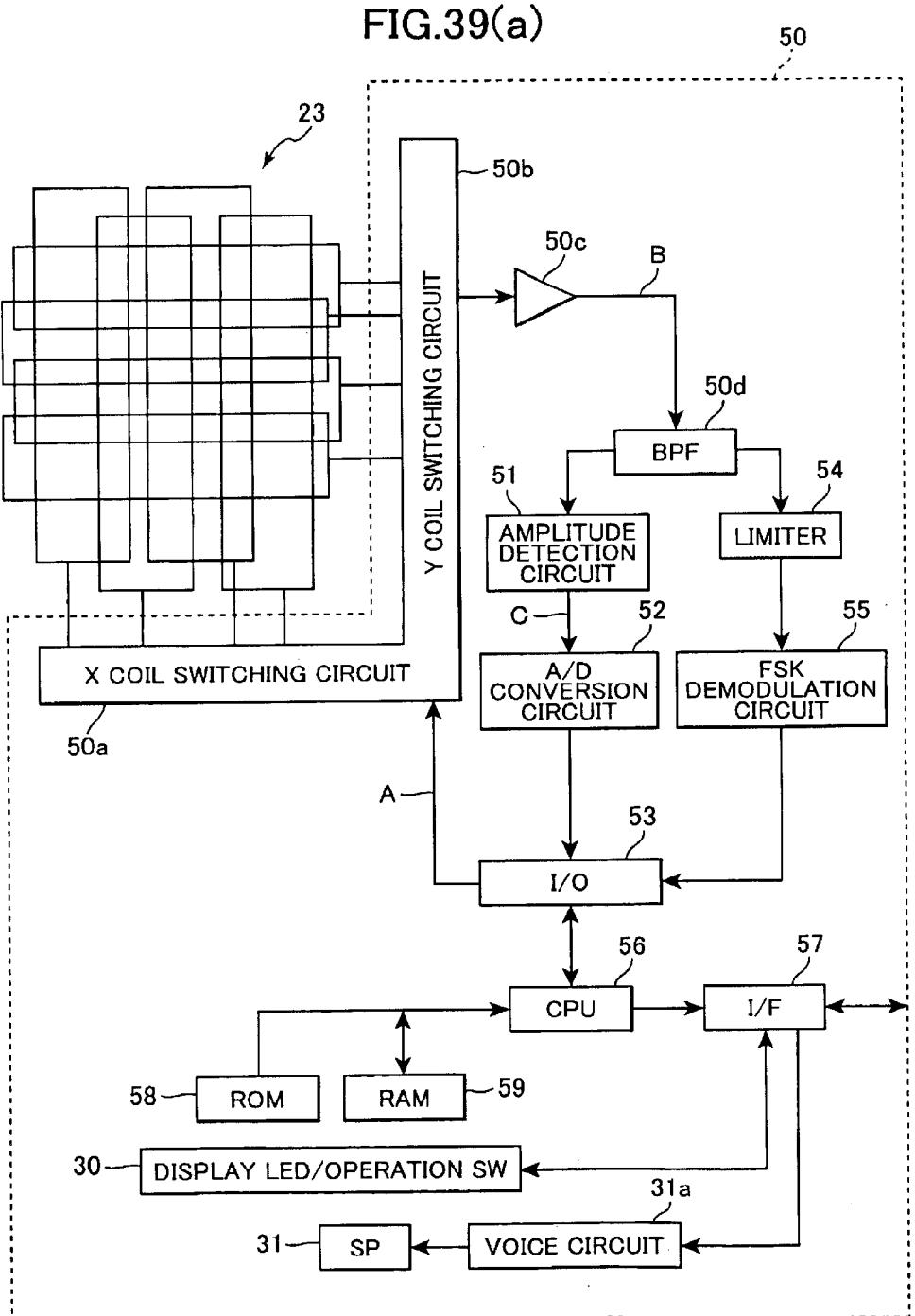
FIG. 39(a) is a block diagram showing an electrical configuration of the electronic white board according to the third embodiment.
Figure 41A:
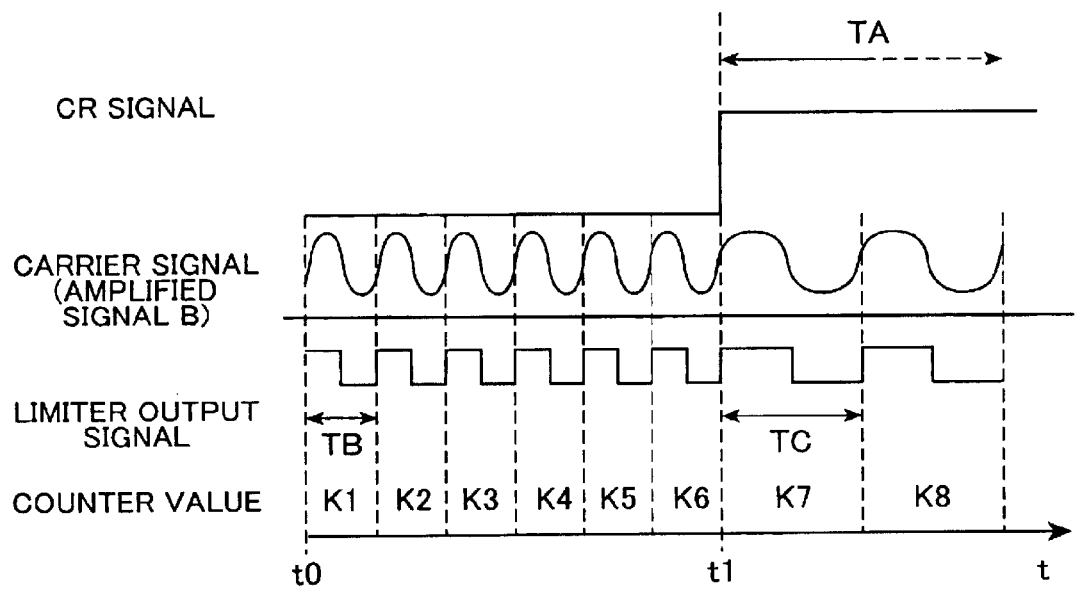

According to the present embodiment, as shown in FIG. 39(a), the control portion 50 further includes a bandpass filter (BPF) 50d for filtering out portions of unnecessary bandwidths from the amplified signal B shown in FIG. 39(b). The portion of the amplified signal B, only in a required bandwidth, passes through the bandpass filter (BPF) 50d. The resultant signals have the same waveform as that of the carrier signals transmitted from the pen 60. As described already, the carrier signals are frequency-shiftkeying modulated according to the modulation frequency fm of the CR signal, and therefore have the waveform as shown in FIG. 41(a). The amplified signals, having passed through the BPF 50d, are received by the amplitude detection circuit 51.

The control portion 50 further includes a limitter circuit 54 and a FSK demodulation circuit 55, which cooperate to detect the modulation frequency of the bandpass-filtered amplified signals, that is, the modulation frequency fm of the carrier signals from the pen 60, thereby detecting the attribute of the pen 60 now located on the writing surface 21a. That is, the amplified signal B having passed through the BPF 50d is received also by the limitter circuit 54. The limitter circuit 54 in for converting the filtered, amplified signal (frequency-shift-keying modulated carrier wave) B into a rectangular waveform shown in FIG. 41(a). The PSK demodulation circuit 55 is for demodulating the rectangular wave of FIG. 41(a) and for detecting the period TA of the modulation frequency fm, at which the carrier wave in modulated in the pen 60.

Figure 40:
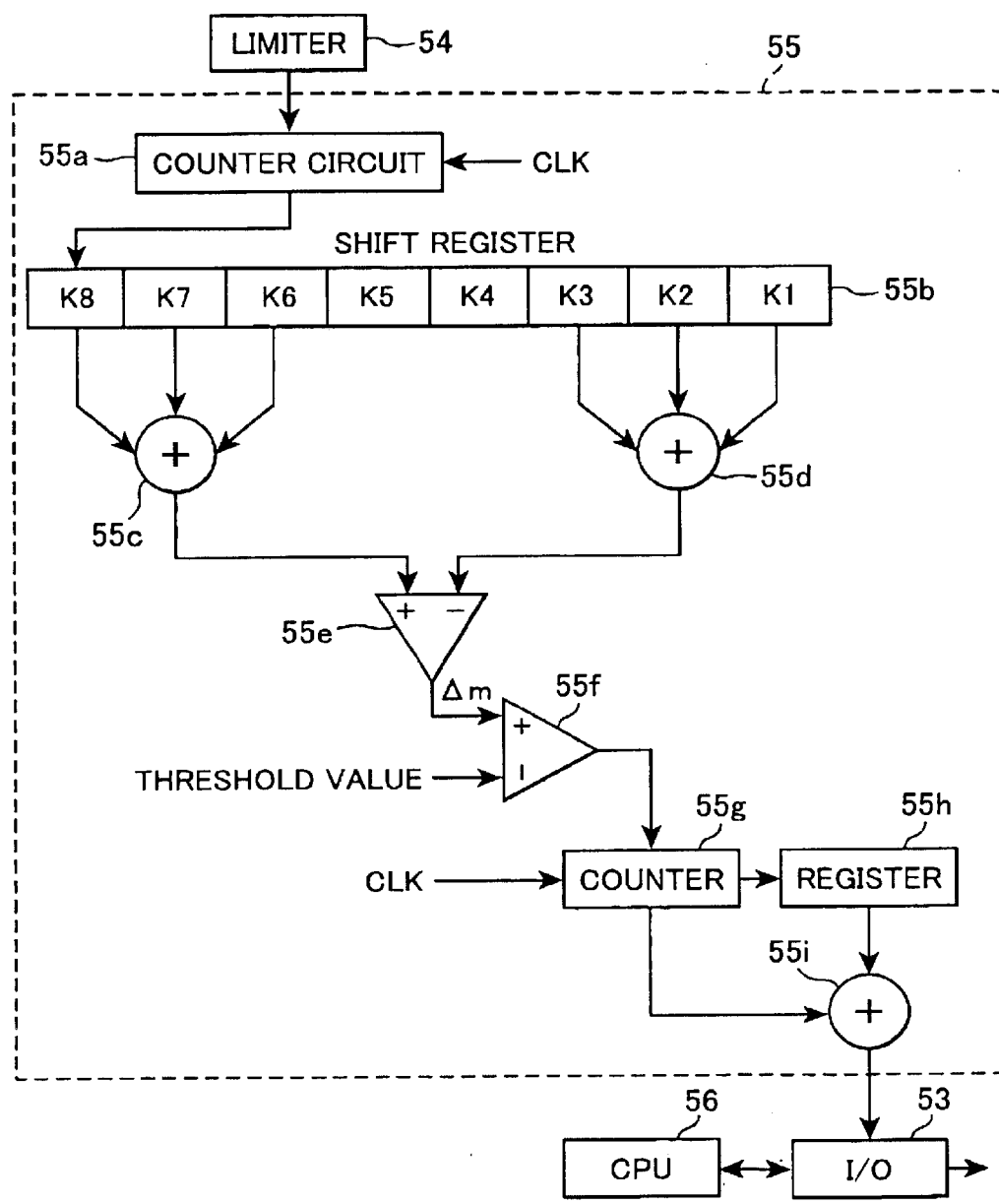
FIG. 40 is a block diagram showing an electrical configuration of a FSK demodulation circuit in the electronic white board of FIG. 39(a)

As shown in FIG. 40, the FSK demodulation circuit 55 includes: a counter circuit 55a, a shift register 55b, a first average calculating circuit 55c, a second average calculating circuit 55d, a subtraction circuit 55e, and an absolute-value comparator 55f, a counter 55g, a register 55h, and an adding circuit 55i.

The counter circuit 55a is for counting the counter value K indicative of the duration of each period of the limitter output signal of FIG. 41(a). The shift register 55b, the first average calculating circuit 55c, the second average calculating circuit 55d, the subtraction circuit 55e, and the absolute-value comparator 55f are for cooperating to detect timing when the detected amount of the counter value K changes. The counter 55g, the register 55h, and the adder circuit 55i are for cooperating to measure the period from when the detected amount of the counter value K first changes, when the detected amount of the counter value K again changes, and until when the detected amount of the counter value K further changes, by calculating a sum (demodulated count number) of count numbers of counting the system clock signals. The adding circuit 55i is connected to the CPU 56 via the I/O circuit 53. The ROM 58 stores a table shown in FIG. 38 that is indicative of a relationship between the several pen attributes and corresponding demodulated count numbers, each demodulated count number being indicative of the duration of a single period for the corresponding modulation frequency fm. Accordingly, the CPU 56 can refer to the table of FIG. 38 to judge the pen attribute of the pen 60 based on the demodulated count number outputted from the adding circuit 55i.

It is noted that in this example, as shown in FIG. 41(a), the FSK circuit 69d in the pen 60 (FIG. 37) is designed to modulate the carrier signals (from the LC oscillation circuit 69c) to a high frequency of, for example, 525 kHz while the CR signal (from the CR oscillation circuit 69e) is in a low level, and to a lower frequency of, for example, 395 kHz when the CR signal in in a high level. The amplified signals B having passed through the BPF 50d have the save waveform with the carrier signals modulated by the FSK circuit 69d and outputted from the pen 60. Accordingly, the limitter circuit 54 outputs the limitter output signal shown in FIG. 41(a) that has a period TB during a law level period of the CR signal (from the CR oscillation circuit 69e) and a period TC during the high level period of the CR signal (from the CR oscillation circuit 69e). The period TC is longer than the period TB.

The counter circuit 55a is for measuring each period TB or TC of the limitter output signal. That is, the counter circuit 55a counts, using a system clock provided by the CPU 56, the number K of the system clock signals (counter value) indicative of each period TB or TC of the limitter output signals. More specifically, when a rising edge of the limitter output signal is detected, the counter circuit 55a starts measuring the period until the next rising edge of the limitter output signal is detected. The counter circuit 55a then outputs the counter value K to the shift register 55b, and resets the counter value K to start the next counting. Thus, the counter circuit 55a measures the length TB or TC of one period of the limitter output signals.

The counter value K thus measured by the counter circuit 55a is either one of the values corresponding to the lengths TB and TC. The counter value K increases from a value corresponding to the length TB to the other value corresponding to the length TC when the CR signal changes from its low level to its high level. The counter value K decreases from the value corresponding to the length TC to the value corresponding to the length TB when the CR signal changes from the high level to the low level.

Accordingly, by detecting the timing at which the counter value K changes, the timing of the rising edge and the lowering edge of the CR signal can be detected. Because the time duration from when the counter value K changes to when it changes again is equivalent to a half of a single period of the CR signal. Therefore, by measuring the time from when the counter value K changes first time until when the counter value K changes third time, the duration of a single period of the CR signal can be determined. Accordingly, the modulation frequency fm can be determined, and the attribute of the pen 60 can be determined in accordance with the relationship between the modulation frequencies fm and the pen attributes (FIG. 38).

Figure 41B:
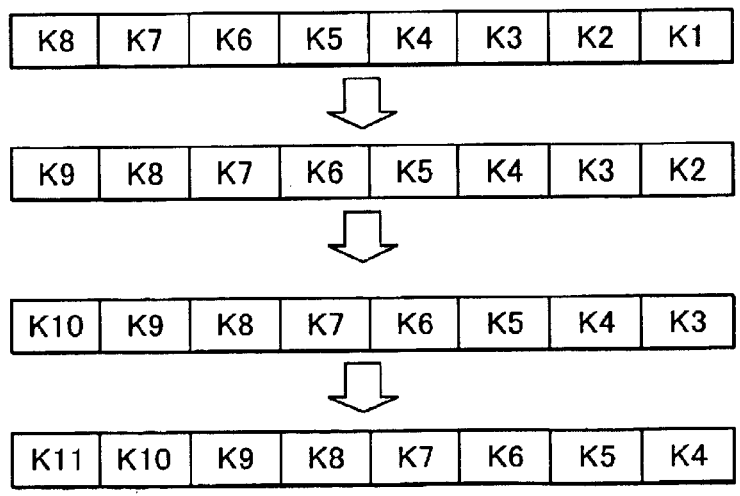
FIG. 41(b) illustrates how the counter values held in the shift register 55b are shifted.

According to the present embodiment, the shift register 55b is configured, as shown in FIG. 41(b), to store counter values K counted by the counter circuit 55a for eight successive periods Ki–7 to Ki of the limitter output signal. Each time a new counter value K (i+1) is inputted from the counter circuit 55a to the shift register 55b, all of the counter values K in the shift register 55b shifts by one position and the counter value K (i–7) counted in the oldest period among the eight successive periods is discarded.

The first average calculating circuit 55c is for calculating an average of the latest counter value Ki, the second latest counter value Ki–1, and the third latest counter value Ki–2, and outputs the calculated average to the subtraction circuit 55e as a first mean value. The second average calculating circuit 55d is for calculating an average of the oldest counter value Ki–7, the second oldest counter value Ki–6, and the third oldest counter value Ki–5, and outputs the calculated average to the subtraction circuit 55e as a second mean.

The subtraction circuit 55e is for calculating a difference $\Delta m$ between the first mean and the second mean, and outputs the difference $\Delta m$ to the absolute-value comparator 55f. In the example shown in FIG. 41(b), at a first timing, the first average calculating circuit 55c calculates the mean value of the counter values K1 to K3. The second average calculating circuit 55d calculates the mean value of the counter values K6 to K8. In this case, each of the counter values K7 and K8, indicative of the length of the period TC, is longer than each of the counter values K1–K3 and K6, indicative of the length of the period TB. Therefore, the second mean value will be larger than the first mean value. Accordingly, when it is detected that the difference between the second mean value and the first mean value is thus large, then it is known that the level of the CR signal changes between the low level and the high level. By thus detecting the timing when the CR signal changes, the period of the CR signal, that is, the period of the modulation frequency fm can be detected.

It is noted that each of the average circuits 55c and 55d to designed to calculate an average of three counter values K which are obtained at three different timings separated from one another. Accordingly, even if one of the counter values K have been effected by noise, the overall effects of the noise will be small by the calculation of the average.

It should be noted that the first average circuit 55c and the second average circuit 55d are designed depending on the complexity of the circuitry and on the ratio between the frequency of the carrier wave (oscillation frequency of the LC oscillation circuit 69c) and the modulation frequency fm. The shift register 55b is designed to hold the total number of counter values K, indicative of the total number of periods of the limitter output signal, dependently on the ratio of the system clock frequency to the carrier wave frequency. The system clock frequency is set to a frequency that enables sufficient distinction in changes in frequency of the carrier wave.

Figure 42:
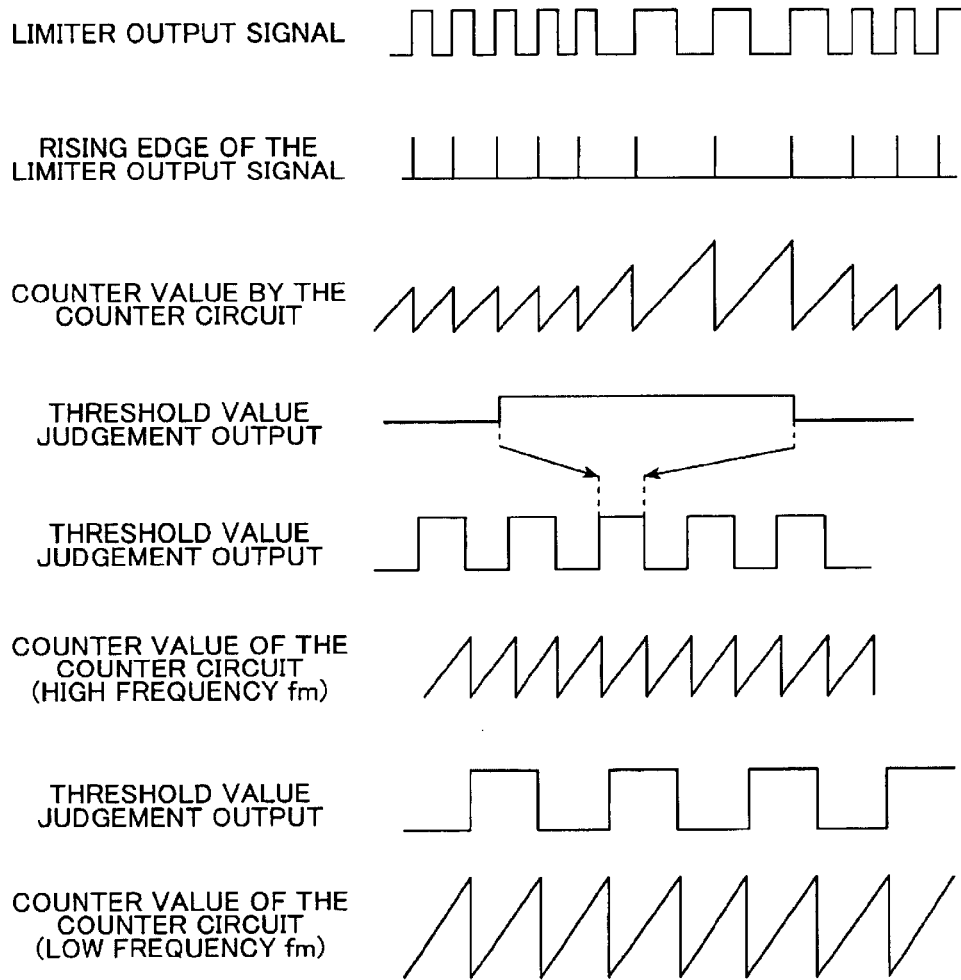
FIG. 42 illustrates several signals that appear in the respective portions in the FSK demodulation circuit 55.

The absolute-value comparator 55f is for comparing an absolute value of the difference Δm outputted from the subtractor 55e with a preset threshold value Th, to thereby judge whether or not the absolute value of the difference Δm is equal to or greater than the threshold value Th, the absolute-value comparator 55f outputs a threshold value judgement output in one of two different levels (high level and low level) according to the judgement results as shown in FIG. 42. More specifically, when the absolute value of the difference Δm is judged to be greater than or equal to the threshold value Th, the absolute-value comparator 55f changes the threshold value judgement output between a low level and a high level. Thus, the absolute value comparator 55f judges that the period of the limiter output signal has changed or said differently detects the rising or lowering edge of the CR signal.

For example, it is assumed that the counter circuit 55a counts the counter value K of ten (10) for the short period TB of the limiter output signal and counts the counter value K of sixteen (16) for the longer period TC. In the first row of FIG. 41(b), the calculation range by the first average circuit 55c and the second average circuit 55d reaches the timing of the rising edge of the CR signal. In this case, all of the counter values K1 to K6 shown in FIG. 41(a) are ten (10). Therefore, the first mean value is equal to 10 ((K1+K2+K3)/3=10). Also, because the counter value K7 and the counter value K8 are both equal to 16, then the second mean value will be equal to 14 ((K6+K7+K8)/3=42/3=14). Therefore, the difference Δm obtained by the subtraction circuit 55e will be equal to −4 (10−14=−4).

If the threshold value Th is set to two (2), because 4 (absolute value of the difference Δm) is greater than 2 (threshold value m1), the threshold judgement output is changed between a low level and a high level. This level condition of the threshold value judgement output will be maintained until the absolute value comparator 55f judges that the absolute value of the difference Δm becomes equal to or greater than the threshold value Th next.

When the calculation range by the first average circuit 55c and the second average circuit 55d is shifted from the edge timing of the CR signal and reaches the timing when the period of the limiter output signal is fixed, both average calculating circuits 55c, 55d will calculate average values for the counter values K from the same periods. Therefore, the subtraction results by the subtraction circuit 55e will be equal to zero (0). In this case, the threshold value judgement output from the absolute-value comparator 55f will be continued unchanged as shown in FIG. 42.

When the calculation range by the first average circuit 55c and the second average circuit 55d again reaches the edge timing of the CR signal, the absolute value of the difference Δm becomes greater than the threshold value Th again, and the threshold judgement output is changed again between a low level and a high level.

The counter 55g is for using the system clock (SLK) to count the number of the system clock signals to thereby measure the time that the threshold Judgement output is maintained at one of high and low levels, that is, a half period of the threshold judgement output. That is, when change in the threshold value judgment output is detected between a low level and a high level, the counter 55g starts counting until the threshold judgement output again changes between the high and low levels.

Figure 43A:
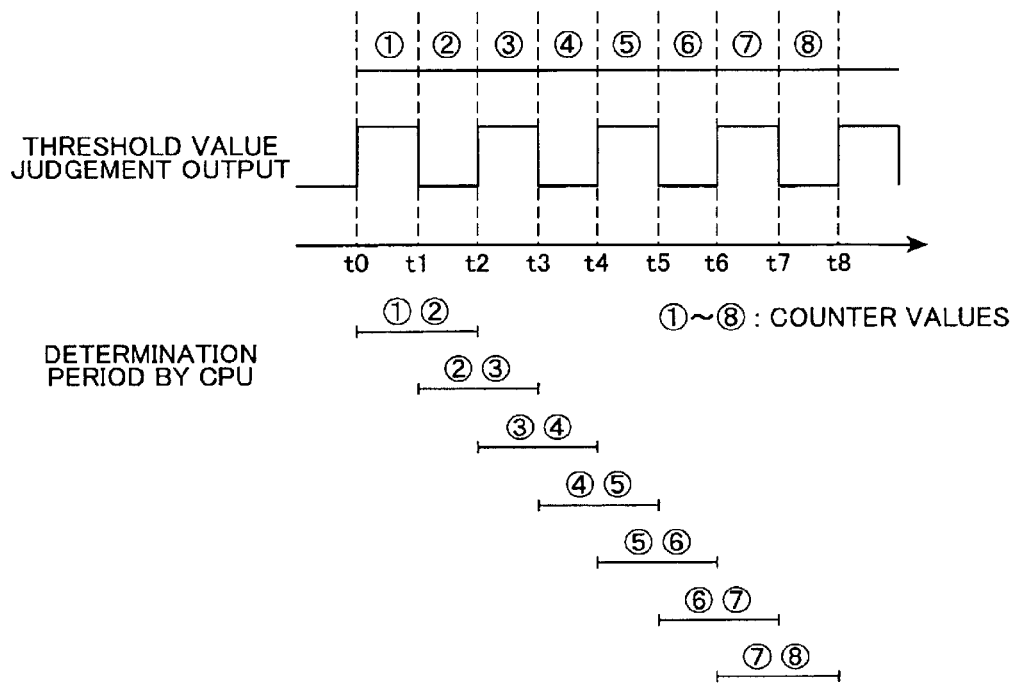
FIG. 43(a) shows the relationship between the threshold value judgement output by the absolute-value comparator 55f and the determination period by CPU.

As shown in FIG. 43(a), it is assumed that the absolute-value comparator 55f first judges at a timing t0 that the absolute value of the difference Δm becomes equal to or greater than the threshold value Th. In other words, at the timing t0, the absolute value comparator 55f determines that the period of the limiter output signal has changed, and recognizes the rising edge of the CR signal. The absolute-value comparator 55f changes the threshold value judgement output from a low level to a high level. The absolute-value comparator 55f again judges at timing t1 that the absolute value of the difference Δm becomes equal to or greater than the threshold value Th. In other words, at the timing t1, the absolute value comparator 55f determines that the period of the limiter output signal has changed again, and recognizes the lowering edge of the CR signal. The absolute-value comparator 55f changes the threshold value judgement output from a high level to a low level. The counter value K counted by the counter circuit 55g between the timings t0 and t1 is ① as indicated in (B1) of FIG. 43(b). At the timing t1, the counter 55g then outputs the counter value ① to the register 55h as shown in (B2) of FIG. 43(b). The counter 55g then resets the counter value ①, and again counts a half period of the threshold value judgment output, that is, the time that the threshold value judgement output is maintained at a low level until the timing t2 when the threshold value judgement output again changes. In this example, the counter value measured between the timings t1 and t2 is indicated by ②.

Thus, the counter 55g will measure the lengths of successive periods t0–t1, t1–t2, t2–t3, . . . , and t7–t8, to thereby output counter values ① to ⑧ indicative of the lengths of the periods t0–t1, t1–t2, t2–t3, . . . , and t7–t8, respectively. In each period t0–t1, t1–t2, t2–t3, . . . , and t7–t8, the threshold judgment output in maintained at either the low or high level.

The adding circuit 55i determines that an adding timing has arrived when the counter values K have been hold in both of the counter 55g and the register 55h. In this example, at the timing t2 when the counter value ① is held in the register 55h and the counter value ② determined in the counter 55g, the adding circuit 55i adds the counter value ② held in the counter 55g and the counter value ① held in the register 55h, and outputs the sum ①+②, as a demodulated counter value, to the CPU 56. At the same time, the counter 55g outputs the counter value ② to the register 55h as indicated in (B3) of FIG. 43(B).

Thus, the CPU 56 reads the demodulated counter value (sum value ①+②) from the FSK demodulation circuit 55 via the input/output circuit 56, and judges the pen attribute based on the received demodulated counter value (sum value ①+②) while referring to the table shown in FIG. 38. For example, if the sum ①+② is 245, then the CPU 56 will judge the pen attributes to be black and thick as indicated in the table of FIG. 38.

Figure 43B:
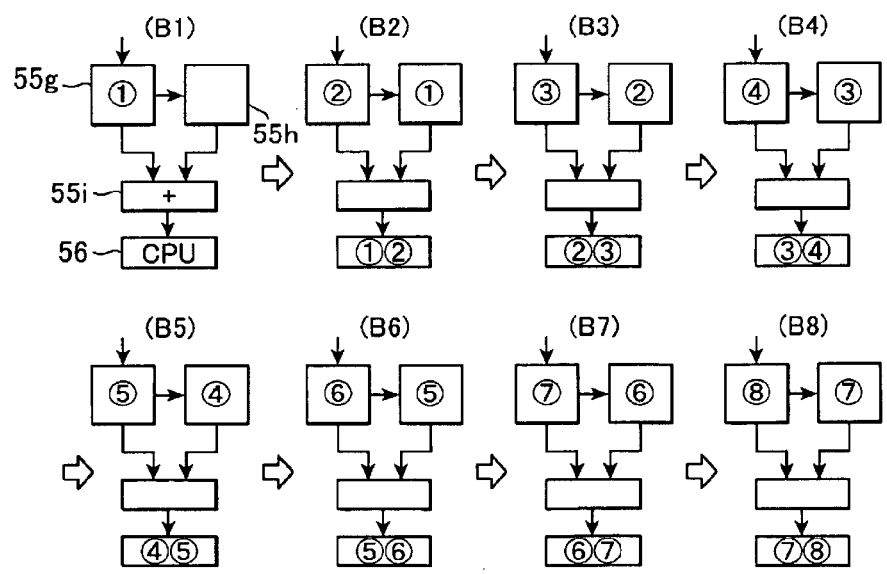
FIG. 43(b) illustrates how counter value K counted by counter 55g moves.

In the same manner as described above, the adding circuit 55*i* adds the counter value ② for the duration t1–t2, now registered in the register 55*h*, to the counter value ③ for the duration t2–t3, newly counted in the counter 55*g*, and outputs the sum to the CPU 56 as indicated in (B3) in FIG. 43(B). These processes are repeated so that every time the threshold value judgement output changes between low and high levels, the counter value K of the counter 55*g* is outputted to the register 55*h*, and the adding circuit 55*i* adds the counter value K in the counter 55*g* to the counter value K held in the register 55*h* and outputs the sum to the CPU 56. That is, as shown in FIG. 43(*b*), the adding circuit 55*i* adds the counter value K, which is counted during the latest duration by the counter 55*g*, to the counter value K, which is counted during the duration immediately prior to the latest duration and which is held in the register 55*h*, and the sum is outputted to the CPU 56. For this reason, as shown in FIG. 43(*a*), the CPU 56 judges the pen attributes, based on the sum of the latest counter value K and the preceding counter value K, each half period of the threshold value judgement output. Accordingly, even if the scanning operation of the loop coils 23 is performed at a timing between times t0 and t1 shown in FIG. 43(*a*), it is unnecessary to wait for the next period of t2–t4. The counter sum can be determined for the time t1 to t3 that is after a half period elapsed from the time t1. Accordingly, the pen attribute can be judged immediately.

Accordingly, when the period of the limitter output signal changes as shown in FIG. 42, the counter circuit 55*a* counts the system clock signals each time a rising edge of the limitter output signal is detected. The absolute-value comparator 55*f* produces the threshold judgement output whose level changes in correspondence with the timing when the period of the limitter output signal changes. The counter 55*g* counts the system clock signals each time the level of the threshold judgement output changes. The adding circuit 55*i* calculates the duration of the successive two periods, during which the threshold judgement output is in high and low levels. The duration is indicative of the length of a single period required by the threshold judgement output to change two times. Thus, duration is indicative of the length of a single period of the CR signal where the level of the CR signal changes two times, and accordingly is indicative of the modulation frequency fm of the CR signal. Thus, if the modulation frequency fm of the CR signal is high, the level of the threshold judgement output highly frequently changes, and therefore the counter value counted by the counter 55*g* will be small. When the modulation frequency fm of the CR signal is less, the level of the threshold judgement output changes less frequently, and therefore the counter value counted by the counter 55*g* is large.

The present embodiment is provided to accurately determine the positional coordinates of the pen 60 even when the pen 60 is located in X border coils Xb or Y border coils Yb and therefore the pen 60 is located in the edge areas of the Y or X coils. It is noted that the X border coils Xb are X coils X1 and Xm, which are located in both ends of the m number of X coils X1–Xm, and wherein the Y border coils Yb are Y coils Y1 and Yn, which are located in both ends of the n number of Y coils Y1–Yn.

Because the border coils Xb in the X coil group are X coils X1 and Xm, which are disposed at the ends of the X coil group, the border coils Xb have no adjacent X coil on its one side. A border portion BDx is therefore defined for each border coil Xb at a portion where no adjacent X coil overlaps with the border coil Xb but where a signal can still be detected.

One of the border coils Xb, that is, the border coil X1 is shown in FIG. 44. The border portion BDx for the border coil X1 is defined by the area between a line, that is 5 mm outside of the border coil X1 (5 mm leftside of the long side X1*f*), and the long side X2*f* of the adjacent coil X2. Although not shown in the drawing, the border portion BDx for the other border coil Xb (that is, Xm) is defined by the area between a line, that is 5 mm outside of the border coil Xm (5 mm rightside of the long side Xmg), and the long side Xm–1*g* of the adjacent coil Xm–1. Thus, the pair of border portions BDx are provided to the group of sense coils X1–Xm.

Similarly, because the border coils Yb in the Y coil group are Y coils Y1 and Yn, which are disposed at the ends of the Y coil group, the border coils Yb have no adjacent Y coil on its one side. A border portion BDy is defined for each border coil Yb at a portion where no adjacent Y coil overlaps with the border coil Yb but where a signal can still be detected.

One of the border coils Yb, that is, the border coil Y1 is also shown in FIG. 44. As shown in FIG. 4, the border portion BDy for the border coil Y1 is defined by the area between a line, that is 5 mm outside of the border coil Y1 (5 mm upperside from the long side Y1*f*), and the long side Y2*f* of the adjacent coil Y2. Although not shown in the drawing, the border portion BDy for the other border coil Yb (that is, Yn) is defined by the area between a line, that is 5 mm outside of the border coil Yn (5 mm lowerside from the long side Yng), and the long side Yn–1*g* of the adjacent coil Yn–1. Thus, the pair of border portions BDy are provided to the group of sense coils Y1–Yn.

Further, a pair of edge portions EG are defined for each of the X and Y coil groups. As shown in FIG. 35(*a*), a pair of edge portions EGy for the Y coils Y1–Yn are defined as regions that are close to the short sides Yd and Yh of the Y coils and where signals can still be detected. A pair of edge portions EGX for the X coils X1–Xm are defined as regions that are close to the short sides Xd and Xh of the X coils and where signals can still be detected.

In FIG. 44, the edge portion EGy close to the short sides Yd of the Y coils and the edge portion EGx close to the short sides Xd of the X coils are shown. As apparent from FIG. 44, the edge portions EGy for the short sides Yd of Y coils substantially share the same range as the border portions BDx of the X coil X1, and the edge portions EGx for the short sides Xd of X coils share substantially the same range as the border portion BDy of the Y coil Y1. Although not shown in the drawings, the edge portions EGy for the short sides Yh of Y coils substantially share the same range as the border portions BDx of the X coil Xm, and the edge portions EGx for the short sides Xh of X coils share substantially the same range as the border portion BDy of the Y coil Yn.

Figure 45:
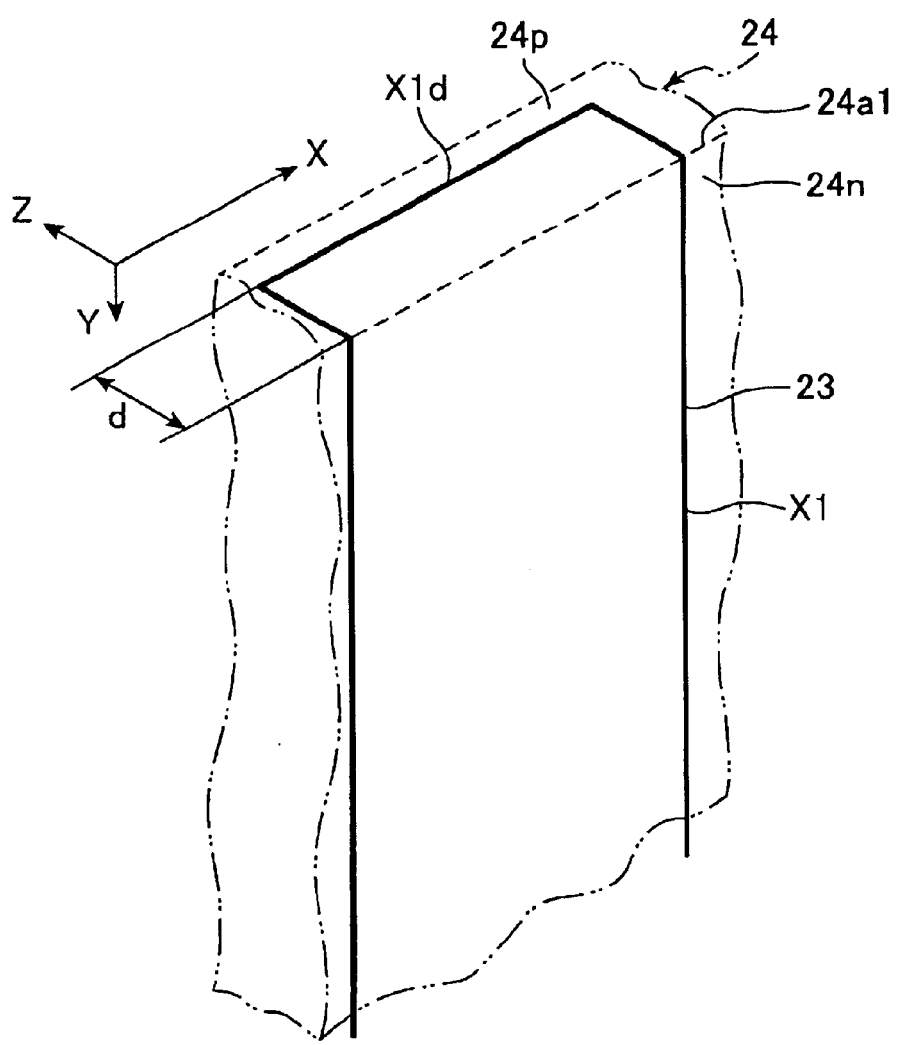
FIG. 45 is a perspective view showing how the X coil X1 is bent at its edge portion EGx near to the short side X1d.

In the same manner as in the first embodiment, in each of the pair of edge portions EGx, each of the X coils X1–Xm is bent from the front surface 24*n* to the edge surface 24*a* of the attachment panel 24. FIG. 45 shows the state how the X coil X1 is bent from the front surface 24*n* to the edge surface 24*a*. Similarly, in each of the pair of edge portions EGy, each of the Y coils Y1–Ym is bent from the front surface 24*n* to the edge surface 24*a*. The bending depth of the X and Y coils is referred to "d" in this example. By thus bending the X and Y coils at their edge portions, it is possible to make small the undesirable influences from the short sides of the coils similarly in the first embodiment.

When the pen 60 is located in one of the pair of border portions BDx, the x-coordinate of the pen 60 should be determined as described below.

Figure 46:
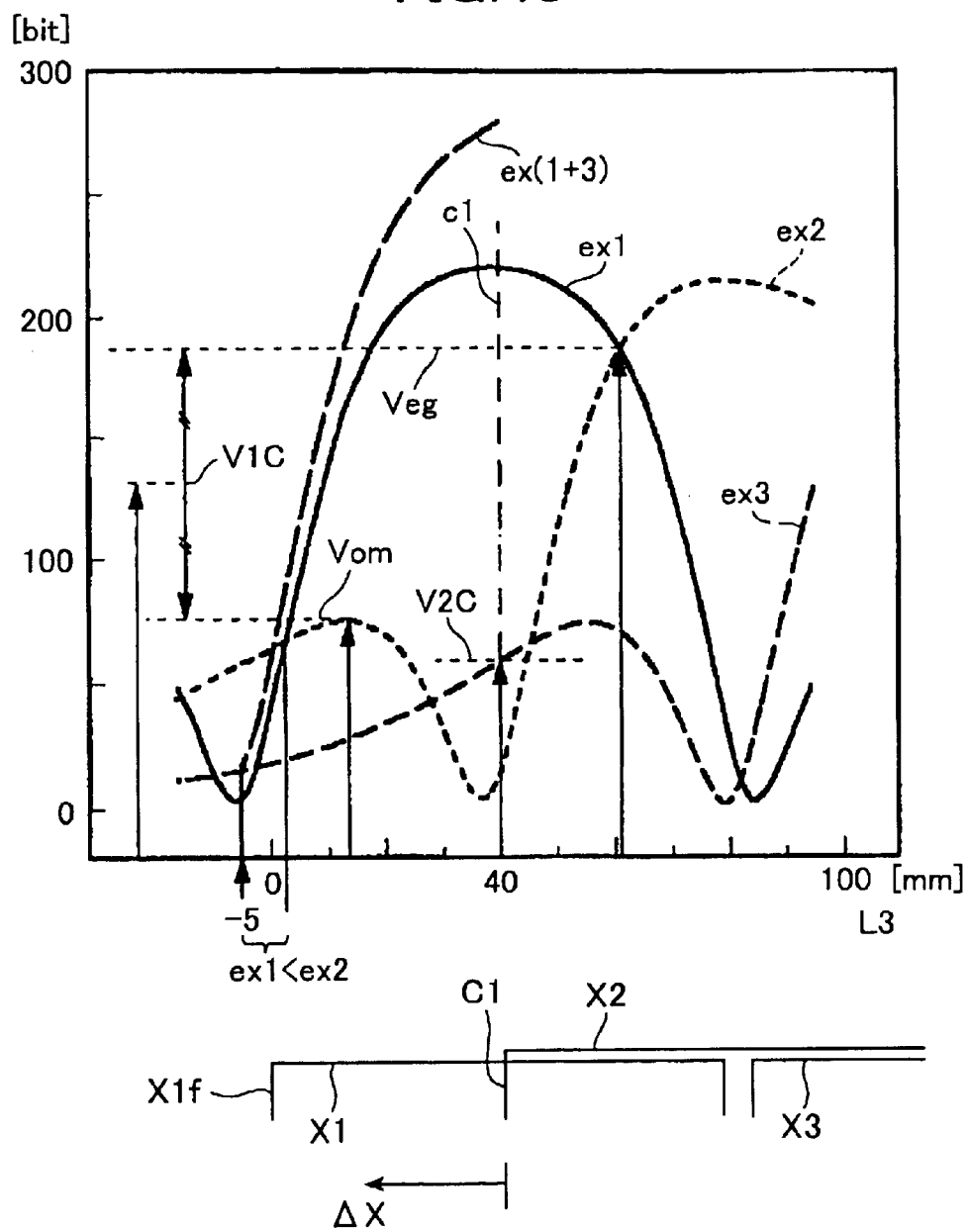
FIG. 46 is a graph showing how the values of the voltage signals detected by the X coils X1, X2, X3 and converted by the A/D conversion circuit 52 change when the pen 60 moves along the X axial direction.

FIG. 46 is a graph showing how the values of the voltage signals detected by the X coils X1, X2, X3 and converted by the A/D conversion circuit 52 change when the pen 60 moves along the X axial direction. In the graph, the vertical axis represents the detected and A/D converted voltage values in bit units. The horizontal axis represents the distance L3 of the pen position from a reference line. The reference line is defined as an imaginary line on which the long side X1f of the X coil X1 extends.

When the pen 60 is located at the X coil X1, then by scanning the X and Y coils in S302 of the flowchart of FIG. 14, the voltages induced in all the X coils are detected. With exception of special cases to be described later, the X coil X1 will be the maximum voltage coil X(max) that has generated the maximum voltage value e(max). As long as the pen 60 is not located within the border portion BDx, it is possible to determine the x coordinate of the pen 60 in the same manner in the first embodiment. That is, the difference DIFF is calculated between the maximum voltage value e(max), from X coil X1, and the second maixmum voltage value e(max2), from X coil X2. Then, the positioning coordinate table 58a is referred to using the calculated difference value.

However, if the pen 60 is located in the border portion BDx for the border coil X1, the above-described method cannot be used to determine the coordinate position. It is additionally noted that the characteristic of the voltage, produced by each sense coil 23, is relatively flat near its primary peak that appears when the pen 60 is located on the center line of the sense coil. For example, as shown in FIG. 46, the characteristic of the X border coil X1 in relatively flat near its primary peak on its center line C1. Therefore, the X coordinate cannot be reliably detected using changes in the output from the X coil X1 only. According to the present embodiment, therefore, the following procedure is employed to detect the X coordinate at the border portion BDz.

As shown in FIG. 44, the range of the border portion BDx for the border coil X1 is determined using the long side X1f of the X coil X1 as a reference line. That is, the border portion BDx extends 5 mm to the left of the reference line and 40 mm to the right of the reference line. When the pen 60 is located within this range, then as shown in FIG. 46, both of the X coil X1 and the X coil X3 show relatively high voltages. It is noted that the X coil X3 is adjacent to another X coil X2 that is adjacent to the border X coil X1. The X coil X3 will be referred to as a second reference coil Xr2 hereinafter.

The sum of the voltage ex1 of the X coil X1 and the voltage ex3 of the X coil X3 is indicated as a voltage ex(1+3) in FIG. 46. As shown in FIG. 46, the sum voltage ex(1+3) changes greatly with change in the X coordinate of the pen 60. According to the present embodiment, therefore, data of a border table 58c is prepared, as shown in FIG. 47, to show the correspondence between the sum voltage value e(1+3) and a positional offset value "BRDROFFSET". It is noted that the positional offset value BRDROFFSET in defined, as shown in FIG. 46, as a distance ΔX of the pen 60 from the center line C1 of the border coil C1 in the negative direction along the X axis. In other words, the value "BRDROFFSET" (ΔX) and the distance L3 (from the reference line X1f) in the horizontal axis of FIG. 46 have the relationship of "BRDROFFSET" (ΔX)=−(L3−40 mm). Accordingly, in the entire border portion BDx, the "BRDROFFSET" (ΔX) changes between 0 mm to 45 mm. Thus, the border table 58c is prepared as shown in FIG. 47 to show correspondence between the voltage sum values e(1+3) and the "BRDROFFSET" (ΔX) in the entire range of 0 mm to 45 mm.

The border table 58c shown in FIG. 47 is stored in the ROM 58. By using the border table 58b, the X coordinate within the border portion BDx can be determined as long as the sum voltage of the X coil X1 and the X coil X3 is known.

It is noted that even when the X coil X1 is the maximum voltage coil X(max), there are the following two situations: the first situation where the pen 60 is located in the border portion BDx; and the second situation where the pen 60 is located within the area of the X coil X1 where the adjacent X coil X2 is overlapped. In the first situation, the x coordinate of the pen 60 should be determined using the border table 58c described above. In the second situation, the x coordinate of the pen 60 should be determined using the position coordinate table 58a in the same manner as in the first embodiment.

According to the present embodiment, the following procedures are employed to judge whether the pen 60 is in the above-described first or second situation when the X coil X1 is the maximum coil.

A second reference voltage value V2C is defined, as shown in FIG. 46, as the amount of the voltage induced at the X coil X3 when the pen is located on the center line C1 of the X coil C1. As apparent from the graph of FIG. 46, when the pen 60 is in the first situation, that is, in the border portion BDx, the X coil X3 will output the voltage e3 less than the second reference voltage value V2C. On the other hand, when the pen 60 is in the second situation, that is, in the overlapped portion with the X coil X2, the X coil X3 will output the voltage e3 greater than the second reference voltage value V2C. Thus, it is possible to know whether the pen is in the first or second situation by comparing the voltage value of the X coil X3 with the second reference voltage V2C. According to the present embodiment, therefore, the second reference voltage V2C is previously detected, and data of the second reference voltage V2C is stored in the ROM 58.

It is also noted that even when the pen 60 is located in the border portion BDx, if the pen 60 is very close to the long side X1f of the border coil X1, the X coil X2 produces a voltage greater than the X coil X1 and therefore the X coil X2 becomes the maximum voltage coil X(max). In other words, as shown in FIG. 46, ex1<ex2 is satisfied in the region where the distance L3 of the pen 60 from the reference line X1f is a very small value. In this range, voltage ex1 induced by the border coil X1 is lower than the voltage ex2 induced by the X coil X2 even though the pen 60 is closer to the border coil X1 than to the X coil X2. For this reason, even though the X coil X2 produces the maximum voltage value e(max) and so is the X coil X(max), it cannot be known that the pen 60 is located in the X coil X2, but instead may be located within the border portion BDx.

According to the present embodiment, therefore, when the X coil X2 is determined as the maximum voltage coil X(max), the following processes are achieved to determine whether the pen 60 is in the X coil X2 or in the border portion BDx for the X coil X1.

It is noted that as shown in FIG. 46, a first reference voltage V1C is defined as an average of a voltage Veq and another voltage Vom. The voltage Veq in defined as a voltage induced by the X coils X1 and X2 when those X coils X1 and X2 produce the same amounts of voltages, that is, when the pen is located in the middle line of the area where the coils X1 and X2 are overlapped. The X coil X2 is adjacent to the X border coil X1. The voltage Vom is the amount of a secondary peak of the voltage produced by the X coil X2 when the pen is located outside the coil X2.

As apparent from FIG. 46, in the region where ex1<ex2, the amount of the voltage e2 from the X coil X2 is smaller than the first reference voltage V1C. Accordingly, even when the X coil X2 is the maximum coil X(max), it can be known whether or not the pen 60 is located in the border portion BDx by comparing the voltage e2 from the X coil X2 with the first reference voltage V1C. Thus, according to the present embodiment, the first reference voltage V1C is previously detected and stored in the ROM 58.

Thus, according to the present embodiment, if ex3<V2C when the X coil X1 is the maximum coil X(max) or if e2<V1C when the X coil X2 is the maximum coil X(max), it is known that the pen is located in the border portion BDx for the X coil X1, and therefore the X coordinate of the pen 60 is determined by referring to the border table 58c as described below.

That is, the border table 58c is referred to using the detected voltage sum value e(1+3), and one border offset value "BRDROFFSET", that is stored in the border table 58c in correspondence with the detected voltage sum value e(1+3), is selected. Then, using the selected border offset value "BRDROFFSET", the following formula (3) in calculated:

$$X=(P1/2)\times(\max)+\text{BRDROFFSET}\times\text{SIDE}+\text{BRDR} \quad (3)$$

wherein (P1/2)×(max) represents the X coordinate of the center of the maximum voltage coil X(max); (max) is the coil number of the maximum voltage coil X(max); BRDROFFSET is the value that is stored in the border table 58c in correspondence with the detected voltage sum value e(1+3); SIDE is set to −1 when the pen 60 is judged to be located in the border portion BDx for X coil X1; and BRDR is the distance (45 mm in this example) between the center C1 of the border coil X1 and the border edge (left side edge) of the border portion BDx. It is noted that the distance BRDR is equal to the width of the edge portion EGy where detection by Y coils becomes possible according to the present embodiment as will be described later.

It is noted that X coils Xm, Xm−1, and Xm−2 have the same characteristics shown in FIG. 46 as X coils X1, X2, and X3. Accordingly, when the pen is located in the border portion BDx for the border coil Xm, ex(m−2)<V2C is satisfied when the X coil Xm is the maximum coil X(max) and ex(m−1)<V1C is satisfied when the X coil Xm−1 is the maximum coil X(max). When the pen is located in the border portion BDx for X coil Xm, the border table 58c can also be used to detect the x coordinate of the pen. In this case, the formula (3) described above is used while setting the value "BRDROFFSET" as a distance from the center line of the maximum coil X(max) in the positive direction along the X axis and while setting the value "SIDE" to +1.

It is noted that Y coils Y1–Yn have the same characteristic with the X coils X1–Xm described above. Accordingly, when the pen is located in the border portion BDy for the border coil Y1, ey3<V2C is satisfied when the Y coil Y1 is the maximum coil Y(max) and ey2<V1C is satisfied when the Y coil Y2 is the maximum coil Y(max). When the pen is located in the border portion BDy for Y coil Y1, the border table 58c can also be used to detect the y coordinate of the pen. In this case, the formula (3) described above is used while setting the value "BRDROFFSET" as a distance from the center line of the maximum coil Y(max) in the negative direction along the Y axis and while setting the value "SIDB" to −1.

Similarly, when the pen is located in the border portion BDy for the border coil Yn, ey(n−2)<V2C is satisfied when the Y coil Yn in the maximum coil Y(max) and ey(n−1)<V1C is satisfied when the Y coil Ym−1 is the maximum coil Y(max). When the pen is located in the border portion BDy for Y coil Yn, the border table 58c can also be used to detect the y coordinate of the pen. In this case, the formula (3) described above is used while setting the value "BRDROFFSET" as a distance from the center line of the maximum coil Y(max) in the positive direction along the Y axis and while setting the value "SIDE" to +1.

When the pen 60 is located in the edge portion EGy shown in FIG. 44, the y-coordinate of the pen 60 should be determined as described below.

FIG. 48 shows how the voltage V(y) volts induced by the Y coil Y1 changes when the pen 60 moves along the X axis from the position (X=200 mm), which is separated by 200 mm rightwardly from the position (leftside edge 24a1 of the attachment panel 24 in FIG. 5) where the Y coil Y1 is bent, toward another position (X=−40 mm) that is separated by 40 mm leftwardly from the bent position of the Y coil Y1. The line indicated by Y=0 shows how the voltage from the Y coil Y1 changes when the pen 60 moves along the long side Y1f of Y coil Y1 from the position of X=200 mm to the X position of X=−40 mm. Another line indicated by Y=10 shows how the voltage from the Y coil Y1 changes when the pen 60 moves along an imaginary line that is within the Y coil Y1 and that is separated downwardly from the long side Y1f by 10 mm (Y=10 mm). Still another line indicated by Y=20 shows how the voltage from the Y coil Y1 changes when the pen 60 moves along another imaginary line that is within the Y coil Y1 and that is separated downwardly from the long side Y1f by 20 mm (Y=20 mm). Other lines indicated by Y=30 and Y=40 show how the voltage from the Y coil Y1 changes when the pen 60 moves along imaginary lines that are within the Y coil Y1 and that are separated downwardly from the long side Y1f by 30 mm (Y=30 mm) and 40 (Y=40 mm), respectively.

As apparent from the graph, when the pen moves on the center line (Y=40 mm) of the Y coil Y1, the voltage V(y) is maintained at about 1.5 volts when the pen is located within a range between the position of X=200 mm and the position of X=60 mm. However, when the pen reaches the position of X=60 mm and further moves toward the edge of the Y coil Y1, the voltage starts decreasing. Because the Y coil Y1 is bent at its position of X=0 mm, the voltage V(y) does not become zero (0) volts at the position of X=0 mm. Instead, the voltage V(y) becomes about 0.7 volts at the position of X=0 mm, and becomes zero volts at the position of X=−40 mm.

Similarly, when the pen moves on the other imaginary line of Y=30 mm, the voltage V(y) is maintained at about 1.5 volts when the pen is located within the same range between the position of X=200 mm and the position of X=60 mm. When the pen moves on the other imaginary line of Y=20 mm, the voltage V(y) is maintained at about 1.25 volts when the pen is located within a range between the position of X=200 mm and the position of X=50 mm. When the pen moves on the other imaginary line of Y=10 mm, the voltage V(y) is maintained at about 0.9 volts when the pen is located within a range between the position of X=200 mm and the position of X=30 mm. When the pen moves on the other imaginary line of Y=0 mm, the voltage V(y) is maintained at about 0.25 volts when the pen is located within a range between the position of X=200 mm and the position of X=30 mm. In each case, the voltage V(y) then decreases as the pen moves further toward the edge of the Y coil Y1. It is known that the Y coil Y1 has a characteristic that the voltage V(y) is maintained flat until the pen reaches the position of X=60 mm. It is therefore known that until the pen reaches the position of X=60 mm, the y coordinate can be determined by referring to the border table 58c using the voltage values detected by the Y coils.

On the other hand, when the pen reaches the position of X=60 mm and then enters the range of X=60 mm to X=−40 mm, the degree how the voltage V(y) drops becomes different according to the position of the pen along the y axial direction. Accordingly, it is impossible to correctly determine the y coordinate of the pen when the pen is located within the range of X=60 mm to X=−40 mm.

Figure 49:
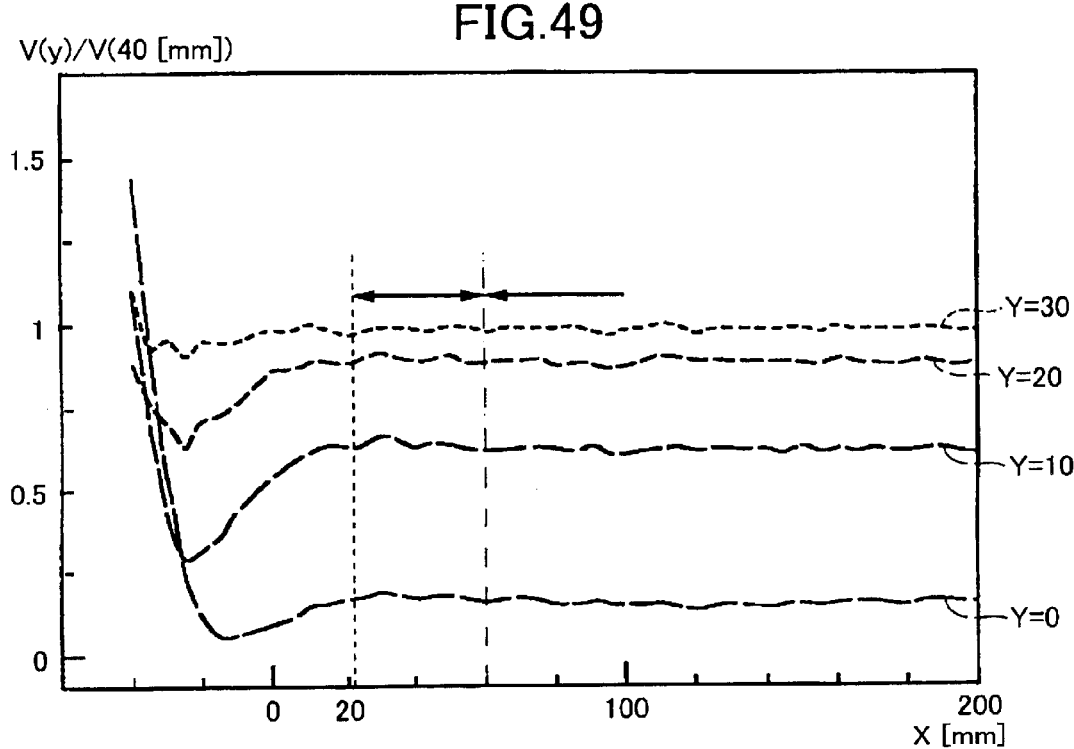
FIG. 49 is a graph showing the results obtained when the voltage values on the several lines in FIG. 48 are divided by the corresponding voltage values on the line of Y=40 mm by the formula of V(x,y)/V(x,y=40 mm)

FIG. 49 is a graph showing the results obtained when the voltage values on the lines of Y=30, 20, Y=10, and Y=0 shown in FIG. 48 are divided by the corresponding voltage values on the line of Y=40 mm by calculating the formula of V(x,y)/V(x, y=40 mm).

The graph of FIG. 49 shows that in all the cases of Y=0, 10, 20, and 30, the value V(x,y)/V(x, y=40 mm) is maintained unchanged while the pen moves within the wide range from the position of X=200 mm to the position of X=about 21 mm. It is apparent that in all of the cases of Y=0, 10, 20, and 30, the value of V(x,y)/V(x, y=40 mm) decreases toward the edge (short side Yd) of the Y coil Y1 at the same rate with the case of Y=40, although the value of V(x,y)/V(x, y=40 mm) presents different peaks for the respective cases of Y=0, 10, 20, and 30. It is therefore known that the y coordinate can be accurately determined by using this value of V(x,y)/V(x, y=40 mm).

According to the present embodiment, therefore, correction value "EDGE" is defined as a correction value for correcting voltages at the Y coil Y1 that decreases as the pen moves close to the left-side edge of the Y coil Y1. According to the present embodiment, the correction value EDGE is determined in the following formula:

EDGE=V(X=300, Y=40)/V(X, Y=40)

wherein V(X=300, Y=40) is the voltage value induced by the Y coil Y1 when the pen in located at the position of (X=300, Y=40). The position of (X=300, Y=40) in located on the center line of the Y coil Y1 and is separated from the leftside edge of the attachment panel 24 (the portion where the Y coil Y1 is bent) by 300 mm. At this position, influence from the short side Yd of the Y coil Y1 toward the edge portion EDy is minimum; and V(X,Y=40) is the voltage induced at the Y coil Y1 when the pen 60 is located at each of various positions on the center line of the Y coil Y1, and therefore is the value obtained for each X value along the line of Y=40 in the graph of FIG. 48.

Thus, the correction value EDGE, used for correcting the decreasing rate of the voltage value of the Y coil Y1 along the X direction, con be determined by dividing the voltage value V(X=300, Y=40) by V(X, Y=40).

Figure 50:
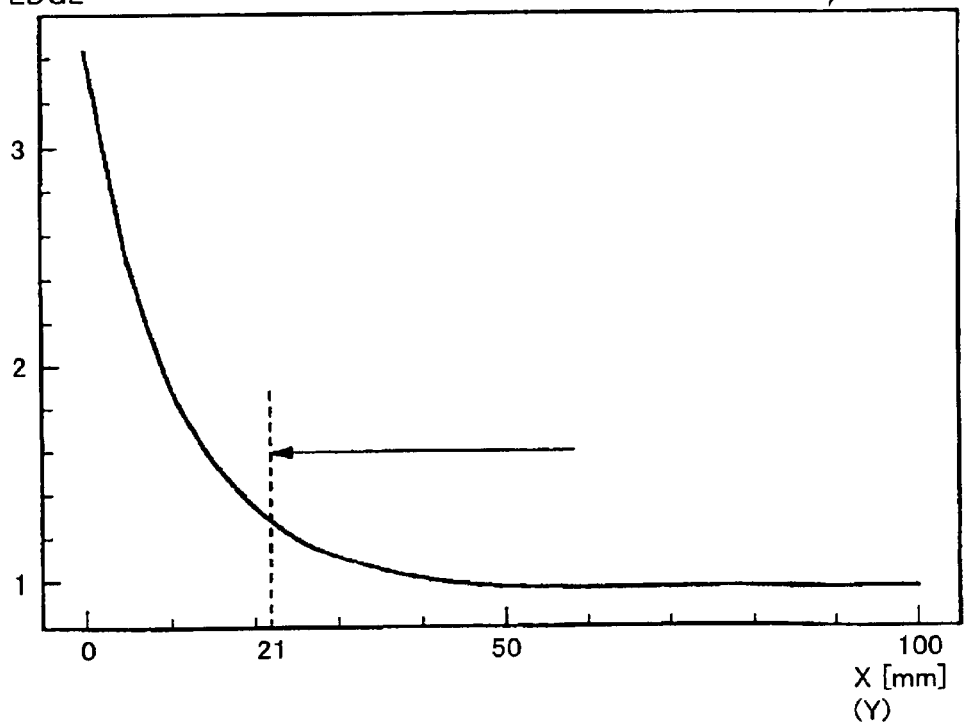
FIG. 50 is a graph showing the relationship between the correction value EDGE and the distance X [mm] from the edge of Y coil.

FIG. 50 is a graph showing the relationship between the thus determined correction value EDGE and the distance X [mm] from the bent portion of the Y coil Y1, that is, the left side edge of the panel 24. Thus, it is confirmed that regardless of the Y coordinate along the Y axis, the voltage at the Y coil Y1 decreases toward the left-side edge Y1d of the Y coil Y1 at the same rate as when Y=40. Influence from the left-hand short side Y1d of the Y coil Y1 toward the edge portion EDy can be cancelled out by applying the correction value EDGE to the detect voltage value.

According to the present embodiment, an edge table 58d showing the relationship, of FIG. 50, between the correction data EDGE and the coordinate value X is stored in the ROM 58. It is noted that because other Y coils Y2–Yn have the same characteristic with the Y coil Y1, the edge table 58d can be used for determining Y coordinates when the pen is located in any edge portions EDy for any Y coils.

According to the present embodiment, therefore, the y coordinate of the pen is determined by calculating the following formula (4):

Y=(P1/2)×(max)+CORR×SIDE+BRDR    (4)

wherein (P1/2)×(max) represents the y coordinate at the center of the maximum voltage coil Y(max);

CORR represents the value OFFSET that is obtained in a manner described below;

SIDE is set to −1 when the pen is located in the upper-side border portion BDy, that is, when ey3<V2C or ey2<V1C. SIDE is set to +1 when the pen is located in the lower-side border portion BDy, that is, when eyn−2<V2C or eyn−1<V1C. When the pen is not located in the upper- or lower-side border portion BDy, SIDE is set to +1 when coil (Xmax+1) is the second maximum coil X(max2) and is set to −1 when coil (Xmax−1) is the second maximum coil X(max2).

BRDR is the width of the edge region EGx (45 mm in this example) which becomes detectable according to the present embodiment.

The value CORR is determined in the manner described below.

First, a voltage difference DIFF is calculated in the same manner as in the first embodiment for the coils Y(max) and Y(max2). Then, the voltage difference DIFF is multiplied by a correction value "EDGE" that corresponds to the X coordinate already calculated for the position of the pen.

When the voltage difference value is thus corrected using the formula DIFF×EDGE, the position coordinate table 58a (FIG. 36) is referred to using the corrected voltage difference. An offset value ΔY, that is stored in the position coordinate table 58a in correspondence with the corrected voltage difference DIFF×EDGE, is obtained and is set as the value CORR in the formula (4).

Thus, the Y coordinate can be accurately determined by calculating the formula (4) even when the pen is located in the edge portion EGy.

It is noted that the voltage induced by each Y coil Y1–Yn changes in the same manner as shown in FIG. 48 even when the pen moves in the other edge portion EGy that is near to the short side Y1h. Accordingly, when the pen is located in the edge portion EGy near to the short side Y1h, the edge table 58d (FIG. 50) can also be used and the formula (4) described above is used to calculate the y coordinate of the pen. In this case, the value X along the horizontal axis in the edge table 58d is set as the distance of the pen from the position where the Y coils are bent at the rightside edge 24a1 of the attachment panel 24. Based on the already-calculated X coordinate of the pen, the distance of the pen from the rightside edge 24a1 is calculated, and a correction value EDGE corresponding to the distance is selected.

Because X coils X1–Xn have the same characteristic with the Y coils Y1–Yn, the edge table 58d can be used also for determining X coordinates when the pen is located in any edge portions EGx. The X coordinate in the edge portion EGx can be determined in the same manner as described above for the Y coordinate in the edge portions EDy.

Figure 51:
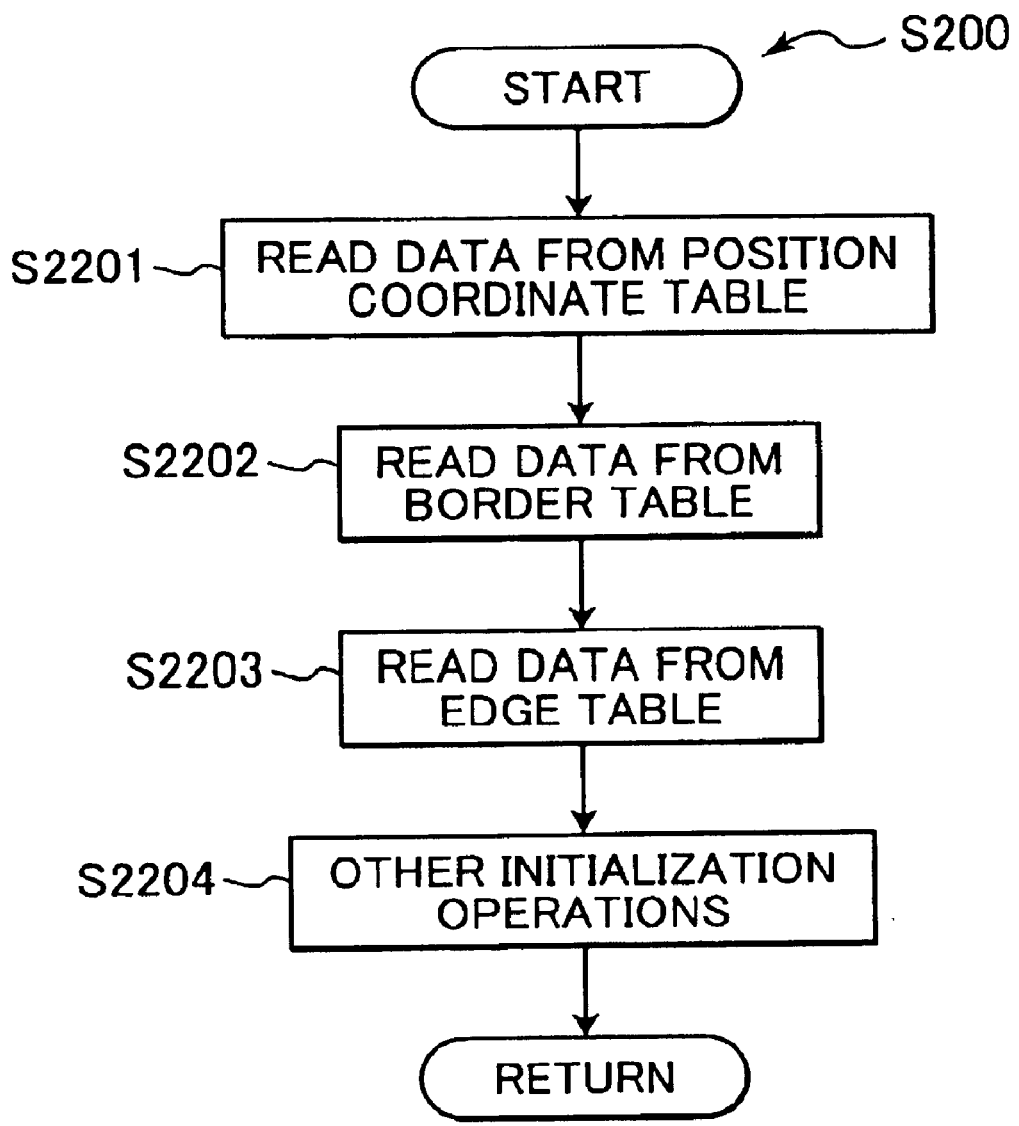
FIG. 51 is a flowchart of the initialization process of S200 in FIG. 13 according to the third embodiment.

According to the present embodiment, the initialization process of S200 in FIG. 13 is performed as shown in FIG. 51.

That is, when the initialization processes are started, then in S2201, data from the position coordinate table 58a is retrieved from the ROM 58 and stored in the work area of the RAM 59. Next, in S2202, data of the border table 58c is retrieved from the ROM 58 and written into the work area of the RAM 59. Next in S2203, data of the edge table 58d is retrieved from the ROM 58 and written into the work area of the RAM 59. Next, in S2204, other initialization settings, for setting flags and data of other types such as data of other control programs, are performed. When these preparatory processes are completed, the initialization setting process of S2200 in FIG. 13 is completed, and the program returns to the main routine.

Figure 52:
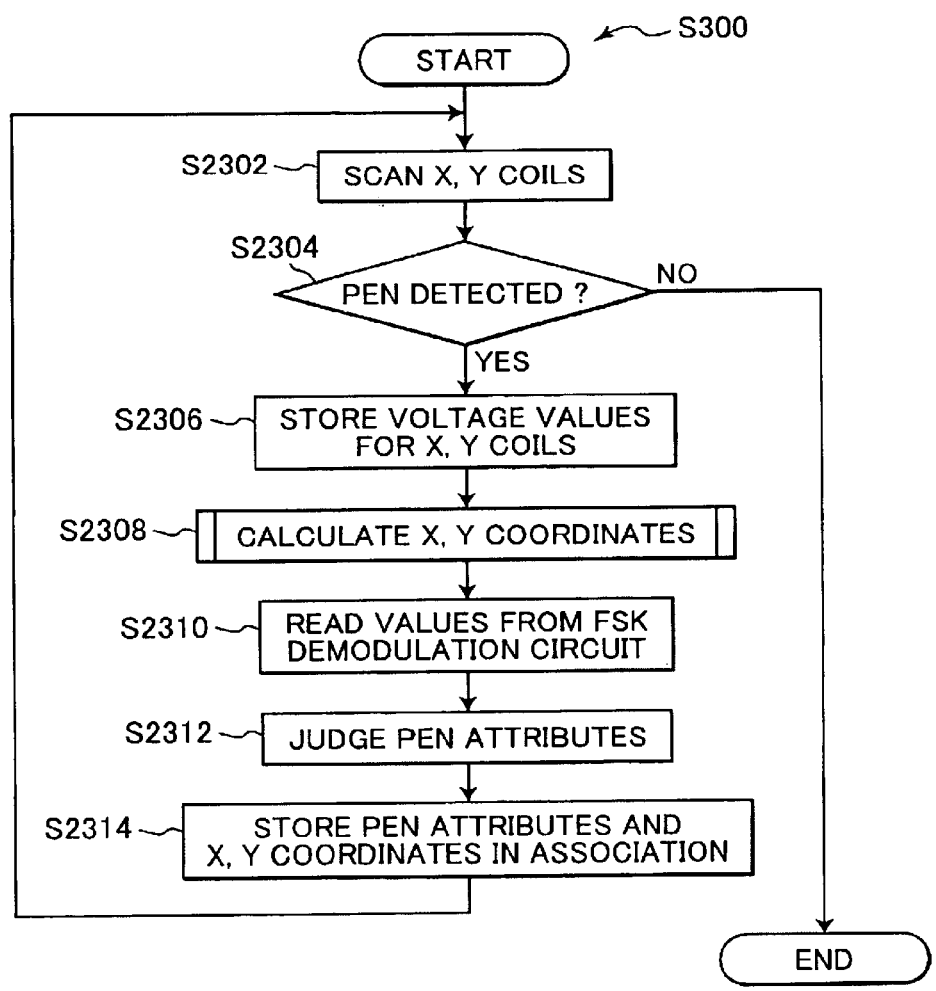
FIG. 52 is a flowchart of the coordinate reading process of S300 in FIG. 13 according to the third embodiment.

According to the present embodiment, the coordinate reading process of S300 in FIG. 13 is performed as shown in FIG. 52.

That is, when the coordinate reading routine is started, then X and Y coils are scanned in S2302. More specifically, the X coils X1 to Xm are scanned by the coil selection signal A (FIG. 39(b)) in this order, and then the Y coils Y1 to Yn are scanned by the coil selection signal A (FIG. 39(b)) in this order. If no pen 60 is detected (S2304:NO), then the coordinate reading process of S300 is ended, and the routine proceeds to the page routine of S400. If the pen 60 is detected (S2304:YES), then in S2306, the voltage values of all the X coils and Y coils are stored in the RAM 59. More specifically, the voltage values ex(1)–ex(m) from the X coils X1–Xm are stored in association with the corresponding coil numbers (1)–(m) in the voltage value storage area 59a as shown in FIG. 11(c). In the same manner, the voltage values ey(1)–ey(n) from the Y coils Y1–Yn are also stored in association with the corresponding coil numbers (1)–(n) in the voltage value storage area 59a. Additionally, the coil number (max) of the maximum voltage coil X(max), that has the maximum voltage ex(max) among the voltages ex(1)–ex(m) from the X coils X1–Xm, is stored in the RAM 59 at a predetermined memory region. Similarly, the coil number (max) of the maximum voltage coil Y(max), that has the maximum voltage ey(max) among the voltages ey(1)–ey(n) from the Y coils Y1–Yn, is also stored in the RAM 59 at the predetermined memory region. Once the voltage values for the X coils and Y coils are thus stored in S2306, then the X, Y coordinate calculation routine is performed in S2308.

Figure 53:
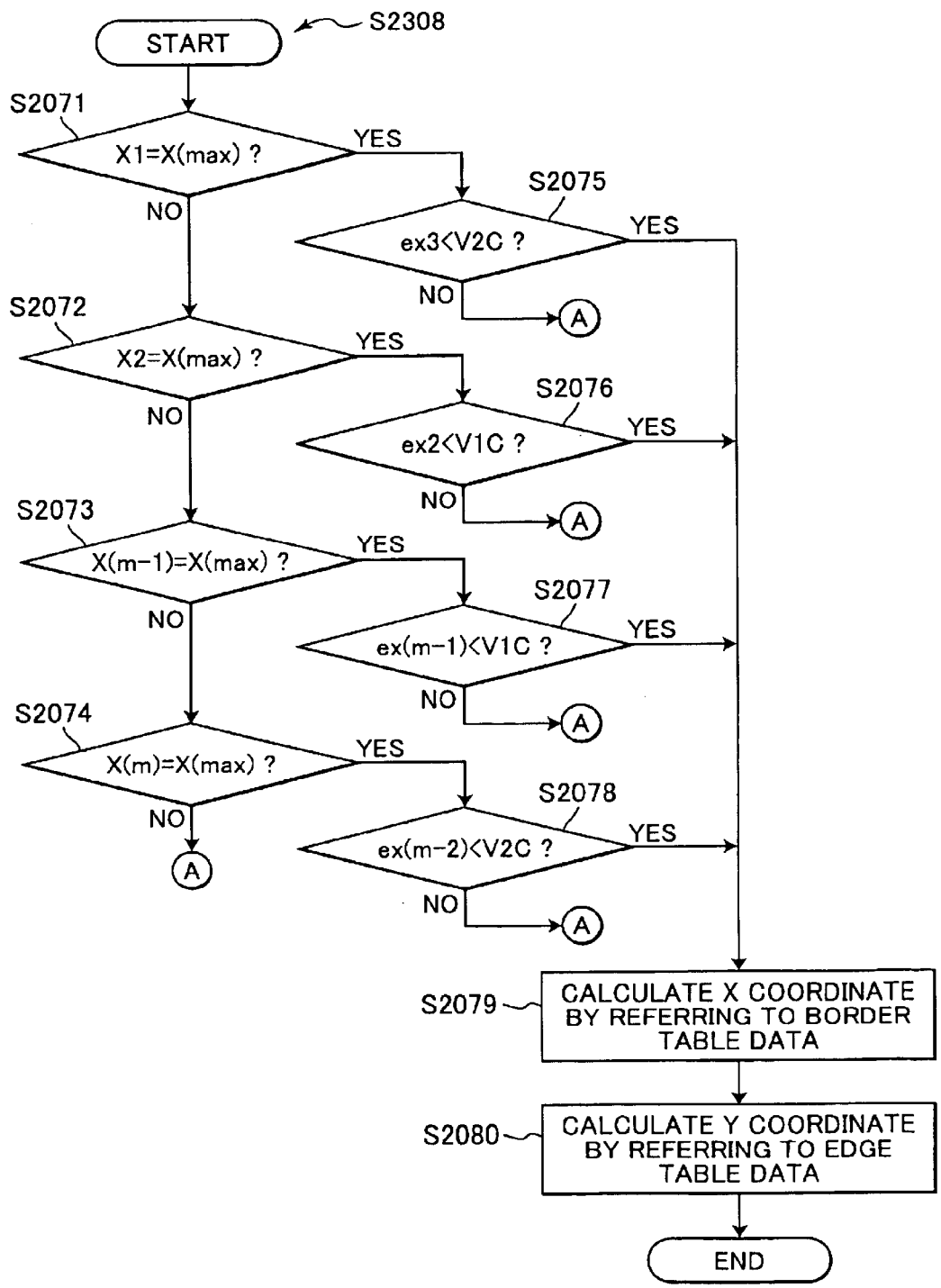
FIG. 53 is a part of a flowchart of the X, Y coordinate calculation routine of S2308 in FIG. 52.

Next, operations of the X, Y coordinate calculation routine in S2308 will be described while referring to the flowcharts in FIGS. 53 and 54. When the X, Y coordinate calculation routine of S2308 is started, first in S2071, the CPU 59 refers to the X coil voltage values ex(1)–ex(m) stored in the RAM 59 to determine whether or not the X coil X1 is the X coil X(max) that produces the maximum voltage value ex(max).

If so (S2071:YES), then this means that there is a possibility that the pen 60 be located in the X coil border portion BDx. Accordingly, the program proceeds to S2075 to judge whether ex3<V2C. That is, the CPU 56 judges whether the voltage ex3 from the X coil X3 is smaller than the second reference value V2C. If so (S2075:YES), this means that the pen is located in the X coil border portion BDx. Accordingly, the routine proceeds to S2079 where the X coordinate of the pen position is determined in the manner described above by referring to the border table 58c and by calculating the formula (3) described above. More specifically, the sum of the voltages ex1 and ex3 is calculated, and the border table 58c is referred to using the sum voltage (ex1+ex3). A value "BRDROFFSET" that corresponds to the sum voltage (ex1+ex3) is selected from the border table 58c. Then, using the value "BRDROFFSET", the formula (3) is calculated to determine the x coordinate.

If the pen 60 is thus located within the X border portion BDx, then as shown in FIG. 44, this means that the pen 60 is also within the Y edge portion EGy. Therefore, the Y coordinate for the pen 60 is determined in S2080 by referring to data in the edge table 58d and by calculating the formula (4) described above. More specifically, in S2080, because the X coordinate of the pen is already determined in S2079, the edge table 58d (shown in FIG. 50) is referred to, and a correction value EDGE corresponding to the X coordinate is selected. The voltage difference DIFF between the maximum voltage ey(max) and the second maximum voltage ey(max2) is calculated. Then, the voltage difference DIFF is multiplied by the correction value EDGE. The coordinate position table 58a (FIG. 36) is referred to by using the value DIFF×EDGE, thereby determining the value CORR. Then, the formula (4) is calculated to obtain the y coordinate.

It is noted that even if the border X coil X1 is not the X coil X(max) (S2071:NO), there is a possibility that the pen 60 be within the border portion BDx if the X coil X2 is the X coil X(max) and if the voltage ex2 from the X coil X2 in smaller than the first reference voltage V1C. Accordingly, if the border X coil X1 is not the X coil X(max) (S2071:NO), the program proceeds to S2072 to judge whether or not the X coil X2 is the X coil X(max). If so (S2072:YES), then the CPU 56 further judges whether or not ex2<V1C in S2076. If ex2<V1C (S2076:YES), then this means that the pen is located in the X coil border portion BDx, and therefore, the X coordinate and the Y coordinate are determined in the processes in S2079 and S2080 in the same manner as described above.

If the X coil X(max) is neither the X coil X1 nor the X coil X2 (S2072:NO), then the program proceeds to S2073 to judge whether or not the pen is located in the other X coil border portion BDx at the other edge (rightside edge) of the attachment panel 24. Accordingly, in S2073, the CPU 56 judges whether the coil X(m−1) is the maximum coil X(max). If so (S2073:YES), then the CPU 56 further judges whether or not ex(m−1)<V1C in S2077. If so (S2077:YES), this means that the pen is located in the other X coil border portion BDx at the rightside edge of the attachment panel 24. Accordingly, the X and Y coordinates of the pen are calculated in the processes of S2079 and S2080.

If the maximum coil X(max) is none of the X coils X1, X2 or X(m−1) (S2073:NO), then the program proceeds to S2074 to judge whether or not the X coil X(m) in the X coil X(max). If so (S2074:YES), and if ex(m−2)<V2C (S2078:YES), then processes in S2079 and S2080 are performed to determine the X and Y coordinates of the pen.

If none of these conditions judged in S2074, S2075, S2076, S2077, and S2078 are fulfilled (S2074:NO, S2075:NO, S2076:NO, S2077:NO, S2078:NO), this means that the pen 60 is not within any X coil border portions BDx. Accordingly, the flowchart proceeds to processes shown in the flowchart of FIG. 54.

Figure 54:
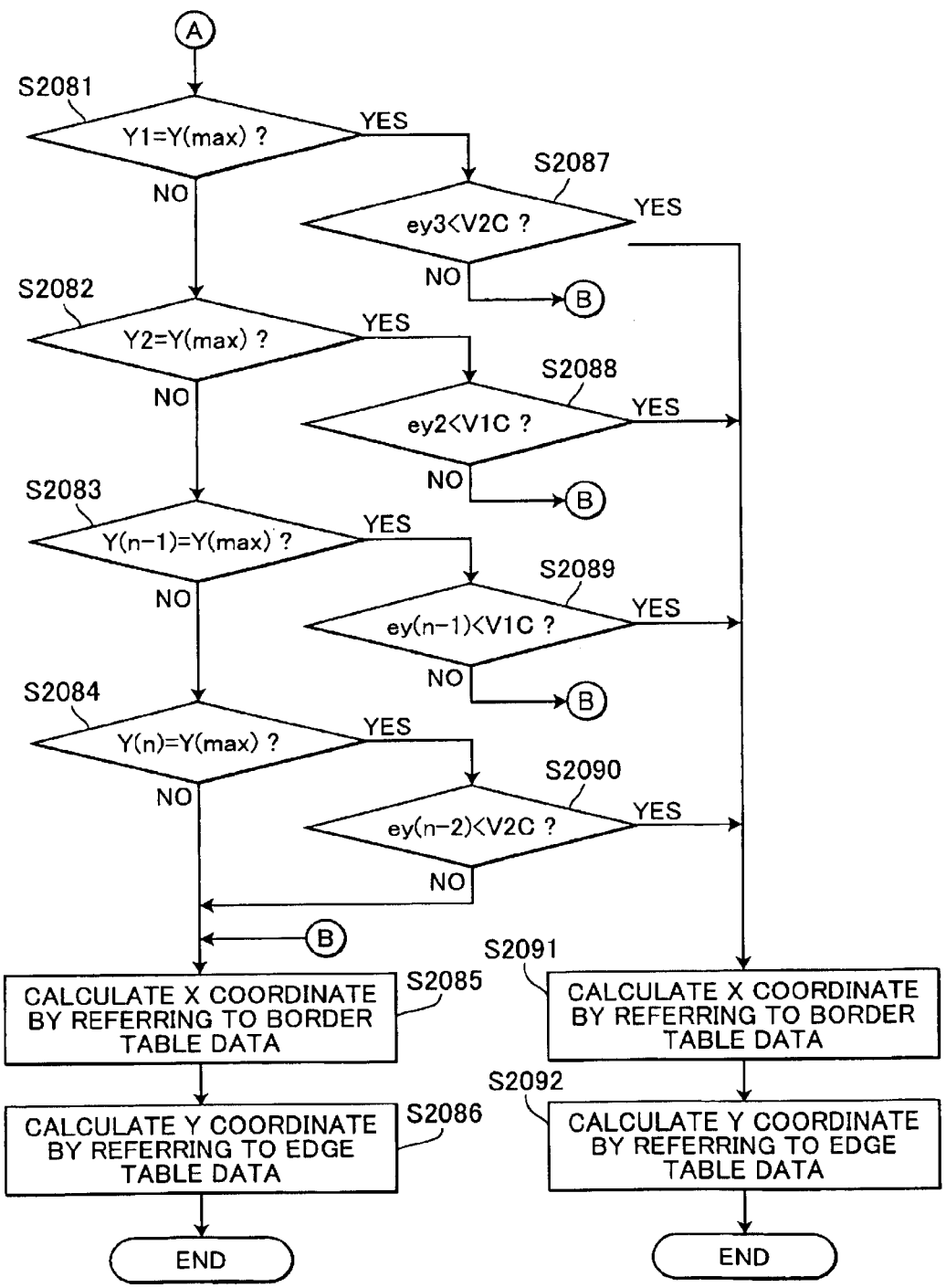
FIG. 54 is a remaining part of the flowchart of the X, Y coordinate calculation routine of S2308 in FIG. 52.

Once the program proceeds to the flowchart portion of FIG. 54, first in S2081, the CPU 59 refers to the Y coil voltage values ey(1)–ey(n) stored in the RAM 59 to determine whether or not the Y coil Y1 is the Y coil Y(max) that produces the maximum voltage value ey(max).

If so (S2081:YES), then this means that there is a possibility that the pen 60 be located in the Y coil border portion BDy. Accordingly, the program proceeds to S2087 to judge whether ey3<V2C. That is, the CPU S6 judges whether the voltage ey3 from the Y coil Y3 is smaller than the second reference value V2C. If so (S2087:YES), this means that the pen is located in the Y coil border portion BDy. Accordingly, the routine proceeds to S2091 where the Y coordinate of the pen position is determined, in the same manner as described above for the X coordinate, by referring to the border table 58c and by calculating the formula (3) described above. More specifically, the sum of the voltages ey1 and ey3 is calculated, and the border table 58c is referred to using the sum voltage (ey1+ey3). A value "BRDROFFSET" that corresponds to the sum voltage (ey1+ey3) is then selected from the border table 58c. Then, using the value "BRDROFFSET", the formula (3) is calculated to determine the y coordinate.

If the pen 60 is thus located within the Y border portion BDy, then as shown in FIG. 44, this means that the pen 60 is also within the X edge portion EGx. Therefore, the X coordinate for the pen 60 is determined in S2092 by referring to data in the edge table 58d and by calculating the formula (4) described above. More specifically, in S2092, because the Y coordinate of the pen is already determined in S2091, the edge table 58d (shown in FIG. 50) is referred to, and a correction value EDGE corresponding to the Y coordinate is selected. The voltage difference DIFF between the maximum voltage ex(max) and the second maximum voltage ex(max2) is calculated. Then, the voltage difference DIFF is multiplied by the correction value EDGE. The coordinate position table 58a (FIG. 36) is referred to by using the value DIFF×EDGE, thereby determining the value CORR. Then, the formula (4) is calculated to obtain the x coordinate.

It is noted that even if the border Y coil Y1 is not the Y coil Y(max) (S2081:NO), there is a possibility that the pen 60 be within the border portion BDy if the Y coil Y2 is the Y coil Y(max) and if the voltage ey2 from the Y coil Y2 is smaller than the first reference voltage V1C. Accordingly, if the border Y coil Y1 is not the Y coil Y(max) (S2081:NO), the program proceeds to S2082 to judge whether or not the Y coil Y2 is the Y coil Y(max). If so (S2082:YES), then the CPU 56 further judges whether or not ey2<V1C in S2088. If ey2<V1C (S2088:YES), then this means that the pen is located in the Y coil border portion BDy, and therefore, the Y coordinate and the X coordinate are determined in the processes in S2091 and S2092 in the same manner as described above.

If the Y coil Y(max) is neither the Y coil Y1 nor the Y coil Y2 (S2082:NO), then the program proceeds to S2083 to judge whether or not the pen is located in the other Y coil border portion BDy at the lower edge of the attachment panel 24. Accordingly, in S2083, the CPU 56 judges whether the coil Y(n−1) is the maximum coil Y(max). If so (S2083:YES), then the CPU 56 further judges whether or not ey(n−1)<V1C in S2089. If so (S2089:YES), this means that the pen is located in the other Y coil border portion BDy at the lower edge of the attachment panel 24. Accordingly, the X and Y coordinates of the pen are calculated in the processes of S2091 and S2092.

If the maximum coil Y(max) is none of the Y coils Y1, Y2 or Y(n−1) (S2083:NO), then the program proceeds to S2084 to judge whether or not the Y coil Y(m) is the Y coil Y(max). If so (S2084:YES), and if ey(m−2)<V2C (S2090:YES), then processes in S2091 and S2092 are performed to determine the X and Y coordinates of the pen.

If none of these conditions judged in S2084, S2087, S2088, S2089, and S2090 are fulfilled (S2084:NO, S2087:NO, S2088:NO, S2089:NO, S2090:NO), this means that the pen 60 is not within any of the X coil border portions BDx and any of the Y coil border portions BDy. Accordingly, the process proceeds to S2035 to determine the X coordinate of the pen in a manner similar to the first embodiment. Then, in S2086, the Y coordinate of the pen is determined in the same manner as in the process of S2085 for the X coordinate.

The process of S2085 is executed as shown in FIG. 55. That is, first in S2802, the maximum voltage value ex(max) is selected from all the values ex(1)–ex(m). Then, the coil number for the X coil X(max) that has generated the maximum voltage value ex(max) is set as coil number (max) and is stored in the RAM 59. Then in S2804, the voltage value ex(max−1) is extracted, and set in the RAM 59. Further, in S2806, the voltage value e(max+1) is extracted and stored in the RAM 59.

Next, in S2812, the CPU 56 compares the voltage values e(max−1) and e(max+1). If e(max−1)>e(max+1) (S2812:YES), then in S2818, the coil X(max−1) is set as the coil X(max2), and the value "SIDE" is set to −1. In S2820, the difference value DIFF is calculated by subtracting the voltage value e(max−1) (=e(max2)) from the maximum voltage value e(max).

On the other hand, if e(max−1)≦e(max+1) (S2812:NO), then in S2814, the coil X(max+1) is set as the coil X(max2), and the values "SIDE" is set to 1. In S2816, the difference value "DIFF" is calculated by subtracting the voltage value e(max+1) (=e(max2)) from the maximum voltage vale e(max).

Thus, in S2812, S2814, S2816, S2818, and S2820, the formula (1) is calculated and the value "SIDE" is set in the same manner as in the first embodiment.

Next, in S2822, the CPU 56 refers to the position coordinate table 58a (FIG. 36(b)), and selects a positional coordinate ΔX that corresponds to a value DIFF closest to the calculated value DIFF. The CPU 56 then sets the selected positional coordinate ΔX as a value "OFFSET" in S2822. Then, in S2824, the CPU 56 determines the X coordinate X of the pen by calculating the following formula (5):

$$X=(P1/2)\times(\max)+\text{OFFSET}\times\text{SIDE}+\text{BRDR} \quad (5)$$

wherein $(P1/2)\times(\max)$ represents x coordinate at the center of the maximum coil X(max); and BRDR is equal to the width of EGy or EGx (45 mm in this example). According to the present embodiment, even when the pen in located at those edge regions EGy and EGx (that is, the border regions BDx and BDy), the position of the pen can be accurately determined during the processes of S2079, S2080, S2091 and S2092. Accordingly, the width of these regions are added in the formula (5). Except for this point, the formula (5) is the same as the formula (2) employed in the first embodiment. Accordingly, if the pen is located in the position Q3 in FIG. 12(a), the X coordinate of the pen can be calculated as X=(P1/2)×2+(e2−e3)×1+45 mm.

When the processes in S2085 are completed, then in S2086, similar processes are performed to calculate the Y coordinate of the pen. This ends the XY coordinate calculation routine of S2308 shown in FIG. 53.

Thus, according to the present embodiment, different coordinate calculation methods are provided, respectively, for when the pen 60 is located in the border portions BDx or BDy, when the pen is located in the edge portions EGz or EGy, and when the pen 60 is located at other locations. By this, the coordinates can be accurately read at the border portions BDx, BDy, in the edge portions EGx, EGy, and in other regions.

When the XY coordinate calculation routine of S2308 is completed, then the routine for reading values from the FSK demodulation circuit 55 is performed in S2310, and a routine for determining the pen attribute is performed in S2312.

Next will be described the process of S2310 to read demodulation counter values from the FSK demodulation circuit 55.

Figure 56A:
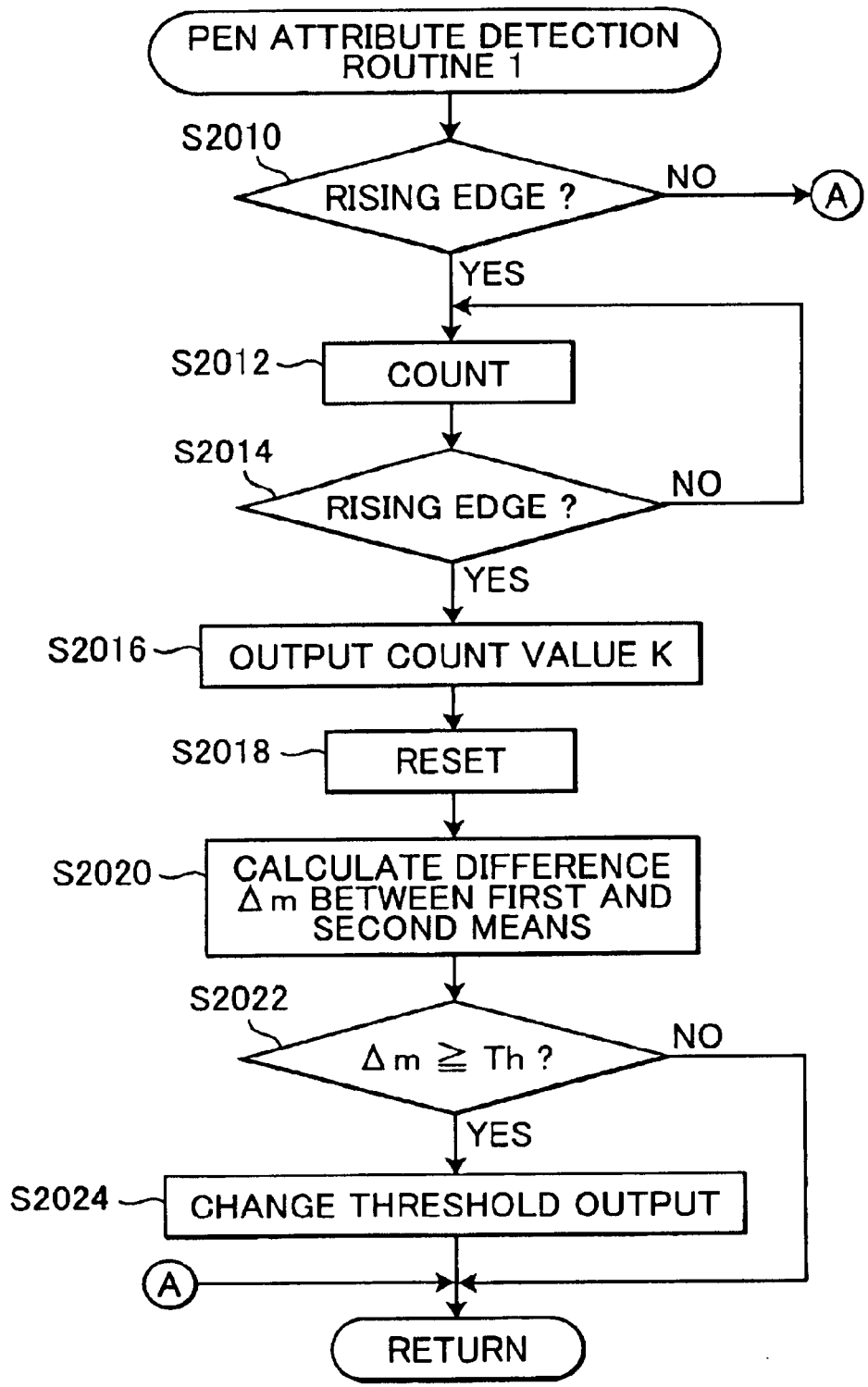
FIG. 56(a) is a flowchart of a first pen attribute detection process executed by the counter circuit 55a, the shift register 55b, the average calculating circuit 55c, 55d, the subtracting circuit 55e, and the absolute-value comparator 55f in the FSK demodulation circuit 55.

In the FSK demodulation circuit 55, the counter circuit 55a, the shift register 55b, the average calculating circuit 55c, 55d, the subtracting circuit 55e, and the absolute-value comparator 55f perform a first pen attribute detection process shown in FIG. 56(a). The counter 55g, the register 55h, and the adding circuit 55i perform a second pen attribute detection process shown in FIG. 56(b).

The first and second pen attribute detection processes will be described while referring to FIGS. 56(a) and 56(b).

As described already, the amplified signals having passed through the band pass filter 50d are supplied not only to the amplitude detection circuit 51 but also to the limiter circuit 54. The signals are converted by the limiter circuit 54 into a limiter output signal with the rectangular waveform shown in FIG. 41(a). The limiter output signal is supplied to the FSR demodulation circuit 55.

As shown in FIG. 56(a), when the FSK demodulation circuit 55 detects a rising edge of the limiter output signal (S2010:YES), then in S2012, the counter circuit 55a starts counting the number of the system clock (CLK) to measure the period of the limiter output signals. When the next rising edge of the limiter output signals is detected (S2014:YES), then in S2016, the counter value K by the counter circuit 55a is outputted to the shift register 55b. Then, in S18, the counter value K of the counter circuit 55a is reset. Thus, the counter circuit 55a measures the length TB or TC of a single period of limiter output signal shown in FIG. 41(a).

The thus newly produced counter value K is inputted into the shift resister 55b so that counter values K obtained during eight successive periods are stored in the shift register 55b. Each time the new counter value K is inputted to the shift register 55b, all of the counter values K in the shift register 55b are shifted one position and the oldest counter value K is discarded. The first average circuit 55c calculates an average from the latest counter value K to the third latest counter value K, and outputs the calculated mean value to the subtraction circuit 55e as the first mean value. The second average calculating circuit 55d calculates an average of the oldest counter value K to the third oldest counter value K, and outputs the calculated mean value to the subtraction circuit 55e as a second mean value.

Next, in S2020, the subtraction circuit 55e calculates the difference $\Delta$m between the first mean value and the second mean value, and outputs the difference $\Delta$m to the absolute-value comparator 55f. Then, in S2022, the absolute-value comparator 55f compares the absolute value of the difference $\Delta$m with the preset threshold value Th to judge whether or not the absolute value of the difference $\Delta$m is equal to or greater than the threshold value Th. If the absolute value of the difference $\Delta$m is judged to be greater than or equal to the threshold value Th (S2022:YES), then in S2024, a threshold value judgement output, to be outputted from the absolute-value comparator 55f, is changed between a low level and a high level.

Figure 56B:
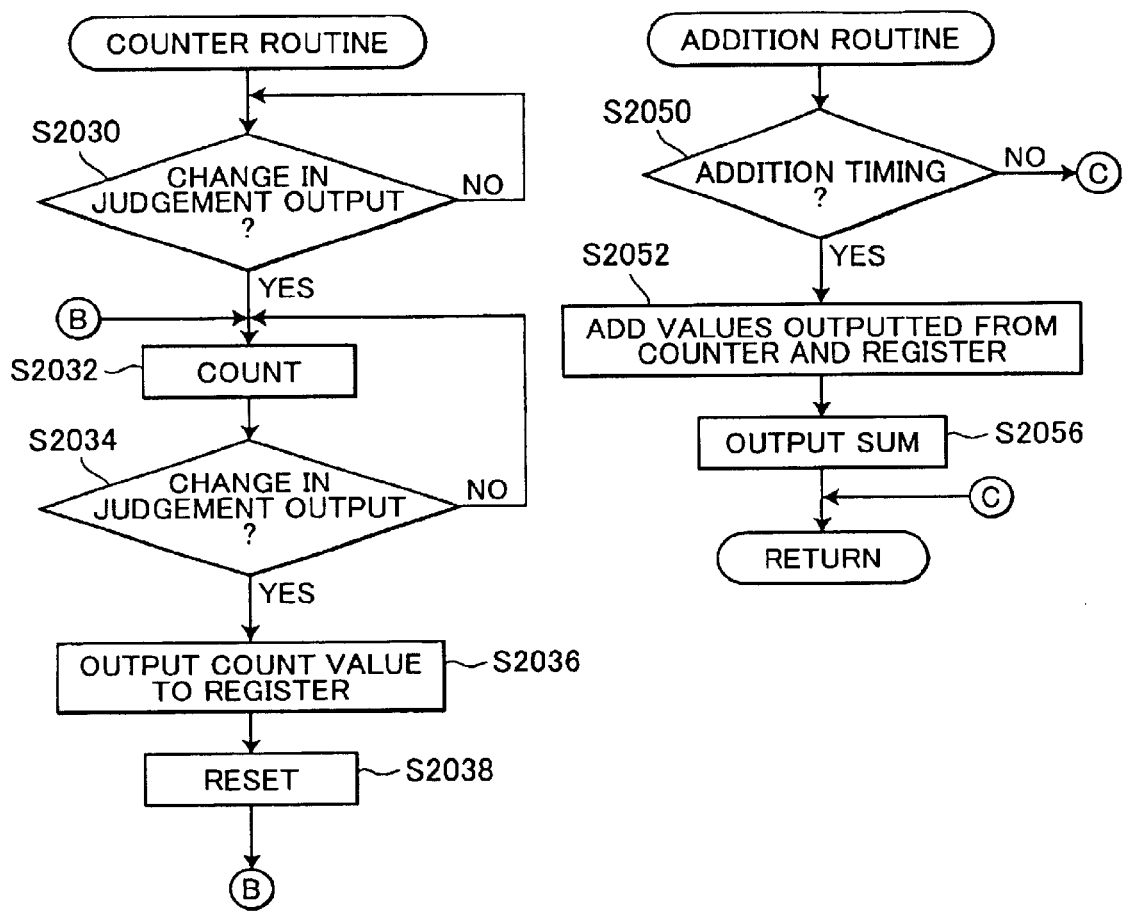
FIG. 56(b) shows flowcharts of a second pen attribute detection process, which includes a counting process by the counter 55g and an adding process by the adder 55i.

As shown in FIG. 56(b), when the counter 55g detects the change in the threshold judgment output between a low level and a high level (S2030:YES), then in S2032, the counter 55g starts counting the system clock (SLK) pulses to measure the time that the threshold judgement output is maintained at the present level, that is, the half period of the threshold judgement output.

When the absolute value converter 55f again judges that the absolute value of the difference $\Delta$m is equal to or greater than the threshold value Th (S2022:YES), then in S2024, the absolute value comparator 55f again changes the threshold value judgement output between a high level and a low level. At the same time, the counter 55g detects in S2034 that the threshold value judgement output changes again (S2034:YES). Then, in S2036 the counter 55g outputs its counter value to the register 55h. Next, in S2038, the counter 55g resets the counter value. The counter 55g then again starts counting in S2032 the half period of the threshold value judgement output, that is, the time that the threshold value judgement output is maintained at the present level.

The adding circuit 55i determines whether the adding timing has arrived by detecting the timing when the counter values are inputted to both the counter 55g and the register 55h. When counter values are inputted to both the counter 55g and the register 55h for a certain timing (S2050: YES), then in S2052, the adding circuit 55i adds the counter value now held in the counter 55g to the counter value now held in the register 55h. The adding circuit 55i then outputs the sum value to the CPU 56 in S2054. At this time, the counter 55g outputs in S2036 the next counter value to the register 55h.

Accordingly, in S2310, the CPU 56 reads the sum value from the adding circuit 55i, that is, the demodulation counter value of the FSK demodulation circuit 55, through the input/output circuit 56. Then, in S2312, the CPU 56 determines the pen attributes based on the retrieved sum value while referring to the table of FIG. 38. For example, if the sum value is 245, then the CPU 56 will judge the pen attributes to be black and thick.

Then, as shown in FIG. 52, in S2314, the CPU 56 stores the pen attributes in association with the X and Y coordinates in the RAM 59. The thus stored written data (X and Y coordinate data and the pen attribute data) will be outputted to the printer 200, for example, which in turn prints the characters or figures in a manner corresponding to the pen attribute. For example, if the pen attribute is black and thick, the printer 200 will print the characters or figures in thick black font. Also, the written data is could be outputted to the personal computer 100 and displayed on the monitor 103 in the thick black font. Thus, the written data is reproduced according to the attributes of the pen 60.

In this way, the X and Y coils are repeatedly scanned in S2302 of FIG. 52, when the user starts writing images on the writing surface 21a using the pen 60, the pen 60 is detected for the first time (S2304:YES). Then, S2302 to S2314 are repeatedly executed until the pen 60 is separated from the writing surface 21a so that the pen 60 is no longer detected (S2304:NO). The pen attributes and the X and Y coordinates for the pen 60 are stored in association with each other in a locus memory area (not shown) prepared in the RAM 59. Each set of X and Y coordinates is indicative of a position (pen position) defined on a dot matrix, on which a plurality of dot positions are arranged in the X and Y axial directions. In this way, the coordinate detection routine of S300 is ended.

As described above, according to the present embodiment, it is possible to accurately detect the coordinates of the pen even when the pen 60 exists in any border portions BDx or BDy, it is unnecessary to modify the edge portion of the sense coils 23. Because there is no adjacent coil in the outer side of the border coil Xb (b=1 or m) or Yb (b=y or n), when the pen is located in the border portion BDx or BDy, It is impossible to refer to the position coordinate table 58a using the difference value between the border coil and an adjacent coil on its outer side. According to the present embodiment, therefore, when the pen is located in some border portion BDx or BDy, the coordinate of the pen is determined not only based on the voltage induced in the subject border coil Xb (X1 or Xm) or Yb (Y1 or Yn) itself but also based on the voltage induced in the second reference coil Xr2 (X3 or Xm−2) or Yr2 (Y3 or Yn−2), wherein the second reference coil Xr2 (X3 or Xm−2) or Yr2 (Y3 or Yn−2) is located adjacent to the first reference coil Xr1 (X2 or Xm−1) or Yr1 (Y2 or Yn−1) that is located next to the border coil Xb (X1 or Xm) or Yb (Y1 or Yn) in its inner side. That is, the sum of the voltages induced in the border coil Xb or Yb and in the second reference coil Xr2 or Yr2 is used to read the X or T coordinate value from the border table 58c. Thus, the present embodiment is particularly striking to border coils Xb and Yb where no adjacent coil to provided on its outer side. Even if the pen 60 is located in the border portion BDx or BDy, the coordinate of the pen can still be accurately detected.

Additionally, even when the pen 60 is located in the border portion BDx or BDy, there is a possibility that the first reference soil Xr1 or Yr1 has the maximum voltage and therefore is detected as the maximum voltage coil X(max) or Y(max). Also in this situation, coordinates of the pen can be accurately detected. Therefore, even when the pen 60 is located in the border portion BDx or BDy, coordinates of the pen can be always detected correctly and accurately.

Additionally, when the pen 60 is located in the edge portion EGx or EGy along the lengthwise end of some X or Y loop coil, the detected voltages are corrected by using the correction data "EDGE" retrieved from the edge table 58d, and then the corrected detected voltages are used to retrieve a coordinate value from the position coordinate table 58a. As a result, even if the pen 60 is located in the edge portion EGx or EGy, coordinates of the pen can still be accurately retrieved.

Similarly to the first embodiment, according to the present embodiment, both edges of each sense coil 23 are bent away from the front surface 24n of the attachment panel 24. Therefore, influence of a magnetic field from the short sides of the sense coil 23 to the edge region can be canceled out. Accordingly, it is possible to reduce the area of an ineffective portion at the peripheral edge of the panel surface. It is possible to increase the area of an usable portion in the board surface, including the portions where correction is possible. The ratio of the effective surface area to the entire surface area of the panel surface area increases.

While the invention has been described in detail with reference to the specific embodiment thereof, it would be apparent to those skilled in the art that various changes and modifications may be made therein without departing from the spirit of the invention.

For example, the values of the length P2 (P2X, P2Y), width P1, and pitch P1/2 of the sense coils are not limited to those values described in the embodiments.

What is claimed is:

1. A coordinate reading device reading a coordinate of a position of a target which generates an alternating magnetic field, the coordinate reading device comprising:

a base member having a front surface, a rear surface, a pair of opposite side surfaces, each of which connects the front surface and the rear surface, a pair of opposite edges being defined between the front surface and the pair of side surfaces;

a plurality of loop wires provided on the base member, each loop wire being capable of producing an electric signal in response to an alternating magnetic field generated from a target which is located in front of the front surface, each loop wire having at least one edge portion, each loop wire being provided on the front surface of the base member, and having a pair of first sides that extend on the front surface in a direction substantially perpendicular to the pair of opposite edges and at least one second side that extends in another direction substantially parallel with the pair of opposite edges to connect the pair of first sides therebetween, the at least one second side defining the at least one edge portion, each of the at least one second side being located on either one of a corresponding side surface and the rear surface, with the first side being bent at a corresponding edge of the base member in a direction toward the rear surface with a bending amount that separates the second side away from the corresponding edge by a distance that is equal to the bending amount, thereby causing each loop wire to produce a corrected signal when the target is located in the corresponding edge portion of the loop wire; and a detection unit that detects levels of the signals generated from the plurality of loop wires, thereby determining a coordinate of the position of the target.

2. A coordinate reading device as claimed in claim 1, wherein the at least one edge portion has a pair of edge portions, the at least one second side has a pair of second sides connecting the pair of first sides therebetween, the pair of second sides defining the pair of edge portions, each of the pair of second sides being located on either one of the corresponding side surface and the rear surface, with the first side being bent at the corresponding edge of the base member in a direction toward the rear surface, thereby causing each loop wire to produce a corrected signal when the target is located in either one of the pair of edge portions of the loop wire.

3. A coordinate reading device as claimed in claim 2, wherein the base member further has a securing portion securing at least the pair of second sides of each loop wire.

4. A coordinate reading device as claimed in claim 2, wherein each loop wire is detachably mounted to the base member.

5. A coordinate reading device as claimed in claim 1, wherein each of the at least one second side is located on the corresponding side surface.

6. A coordinate reading device as claimed in claim 1, wherein each two adjacent loop wires in the plurality of loop wires are partly overlapped with one another, with the second sides of each two adjacent loop wires being partly overlapped with one another.

7. A coordinate reading device reading a coordinate of a position of a target which generates an alternating magnetic field, the coordinate reading device comprising:

a base member having a front surface, a rear surface, a pair of opposite side surfaces, each of which connects the front surface and the rear surface, a pair of opposite edges being defined between the front surface and the pair of side surfaces;

a plurality of loop wires provided on the base member, each loop wire being capable of producing an electric signal in response to an alternating magnetic field generated from a target which is located in front of the front surface, each loop wire having at least one edge portion, each loop wire being provided on the front surface of the base member, and having a pair of first sides that extend on the front surface and at least one second side connecting the pair of first sides therebetween, the at least one second side defining the at least one edge portion, the at least one second side being located on either one of a corresponding side surface and the rear surface, with the first side being bent at a corresponding edge of the base member in a direction toward the rear surface with a bending amount that causes each loop wire to produce a corrected signal when the target is located in the at least one edge portion of the loop wire; and a detection unit that detects levels of the signals generated from the plurality of loop wires, thereby determining a coordinate of the position of the target, wherein the at least one edge portion has a pair of edge portions, the at least one second side has a pair of second sides connecting the pair of first sides therebetween, the pair of second sides defining the pair of edge portions, each of the pair of second sides being located on either one of the corresponding side surface and the rear surface, with the first side being bent at the corresponding edge of the base member in a direction toward the rear surface, thereby causing each loop wire to produce a corrected signal when the target is located in either one of the pair of edge portions of the loop wire, wherein an input plate is provided over the front surface of the base member, wherein the target has a magnetic-field generating portion generating the alternating magnetic field, the magnetic-field generating portion having a pair of opposite sides, the target being located on the input plate with the pair of opposite sides being arranged along a direction normal to the input plate, and wherein a distance, defined along the direction normal to the input plate and defined between the second sides of each loop wire and the portion where the loop wire is bent at the edges of the base member, is set longer than a distance between the loop wire and one of the pair of opposite sides of the magnetic-field generating portion that is nearer to the input plate than the other when the target is placed on the input plate.

8. A coordinate reading device reading a coordinate of a position of a target which generates an alternating magnetic field, the coordinate reading device comprising:

a base member;

a plurality of loop wires provided on the base member, each loop wire being capable of producing an electric signal in response to an alternating magnetic field generated from a target, each loop wire having at least one edge portion;

a detection unit that detects levels of the signals generated from the plurality of loop wires, thereby determining a coordinate of the position of the target; and a corrected-edge-coordinate determination unit including a storage unit storing a correction coefficient whose value changes according to a distance of the target from a predetermined position of each loop wire that is defined in each of the at least one edge portion, the corrected-edge-coordinate determination unit determining a corrected coordinate of the target position by using the correction coefficient, thereby determining a corrected coordinate of the position of the target when the target is located in each of the at least one edge portion of a loop wire.

9. A coordinate reading device as claimed in claim 8, wherein the plurality of loop wires include a plurality of first loop wires and a plurality of second loop wires, the plurality of first loop wires being arranged in a predetermined first direction with a predetermined pitch, the plurality of second loop wires being arranged in a predetermined second direction with the predetermined pitch, the plurality of first loop wires having a pair of edge portions along the second direction, the plurality of second loop wires having a pair of edge portions along the first direction, wherein the detection unit includes:

a signal level detection unit that detects the levels of the signals produced by the first and second loop wires; and a coordinate determination unit that is capable of determining the coordinates, along the first and second directions, of the position of the target based on the detected signal levels, wherein the corrected-edge-coordinate determination unit includes:

a judging unit that judges, based on the determined coordinate along either one of the first and second directions, whether the target is within one of the pair of edge portions in the other one of the first and second loop wires; and a coordinate correction unit that corrects, when the target member is judged to be located in one edge portion of the other one of the first and second loop wires, the coordinate of the target along the other one of the first and second directions using a correction value whose value corresponds to the coordinate of the target along the either one of the first and second directions.

10. A coordinate reading device as claimed in claim 9, wherein the plurality of first loop wires include a pair of first border loop wires which are located at both end portions of the plurality of first loop wires in the predetermined first direction, and the plurality of second loop wires include a pair of second border loop wires which are located at both end portions of the plurality of second loop wires in the predetermined second direction, wherein each edge portion of the first loop wires includes an edge area defined within a corresponding one of the pair of second border loop wires but not within an adjacent second loop wire that is located adjacent to the second border loop wire, and wherein each edge portion of the second loop wires includes an edge area defined within a corresponding one of the pair of first border loop wires but not within an adjacent first loop wire that is located adjacent to the first border loop wire.

11. A coordinate reading device as claimed in claim 9, wherein the coordinate determination unit determines the coordinate of the target position along the first direction based on the levels of the signals generated in the first loop wires, and wherein the coordinate determination unit determines the coordinate of the target position along the second direction based on the levels of the signals generated in the second loop wires.

12. A coordinate reading device as claimed in claim 11, wherein the storage unit in the corrected-edge-coordinate determination unit stores the correction coefficient whose value changes according to a distance from a predetermined portion, of each of first and second loop wires, that is defined within each edge portion, and wherein the judging unit judges whether the value of the correction coefficient, corresponding to the determined coordinate along either one of the first and second directions, is greater than one, the coordinate correction unit correcting, when the correction coefficient is greater than one, the coordinate of the target position along the other one of the first and second directions using the corresponding correction coefficient.

13. A coordinate reading device as claimed in claim 9, wherein when the target is judged to be located in one edge portion for both of the first and second loop wires, the coordinate correction unit repeatedly performs first correction operation and second correction operation, the first correction operation being for correcting the coordinate of the target position along the first direction using the correction value whose value corresponds to the already-determined coordinate of the target along the second direction, thereby determining the coordinate, the second correction operation being for correcting the coordinate of the target position along the second direction using the correction value whose value corresponds to the already-determined coordinate of the target along the first direction, thereby determining the coordinate.

14. A coordinate reading device as claimed in claim 13, wherein the edge portion for both of the first and second loop wires includes one of four overlapped areas of a pair of first edge areas and a pair of second edge areas, the pair of first edge areas being defined within the pair of first border loop wires but not within adjacent first loop wires that are located adjacent to the first border loop wires, the pair of second edge areas being defined within the pair of second border loop wires but not within adjacent second loop wires that are located adjacent to the second border loop wires.

15. A coordinate reading device as claimed in claim 13, wherein the coordinate correction unit stops repeating the first and second correction operations when a difference between the coordinates obtained by present first and second correction operations and the coordinates obtained by preceding first and second correction operations is smaller than a predetermined threshold value.

16. A coordinate reading device as claimed in claim 9, further comprising another coordinate correction unit that corrects the coordinate of the target position in accordance with an output level of the alternating magnetic field generated from the target.

17. A coordinate reading device reading a coordinate of a position of a target which generates an alternating magnetic field, the coordinate reading device comprising:
  a base member;
  a plurality of loop wires provided on the base member, each loop wire being capable of producing an electric signal in response to an alternating magnetic field generated from a target, each loop wire having at least one edge portion, the plurality of loop wires including:
    a group of X coils having a plurality of X loop coils, each X loop coil being capable of being magnetically coupled to the alternating magnetic field so as to induce an electric voltage, each X loop coil extending in a predetermined Y direction, the plurality of X loop coils being arranged in a predetermined X direction, which is substantially perpendicular to the predetermined Y direction, to be parallel with one another and to be partly overlapped with one another, the plurality of X loop coils including at least one border X loop coil which is located at at least one end portion of the group of X coils in the predetermined X direction; and
    a group of Y coils having a plurality of Y loop coils, each Y loop coil being capable of being magnetically coupled to the alternating magnetic field so as to induce an electric voltage, each Y loop coil extending in the predetermined X direction, the plurality of Y loop coils being arranged in the predetermined Y direction to be parallel with one another and to be partly overlapped with one another, the plurality of Y loop coils including at least one border Y loop coil which is located at least one end portion of the group of Y coils in the predetermined Y direction;
  a detection unit that detects levels of the signals generated from the plurality of loop wires, thereby determining a coordinate of the position of the target, the detection unit including:
    a coil scanning unit that scanningly detects voltages induced in all the X loop coils in the group of X coils and in all the Y loop coils in the group of Y coils; and
    a coordinate determination unit that determines a set of an X coordinate value and a Y coordinate value, which is indicative of a position of the target, based on values of the voltages induced at the X and Y loop coils,
  wherein the group of X coils has the at least one edge portion in the predetermined Y direction and the group of Y coils has the at least one edge portion in the predetermined X direction, the at least one edge portion in the group of X coils being defined within the at least one Y border loop coil but not within at least one first reference Y loop coil that is located adjacent to the Y border loop coil, the at least one edge portion in the group of Y coils being defined within the at least one border X loop coil but not within at least one first reference X loop coil that is located adjacent to the X border loop coil,
  wherein a voltage induced in each X loop coil decreases when the target enters each edge portion of the corresponding X coil, and a voltage induced in each Y loop coil decreases when the target enters each edge portion of the corresponding Y coil,
  further comprising:
    an edge table that stores data of a correction value for correcting the decrease in the voltage induced in each of the X loop coils and the Y loop coils, the edge table storing data of a correction value for X coordinate values and Y coordinate values;
    a voltage correction unit that is capable of correcting the voltage values, scanningly detected for the X and Y loop coils, for determining one of the X coordinate value and the Y coordinate value, by a correction value that is retrieved from the edge table based on the other one of the X coordinate value and the Y coordinate value determined by the coordinate determination unit;
    an edge judging unit that judges whether either one of the X coordinate value and the Y coordinate value determined by the coordinate determination unit indicates that the target is located within one edge portion of the other one of the X and Y loop coil groups; and
    an edge correction unit that corrects, when the target is judged to be located within one edge portion of the X loop coil group, determines a Y coordinate of the location of the target based on the voltage values corrected by the voltage correction unit and that corrects, when the target is judged to be located within one edge portion of the Y loop coil group, determines a X coordinate of the location of the target based on the voltage values corrected by the voltage correction unit.

18. A coordinate reading device as claimed in claim 17, wherein the plurality of X loop coils include a pair of border X loop coils which are located at both end portions of the group of X coils in the predetermined X direction, wherein the plurality of Y loop coils include a pair of border Y loop coils which are located at both end portions of the group of Y coils in the predetermined Y direction, and
  wherein the group of X coils has the pair of edge portions in the predetermined Y direction and the group of Y coils has the pair of edge portions in the predetermined X direction, the pair of edge portions in the group of X coils being defined within the pair of Y border loop coils but not within a pair of first reference Y loop coils that are located adjacent to the Y border loop coils, the pair of edge portions in the group of Y coils being defined within the pair of border X loop coils but not within a pair of first reference X loop coils that are located adjacent to the X border loop coils.

19. A coordinate reading device as claimed in claim 18, wherein the coordinate determination unit includes:
   a maximum voltage coil detection unit that detects a maximum voltage X loop coil that induces a maximum voltage among all the X loop coils and that detects a maximum voltage Y loop coil that induces a maximum voltage among all the Y loop coils; and
   a second maximum voltage coil detection unit that detects a second maximum voltage X loop coil that induces a second maximum voltage among all the X loop coils and that detects a second maximum voltage Y loop coil that induces a second maximum voltage among all the Y loop coils;
   wherein the coordinate determination unit determines a set of an X coordinate value and a Y coordinate value, which is indicative of a position of the target, based on the values of the maximum voltage induced at the maximum voltage X loop coil and of the second maximum voltage induced at the second maximum voltage X loop coil and based on the values of the maximum voltage induced at the maximum voltage Y loop coil and of the second maximum voltage induced at the second maximum voltage Y loop coil, and
   wherein the edge correction unit corrects, when the target is judged to be located within one edge portion of the X loop coil group, determines a Y coordinate of the location of the target based on the maximum and second maximum voltage values which are induced by the maximum and second maximum voltage Y coils and which are corrected by the voltage correction unit, and that corrects, when the target is judged to be located within one edge portion of the Y loop coil group, determines a X coordinate of the location of the target based on the maximum and second maximum voltage values which are induced by the maximum and second maximum voltage X coils and which are corrected by the voltage correction unit.

20. A coordinate reading device as claimed in claim 19, wherein the plurality of X loop coils further include a pair of second reference X loop coils that are located next to the pair of first reference X loop coils, respectively,
   wherein the plurality of Y loop coils further include a pair of second reference Y loop coils that are located next to the pair of first reference Y loop coils, respectively,
   wherein the coordinate determination unit further includes:
      a border judging unit that judges whether or not the target is located in one of border portions along the X and Y directions, the border judging unit including:
         a first comparison unit that performs a first X judgment for the maximum voltage X loop coil when the maximum voltage X loop coil is one of the pair of border X loop coils, the first X judgment being for comparing, with a predetermined reference value, a value of a voltage induced at a second reference X loop coil for the maximum voltage X loop coil, to thereby determine that the target is located in a corresponding border portion along the X direction when the value of the voltage at the second reference X loop coil is lower than the predetermined reference value,
      the first comparison unit performing a first Y judgment for the maximum voltage Y loop coil when the maximum voltage Y loop coil is one of the pair of border Y loop coils, the first Y judgment being for comparing, with the predetermined reference value, a value of a voltage induced at a second reference Y loop coil for the maximum voltage Y loop coil, to thereby determine that the target is located in a corresponding border portion along the Y direction when the value of the voltage at the second reference Y loop coil is lower than the predetermined reference value;
      an adding unit that performs an X adding operation when the target is judged to be located in one border portion along the X direction, the X adding operation being for calculating a sum of the value of the maximum voltage induced at the maximum voltage X loop coil and the value of the voltage induced at the second reference X loop coil, the adding unit performing a Y adding operation when the target is judged to be located in one border portion along the Y direction, the Y adding operation being for calculating a sum of the value of the maximum voltage induced at the maximum voltage Y loop coil and the value of the voltage induced at the second reference Y loop coil;
      a border table storing data of a plurality of coordinate values in correspondence with a plurality of possible voltage sum values; and
      a border coordinate determination unit that performs an X coordinate determining operation to determine an X coordinate of the target when the target is located in one border portion along the X direction, the X coordinate determining operation being for referring to the border table based on the value of the sum obtained by the X adding operation, thereby reading a value of an X coordinate that is stored in the border table in correspondence with the sum value, the border coordinate determination unit performing a Y coordinate determining operation to determine a Y coordinate of the target when the target is located in one border portion along the Y direction, the Y coordinate determining operation being for referring to the border table based on the value of the sum obtained by the Y adding operation, thereby reading a value of a Y coordinate that is stored in the border table in correspondence with the sum value.

21. A coordinate reading device as claimed in claim 20, wherein the predetermined reference value is equal to a value of a voltage induced by the second reference X loop coil when the target member is located on the center of the corresponding X border loop coil in the X direction and to a value of a voltage induced by the second reference Y loop coil when the target member is located on the center of the corresponding Y border loop coil in the Y direction.

22. A coordinate reading device as claimed in claim 20, wherein the border judging unit further includes:
   a second comparison unit that performs a second X judgment for the maximum voltage X loop coil when the maximum voltage X loop coil is one of the pair of first reference X loop coils, the second X judgment being for comparing a value of a voltage induced at the first reference X loop coil with another reference value, to thereby determine that the target is located in one of the border portions along the X direction when the value of the voltage at the first reference X loop coil is lower than the other predetermined reference value,
   the second comparison unit performing a second Y judgment for the maximum voltage Y loop coil when the maximum voltage Y loop coil is one of the pair of first reference Y loop coils, the second Y judgment being for comparing a value of a voltage induced at the first reference Y loop coil with the other reference value, to thereby determine that the target is located in one of the border portions along the Y direction when the value of the voltage at the first reference Y loop coil is lower than the other predetermined reference value.

23. A coordinate reading device as claimed in claim 22, wherein each border X loop coil and its corresponding first reference X loop coil induce a same amount of border-adjacent voltage when the target is located in an overlapped area of the border X loop coil and the first reference X loop coil, each first reference X loop coil inducing a secondary peak voltage when the target is located in a range within its corresponding border X loop coil but outside the overlapped area of the border X loop coil and the first reference X loop coil, wherein each border Y loop coil and its corresponding first reference Y loop coil induce a same amount of border-adjacent voltage when the target is located in an overlapped area of the border Y loop coil and the first reference Y loop coil, each first reference Y loop coil inducing a secondary peak voltage when the target is located in a range within its corresponding border Y loop coil but outside the overlapped area of the border Y loop coil and the first reference Y loop coil, and wherein the other predetermined reference value is equal to an intermediate value between the border-adjacent voltage and the secondary peak voltage.

24. A coordinate reading device as claimed in claim 23, wherein the base member has a front surface, a rear surface, and a pair of edge surfaces, a pair of edges being defined between the front surface and the pair of side surfaces, the target being located on the side of the front surface, wherein each X loop wire being provided on the front surface, and having a pair of first sides that extend on the front surface in the Y direction and a pair of second sides connecting the pair of first sides therebetween, the pair of edge portions corresponding to the pair of second sides, wherein each Y loop wire being provided on the front surface, and having a pair of first sides that extend on the front surface in the X direction and a pair of second sides connecting the pair of first sides therebetween, the pair of edge portions corresponding to the pair of second sides, wherein the X and Y loop wires are provided on the front surface so that one first side of each border X loop wire, that is located outside than the other first side, being shifted from the second sides of the Y loop wires and so that one first side of each border Y loop wire, that is located outside than the other first side, being shifted from the second sides of the X loop wires, and wherein the first sides of each of the X and Y loop wires are bent at the edges of the base member in a direction toward the rear surface, thereby providing the second sides of each of the X and Y loop wires on either one of the side surface and the rear surface.

25. A coordinate reading device reading a coordinate of a position of a target which generates an alternating magnetic field, the coordinate reading device comprising:

a base member;

a plurality of loop wires provided on the base member, each loop wire being capable of producing an electric signal in response to an alternating magnetic field generated from a target, each loop wire having at least one edge portion, the plurality of loop wires including:

a group of X coils having a plurality of X loop coils, each X loop coil being capable of being magnetically coupled to the alternating magnetic field so as to induce an electric voltage, each X loop coil extending in a predetermined Y direction, the plurality of X loop coils being arranged in a predetermined X direction, which is substantially perpendicular to the predetermined Y direction, to be parallel with one another and to be partly overlapped with one another, the plurality of X loop coils including at least one border X loop coil which is located at at least one end portion of the group of X coils in the predetermined X direction; and a group of Y coils having a plurality of Y loop coils, each Y loop coil being capable of being magnetically coupled to the alternating magnetic field so as to induce an electric voltage, each Y loop coil extending in the predetermined X direction, the plurality of Y loop coils being arranged in the predetermined Y direction to be parallel with one another and to be partly overlapped with one another, the plurality of Y loop coils including at least one border Y loop coil which is located at at least one end portion of the group of Y coils in the predetermined Y direction;

a detection unit that detects levels of the signals generated from the plurality of loop wires, thereby determining a coordinate of the position of the target, the detection unit including:

a coil scanning unit that scanningly detects voltages induced in all the X loop coils in the group of X coils and in all the Y loop coils in the group of Y coils; and a coordinate determination unit that determines a set of an X coordinate value and a Y coordinate value, which is indicative of a position of the target, based on values of the voltages induced at the X and Y loop coils, wherein the coordinate determination unit includes:

a maximum voltage coil detection unit that detects a maximum voltage X loop coil that induces a maximum voltage among all the X loop coils and that detects a maximum voltage Y loop coil that induces a maximum voltage among all the Y loop coils; and a second maximum voltage coil detection unit that detects a second maximum voltage X loop coil that induces a second maximum voltage among all the X loop coils and that detects a second maximum voltage Y loop coil that induces a second maximum voltage among all the Y loop coils;

wherein the coordinate determination unit determines a set of an X coordinate value and a Y coordinate value, which is indicative of a position of the target, based on the values of the maximum voltage induced at the maximum voltage X loop coil and of the second maximum voltage induced at the second maximum voltage X loop coil and based on the values of the maximum voltage induced at the maximum voltage Y loop coil and of the second maximum voltage induced at the second maximum voltage Y loop coil, and wherein the plurality of X loop coils further includes at least one first reference X loop coil and at least one second reference X loop coil, the at least one first reference X loop coil being located next to the X border loop coil, the at least one second reference X loop coil being located next to the at least one first reference X loop coil, wherein the plurality of Y loop coils further includes at least one first reference Y loop coil and at least one second reference Y loop coil, the at least one first reference Y loop coil being located next to the Y border loop coil, the at least one second reference Y loop coil being located next to the at least one first reference Y loop coil, wherein the coordinate determination unit includes:

a border judging unit that judges whether or not the target is located in one of border portions along the X and Y directions, the border portion along the X direction being defined within the at least one border X loop coil but not within the at least one first reference X loop coil, the border portion along the Y direction being defined within the at least one Y border loop coil but not within the at least one first reference Y loop coil, the border judging unit including:

a first comparison unit that performs a first X judgment for the maximum voltage X loop coil when the maximum voltage X loop coil is one of the at least one border X loop coil, the first X judgment being for comparing, with a predetermined reference value, a value of a voltage induced at a second reference X loop coil for the maximum voltage X loop coil, to thereby determine that the target is located in a corresponding border portion along the X direction when the value of the voltage at the second reference X loop coil is lower than the predetermined reference value, the first comparison unit performing a first Y judgment for the maximum voltage Y loop coil when the maximum voltage Y loop coil is one of the at least one border Y loop coil, the first Y judgment being for comparing, with the predetermined reference value, a value of a voltage induced at a second reference Y loop coil for the maximum voltage Y loop coil, to thereby determine that the target is located in a corresponding border portion along the Y direction when the value of the voltage at the second reference Y loop coil is lower than the predetermined reference value;

an adding unit that performs an X adding operation when the target is judged to be located in one border portion along the X direction, the X adding operation being for calculating a sum of a value of the maximum voltage induced at the maximum voltage X loop coil and a value of the voltage induced at the second reference X loop coil, the adding unit performing a Y adding operation when the target is judged to be located in one border portion along the Y direction, the Y adding operation being for calculating a sum of a value of the maximum voltage induced at the maximum voltage Y loop coil and a value of the voltage induced at the second reference Y loop coil;

a border table storing data of a plurality of coordinate values in correspondence with a plurality of possible voltage sum values; and a border coordinate determination unit that performs an X coordinate determining operation to determine an X coordinate of the target when the target is located in one border portion along the X direction, the X coordinate determining operation being for referring to the border table based on a value of the sum obtained by the X adding operation, thereby reading a value of an X coordinate that is stored in the border table in correspondence with the value of the sum obtained by the X adding operation, the border coordinate determination unit performing a Y coordinate determining operation to determine a Y coordinate of the target when the target is located in one border portion along the Y direction, the Y coordinate determining operation being for referring to the border table based on a value of the sum obtained by the Y adding operation, thereby reading a value of a Y coordinate that is stored in the border table in correspondence with the value of the sum obtained by the Y adding operation.

26. A coordinate reading device as claimed in claim 25, wherein the at least one border X loop coil includes a pair of border X loop coils which are located at both end portions of the group of X coils in the predetermined X direction, and the at least one border Y loop coil includes a pair of border Y loop coils which are located at both end portions of the group of Y coils in the predetermined Y direction, wherein the at least one first reference X loop coil includes a pair of first reference X loop coils and the at least one second reference X loop coil includes a pair of second reference X loop coils, the pair of first reference X loop coils being located next to the border X loop coils, the pair of second reference X loop coils being located next to the pair of first reference X loop coils, wherein the at least one first reference Y loop coil includes a pair of first reference Y loop coils and the at least one second reference Y loop coil includes a pair of second reference Y loop coils, the pair of first reference Y loop coils being located next to the border Y loop coils, the pair of second reference Y loop coils being located next to the pair of first reference Y loop coils, wherein the border judging unit judges whether or not the target is located in one of border portions along the X and Y directions, the border portions along the X direction being defined within the pair of border X loop coils but not within the pair of first reference X loop coils, the border portions along the Y direction being defined within the pair of Y border loop coils but not within the pair of first reference Y loop coils, and wherein the first comparison unit performs the first X judgment for the maximum voltage X loop coil when the maximum voltage X loop coil is one of the pair of border X loop coils, the first comparison unit performing the first Y judgment for the maximum voltage Y loop coil when the maximum voltage Y loop coil is one of the pair of border Y loop coils.

27. A coordinate reading device as claimed in claim 26, wherein the predetermined reference value is equal to a value of a voltage induced by the second reference X loop coil when the target is located on the center of the corresponding X border loop coil in the X direction and to a value of a voltage induced by the second reference Y loop coil when the target is located on the center of the corresponding Y border loop coil in the Y direction.

28. A coordinate reading device as claimed in claim 26, wherein the border judging unit further includes:

a second comparison unit that performs a second X judgment for the maximum voltage X loop coil when the maximum voltage X loop coil is one of the pair of first reference X loop coils, the second X judgment being for comparing a value of a voltage induced at the first reference X loop coil with another predetermined reference value, to thereby determine that the target is located in one of the border portions along the X direction when the value of the voltage at the first reference X loop coil is lower than the other predetermined reference value, the second comparison unit performing a second Y judgment for the maximum voltage Y loop coil when the maximum voltage Y loop coil is one of the pair of first reference Y loop coils, the second Y judgment being for comparing a value of a voltage induced at the first reference Y loop coil with the other reference value, to thereby determine that the target is located in one of the border portions along the Y direction when the value of the voltage at the first reference Y loop coil is lower than the other predetermined reference value.

29. A coordinate reading device as claimed in claim 28, wherein each border X loop coil and its corresponding first reference X loop coil induce a same amount of border-adjacent voltage when the target is located in an overlapped area of the border X loop coil and the first reference X loop coil, each first reference X loop coil inducing a secondary peak voltage when the target is located in a range within its corresponding border X loop coil but outside the overlapped area of the border X loop coil and the first reference X loop coil, wherein each border Y loop coil and its corresponding first reference Y loop coil induce a same amount of border-adjacent voltage when the target is located in an overlapped area of the border Y loop coil and the first reference Y loop coil, each first reference Y loop coil inducing a secondary peak voltage when the target is located in a range within its corresponding border Y loop coil but outside the overlapped area of the border Y loop coil and the first reference Y loop coil, and wherein the other predetermined reference value is equal to an intermediate value between the border-adjacent voltage and the secondary peak voltage.

* * * * *